US012616903B2

(12) United States Patent　　　(10) Patent No.:　US 12,616,903 B2
Blackstock et al.　　　　　　　　　(45) Date of Patent:　　　May 5, 2026

(54) SYSTEM AND METHOD FOR GENERATING AND DISPLAYING AVATARS

(71) Applicant: Snap Inc., Santa Monica, CA (US)

(72) Inventors: Jacob Edward Blackstock, Toronto (CA); David James Kennedy, Toronto (CA); Shahan Panth, Toronto (CA); Dorian Franklin Baldwin, Toronto (CA)

(73) Assignee: Snap Inc., Santa Monica, CA (US)

( * ) Notice: Subject to any disclaimer, the term of this patent is extended or adjusted under 35 U.S.C. 154(b) by 54 days.

(21) Appl. No.: 18/582,399

(22) Filed: Feb. 20, 2024

(65) Prior Publication Data

US 2024/0325928 A1　　　Oct. 3, 2024

Related U.S. Application Data

(63) Continuation of application No. 17/450,040, filed on Oct. 5, 2021, now Pat. No. 11,925,869, which is a continuation of application No. 15/401,926, filed on Jan. 9, 2017, now Pat. No. 11,229,849, which is a continuation of application No. 13/979,974, filed as
(Continued)

(51) Int. Cl.
| | |
|---|---|
| *A63F 13/79* | (2014.01) |
| *A63F 13/35* | (2014.01) |
| *A63F 13/537* | (2014.01) |
| *A63F 13/63* | (2014.01) |
| *G06N 3/006* | (2023.01) |
| *G06T 11/00* | (2006.01) |

(52) U.S. Cl.
CPC .............. *A63F 13/79* (2014.09); *A63F 13/35* (2014.09); *A63F 13/537* (2014.09); *A63F 13/63* (2014.09); *G06N 3/006* (2013.01); *G06T 11/00* (2013.01); *A63F 2300/5553* (2013.01); *A63F 2300/6018* (2013.01)

(58) Field of Classification Search
None
See application file for complete search history.

(56) References Cited

U.S. PATENT DOCUMENTS

| | | | |
|---|---|---|---|
| 4,581,634 A | 4/1986 | Williams | |
| 4,975,690 A | 12/1990 | Torres | |
| 5,072,412 A | 12/1991 | Henderson, Jr. et al. | |

(Continued)

FOREIGN PATENT DOCUMENTS

| | | |
|---|---|---|
| AU | 2009283063 A1 | 2/2010 |
| CA | 2887596 A1 | 7/2015 |

(Continued)

OTHER PUBLICATIONS

U.S. Appl. No. 13/979,974 U.S. Pat. No. 10,155,168, filed Jul. 16, 2013, System and Method for Adaptable Avatars.
(Continued)

*Primary Examiner* — Hilina K Demeter
(74) *Attorney, Agent, or Firm* — Schwegman Lundberg & Woessner, P.A.

(57) ABSTRACT

Among other things, embodiments of the present disclosure provide systems and methods for modifying avatar components of avatar datasets for multiple users, generating avatars based on the datasets, and displaying multiple avatars on a display screen of a graphical user interface.

20 Claims, 6 Drawing Sheets

Related U.S. Application Data application No. PCT/CA2013/000454 on May 8, 2013, now Pat. No. 10,155,168.

(60) Provisional application No. 61/644,057, filed on May 8, 2012.

(56) References Cited

U.S. PATENT DOCUMENTS

| | | | |
|---|---|---|---|
| 5,493,692 A | 2/1996 | Theimer et al. |
| 5,713,073 A | 1/1998 | Warsta |
| 5,754,939 A | 5/1998 | Herz et al. |
| 5,826,269 A | 10/1998 | Hussey |
| 5,855,008 A | 12/1998 | Goldhaber et al. |
| 5,880,731 A | 3/1999 | Liles et al. |
| 5,883,639 A | 3/1999 | Walton et al. |
| 5,999,932 A | 12/1999 | Paul |
| 6,012,098 A | 1/2000 | Bayeh et al. |
| 6,014,090 A | 1/2000 | Rosen et al. |
| 6,023,270 A | 2/2000 | Brush, II et al. |
| 6,029,141 A | 2/2000 | Bezos et al. |
| 6,038,295 A | 3/2000 | Mattes |
| 6,049,711 A | 4/2000 | Yehezkel et al. |
| 6,154,764 A | 11/2000 | Nitta et al. |
| 6,158,044 A | 12/2000 | Tibbetts |
| 6,167,435 A | 12/2000 | Druckenmiller et al. |
| 6,204,840 B1 | 3/2001 | Petelycky et al. |
| 6,205,432 B1 | 3/2001 | Gabbard et al. |
| 6,216,141 B1 | 4/2001 | Straub et al. |
| 6,223,165 B1 | 4/2001 | Lauffer |
| 6,233,318 B1 | 5/2001 | Picard et al. |
| 6,283,858 B1 | 9/2001 | Hayes, Jr. et al. |
| 6,285,381 B1 | 9/2001 | Sawano et al. |
| 6,285,987 B1 | 9/2001 | Roth et al. |
| 6,310,694 B1 | 10/2001 | Okimoto et al. |
| 6,317,789 B1 | 11/2001 | Rakavy et al. |
| 6,334,149 B1 | 12/2001 | Davis, Jr. et al. |
| 6,349,203 B1 | 2/2002 | Asaoka et al. |
| 6,353,170 B1 | 3/2002 | Eyzaguirre et al. |
| 6,374,292 B1 | 4/2002 | Srivastava et al. |
| 6,446,004 B1 | 9/2002 | Cao et al. |
| 6,449,657 B2 | 9/2002 | Stanbach et al. |
| 6,456,852 B2 | 9/2002 | Bar et al. |
| 6,473,794 B1 | 10/2002 | Guheen et al. |
| 6,484,196 B1 | 11/2002 | Maurille |
| 6,487,586 B2 | 11/2002 | Ogilvie et al. |
| 6,487,601 B1 | 11/2002 | Hubacher et al. |
| 6,523,008 B1 | 2/2003 | Avrunin |
| 6,542,749 B2 | 4/2003 | Tanaka et al. |
| 6,549,768 B1 | 4/2003 | Fraccaroli |
| 6,590,674 B1 | 7/2003 | Orton |
| 6,618,593 B1 | 9/2003 | Drutman et al. |
| 6,622,174 B1 | 9/2003 | Ukita et al. |
| 6,631,463 B1 | 10/2003 | Floyd et al. |
| 6,633,289 B1 | 10/2003 | Lotens |
| 6,636,247 B1 | 10/2003 | Hamzy et al. |
| 6,636,855 B2 | 10/2003 | Holloway et al. |
| 6,643,684 B1 | 11/2003 | Malkin et al. |
| 6,658,095 B1 | 12/2003 | Yoakum et al. |
| 6,665,531 B1 | 12/2003 | Soderbacka et al. |
| 6,668,173 B2 | 12/2003 | Greene |
| 6,684,238 B1 | 1/2004 | Dutta |
| 6,684,257 B1 | 1/2004 | Camut et al. |
| 6,698,020 B1 | 2/2004 | Zigmond et al. |
| 6,700,506 B1 | 3/2004 | Winkler |
| 6,701,347 B1 | 3/2004 | Ogilvie |
| 6,711,608 B1 | 3/2004 | Ogilvie |
| 6,720,860 B1 | 4/2004 | Narayanaswami |
| 6,724,403 B1 | 4/2004 | Santoro et al. |
| 6,757,713 B1 | 6/2004 | Ogilvie et al. |
| 6,772,195 B1 | 8/2004 | Hatlelid et al. |
| 6,832,222 B1 | 12/2004 | Zimowski |
| 6,834,195 B2 | 12/2004 | Brandenberg et al. |
| 6,836,792 B1 | 12/2004 | Chen |
| 6,839,411 B1 | 1/2005 | Saltanov et al. |
| 6,842,779 B1 | 1/2005 | Nishizawa |
| 6,898,626 B2 | 5/2005 | Ohashi |
| 6,954,728 B1 | 10/2005 | Kusumoto et al. |
| 6,959,324 B1 | 10/2005 | Kubik et al. |
| 6,970,088 B2 | 11/2005 | Kovach |
| 6,970,907 B1 | 11/2005 | Ullmann et al. |
| 6,980,909 B2 | 12/2005 | Root et al. |
| 6,981,040 B1 | 12/2005 | Konig et al. |
| 7,020,494 B2 | 3/2006 | Spriestersbach et al. |
| 7,027,124 B2 | 4/2006 | Foote et al. |
| 7,072,963 B2 | 7/2006 | Anderson et al. |
| 7,073,129 B1 | 7/2006 | Robarts et al. |
| 7,079,158 B2 | 7/2006 | Lambertsen |
| 7,085,571 B2 | 8/2006 | Kalhan et al. |
| 7,110,744 B2 | 9/2006 | Freeny, Jr. |
| 7,124,164 B1 | 10/2006 | Chemtob |
| 7,149,893 B1 | 12/2006 | Leonard et al. |
| 7,173,651 B1 | 2/2007 | Knowles |
| 7,188,143 B2 | 3/2007 | Szeto |
| 7,203,380 B2 | 4/2007 | Chiu et al. |
| 7,206,568 B2 | 4/2007 | Sudit |
| 7,227,937 B1 | 6/2007 | Yoakum et al. |
| 7,237,002 B1 | 6/2007 | Estrada et al. |
| 7,240,089 B2 | 7/2007 | Boudreau |
| 7,243,163 B1 | 7/2007 | Friend et al. |
| 7,269,426 B2 | 9/2007 | Kokkonen et al. |
| 7,278,168 B1 | 10/2007 | Chaudhury et al. |
| 7,280,123 B2 | 10/2007 | Bentley et al. |
| 7,280,658 B2 | 10/2007 | Amini et al. |
| 7,315,823 B2 | 1/2008 | Brondrup |
| 7,342,587 B2 | 3/2008 | Danzig et al. |
| 7,349,768 B2 | 3/2008 | Bruce et al. |
| 7,356,564 B2 | 4/2008 | Hartselle et al. |
| 7,376,715 B2 | 5/2008 | Cunningham et al. |
| 7,394,345 B1 | 7/2008 | Ehlinger et al. |
| 7,411,493 B2 | 8/2008 | Smith |
| 7,423,580 B2 | 9/2008 | Markhovsky et al. |
| 7,447,996 B1 | 11/2008 | Cox et al. |
| 7,454,442 B2 | 11/2008 | Cobleigh et al. |
| 7,468,729 B1 | 12/2008 | Levinson |
| 7,478,402 B2 | 1/2009 | Christensen et al. |
| 7,496,347 B2 | 2/2009 | Puranik |
| 7,508,419 B2 | 3/2009 | Toyama et al. |
| 7,512,649 B2 | 3/2009 | Faybishenko et al. |
| 7,519,670 B2 | 4/2009 | Hagale et al. |
| 7,535,469 B2 | 5/2009 | Kim et al. |
| 7,535,890 B2 | 5/2009 | Rojas |
| 7,546,554 B2 | 6/2009 | Chiu et al. |
| 7,607,096 B2 | 10/2009 | Oreizy et al. |
| 7,627,828 B1 | 12/2009 | Collison et al. |
| 7,636,755 B2 | 12/2009 | Blattner et al. |
| 7,639,251 B2 | 12/2009 | Gu et al. |
| 7,639,943 B1 | 12/2009 | Kalajan |
| 7,650,231 B2 | 1/2010 | Gadler |
| 7,668,537 B2 | 2/2010 | DeVries |
| 7,689,649 B2 | 3/2010 | Heikes et al. |
| 7,703,140 B2 | 4/2010 | Nath et al. |
| 7,711,155 B1 | 5/2010 | Sharma et al. |
| 7,770,137 B2 | 8/2010 | Forbes et al. |
| 7,775,885 B2 | 8/2010 | Van Luchene et al. |
| 7,778,973 B2 | 8/2010 | Choi |
| 7,779,444 B2 | 8/2010 | Glad |
| 7,787,886 B2 | 8/2010 | Markhovsky et al. |
| 7,792,789 B2 | 9/2010 | Prahlad et al. |
| 7,796,946 B2 | 9/2010 | Eisenbach |
| 7,801,954 B2 | 9/2010 | Cadiz et al. |
| 7,818,336 B1 | 10/2010 | Amidon et al. |
| 7,856,360 B2 | 12/2010 | Kramer et al. |
| 7,859,551 B2 | 12/2010 | Bulman et al. |
| 7,885,931 B2 | 2/2011 | Seo et al. |
| 7,912,896 B2 | 3/2011 | Wolovitz et al. |
| 7,925,703 B2 | 4/2011 | Dinan et al. |
| 8,001,204 B2 | 8/2011 | Burtner et al. |
| 8,032,586 B2 | 10/2011 | Challenger et al. |
| 8,077,931 B1 | 12/2011 | Chatman et al. |
| 8,082,255 B1 | 12/2011 | Carlson, Jr. et al. |
| 8,088,044 B2 | 1/2012 | Tchao et al. |
| 8,090,351 B2 | 1/2012 | Klein |
| 8,095,878 B2 | 1/2012 | Bates et al. |
| 8,098,904 B2 | 1/2012 | Ioffe et al. |

(56) References Cited

U.S. PATENT DOCUMENTS

| | | |
|---|---|---|
| 8,099,109 B2 | 1/2012 | Altman et al. |
| 8,108,774 B2 | 1/2012 | Finn et al. |
| 8,112,716 B2 | 2/2012 | Kobayashi |
| 8,117,281 B2 | 2/2012 | Robinson et al. |
| 8,130,219 B2 | 3/2012 | Fleury et al. |
| 8,131,597 B2 | 3/2012 | Hudetz |
| 8,135,166 B2 | 3/2012 | Rhoads |
| 8,136,028 B1 | 3/2012 | Loeb et al. |
| 8,146,001 B1 | 3/2012 | Reese |
| 8,146,005 B2 | 3/2012 | Jones et al. |
| 8,151,191 B2 * | 4/2012 | Nicol ...................... A63F 13/45 |
| | | 715/706 |
| 8,161,115 B2 | 4/2012 | Yamamoto |
| 8,161,417 B1 | 4/2012 | Lee |
| 8,169,505 B2 | 5/2012 | Hoshi |
| 8,170,957 B2 | 5/2012 | Richard |
| 8,195,203 B1 | 6/2012 | Tseng |
| 8,195,748 B2 | 6/2012 | Hallyn |
| 8,199,747 B2 | 6/2012 | Rojas et al. |
| 8,208,943 B2 | 6/2012 | Petersen |
| 8,214,443 B2 | 7/2012 | Hamburg |
| 8,234,350 B1 | 7/2012 | Gu et al. |
| 8,238,947 B2 | 8/2012 | Lottin et al. |
| 8,244,593 B2 | 8/2012 | Klinger et al. |
| 8,276,092 B1 | 9/2012 | Narayanan et al. |
| 8,279,319 B2 | 10/2012 | Date |
| 8,280,406 B2 | 10/2012 | Ziskind et al. |
| 8,285,199 B2 | 10/2012 | Hsu et al. |
| 8,287,380 B2 | 10/2012 | Nguyen et al. |
| 8,301,159 B2 | 10/2012 | Hamynen et al. |
| 8,306,922 B1 | 11/2012 | Kunal et al. |
| 8,312,086 B2 | 11/2012 | Velusamy et al. |
| 8,312,097 B1 | 11/2012 | Siegel et al. |
| 8,326,315 B2 | 12/2012 | Phillips et al. |
| 8,326,327 B2 | 12/2012 | Hymel et al. |
| 8,332,475 B2 | 12/2012 | Rosen et al. |
| 8,352,546 B1 | 1/2013 | Dollard |
| 8,379,130 B2 | 2/2013 | Forutanpour et al. |
| 8,384,719 B2 | 2/2013 | Reville et al. |
| 8,385,950 B1 | 2/2013 | Wagner et al. |
| RE44,054 E | 3/2013 | Kim |
| 8,396,708 B2 | 3/2013 | Park et al. |
| 8,402,097 B2 | 3/2013 | Szeto |
| 8,405,773 B2 | 3/2013 | Hayashi et al. |
| 8,413,059 B2 | 4/2013 | Lee et al. |
| 8,418,067 B2 | 4/2013 | Cheng et al. |
| 8,423,409 B2 | 4/2013 | Rao |
| 8,425,322 B2 | 4/2013 | Gillo et al. |
| 8,446,414 B2 * | 5/2013 | Reville ................... A63F 13/12 |
| | | 463/31 |
| 8,457,367 B1 | 6/2013 | Sipe et al. |
| 8,458,601 B2 | 6/2013 | Castelli et al. |
| 8,462,198 B2 | 6/2013 | Lin et al. |
| 8,471,914 B2 | 6/2013 | Sakiyama et al. |
| 8,472,935 B1 | 6/2013 | Fujisaki |
| 8,484,158 B2 | 7/2013 | Deluca et al. |
| 8,495,503 B2 | 7/2013 | Brown et al. |
| 8,495,505 B2 | 7/2013 | Smith et al. |
| 8,504,926 B2 | 8/2013 | Wolf |
| 8,510,383 B2 | 8/2013 | Hurley et al. |
| 8,527,345 B2 | 9/2013 | Rothschild et al. |
| 8,554,627 B2 | 10/2013 | Svendsen et al. |
| 8,559,980 B2 | 10/2013 | Pujol |
| 8,560,612 B2 | 10/2013 | Kilmer et al. |
| 8,564,621 B2 | 10/2013 | Branson et al. |
| 8,564,710 B2 | 10/2013 | Nonaka et al. |
| 8,570,326 B2 | 10/2013 | Gorev |
| 8,570,907 B2 | 10/2013 | Garcia, Jr. et al. |
| 8,581,911 B2 | 11/2013 | Becker et al. |
| 8,594,680 B2 | 11/2013 | Ledlie et al. |
| 8,597,121 B2 | 12/2013 | Andres del Valle |
| 8,601,051 B2 | 12/2013 | Wang |
| 8,601,379 B2 | 12/2013 | Marks et al. |
| 8,613,089 B1 | 12/2013 | Holloway et al. |
| 8,632,408 B2 | 1/2014 | Gillo et al. |
| 8,639,767 B1 | 1/2014 | Harris et al. |
| 8,648,865 B2 | 2/2014 | Dawson et al. |
| 8,655,389 B1 | 2/2014 | Jackson et al. |
| 8,659,548 B2 | 2/2014 | Hildreth |
| 8,660,358 B1 | 2/2014 | Bergboer et al. |
| 8,660,369 B2 | 2/2014 | Llano et al. |
| 8,660,793 B2 | 2/2014 | Ngo et al. |
| 8,682,350 B2 | 3/2014 | Altman et al. |
| 8,683,354 B2 | 3/2014 | Khandelwal et al. |
| 8,692,830 B2 | 4/2014 | Nelson et al. |
| 8,700,012 B2 | 4/2014 | Ferren et al. |
| 8,718,333 B2 | 5/2014 | Wolf et al. |
| 8,724,622 B2 | 5/2014 | Rojas |
| 8,730,231 B2 | 5/2014 | Snoddy et al. |
| 8,732,168 B2 | 5/2014 | Johnson |
| 8,738,719 B2 | 5/2014 | Lee et al. |
| 8,744,523 B2 | 6/2014 | Fan et al. |
| 8,745,132 B2 | 6/2014 | Obradovich |
| 8,761,800 B2 | 6/2014 | Kuwahara |
| 8,768,876 B2 | 7/2014 | Shim et al. |
| 8,775,972 B2 | 7/2014 | Spiegel |
| 8,788,680 B1 | 7/2014 | Naik |
| 8,790,187 B2 | 7/2014 | Walker et al. |
| 8,797,415 B2 | 8/2014 | Arnold |
| 8,798,646 B1 | 8/2014 | Wang et al. |
| 8,810,513 B2 | 8/2014 | Ptucha et al. |
| 8,812,171 B2 | 8/2014 | Filev et al. |
| 8,832,201 B2 | 9/2014 | Wall |
| 8,832,552 B2 | 9/2014 | Arrasvuori et al. |
| 8,834,267 B2 | 9/2014 | Fujii et al. |
| 8,839,327 B2 | 9/2014 | Amento et al. |
| 8,856,349 B2 | 10/2014 | Jain et al. |
| 8,874,677 B2 | 10/2014 | Rosen et al. |
| 8,875,026 B2 | 10/2014 | Hamilton, II et al. |
| 8,886,227 B2 | 11/2014 | Schmidt et al. |
| 8,887,035 B2 | 11/2014 | Mcdonald et al. |
| 8,890,926 B2 | 11/2014 | Tandon et al. |
| 8,892,999 B2 * | 11/2014 | Nims ................... G06F 16/958 |
| | | 705/28 |
| 8,893,010 B1 | 11/2014 | Brin et al. |
| 8,909,679 B2 | 12/2014 | Root et al. |
| 8,909,714 B2 | 12/2014 | Agarwal et al. |
| 8,909,725 B1 | 12/2014 | Sehn |
| 8,914,752 B1 | 12/2014 | Spiegel |
| 8,924,250 B2 | 12/2014 | Bates et al. |
| 8,935,656 B2 | 1/2015 | Dandia et al. |
| 8,963,926 B2 | 2/2015 | Brown et al. |
| 8,972,357 B2 | 3/2015 | Shim et al. |
| 8,989,786 B2 | 3/2015 | Feghali |
| 8,995,433 B2 | 3/2015 | Rojas |
| 9,002,643 B2 | 4/2015 | Xu |
| 9,015,285 B1 | 4/2015 | Ebsen et al. |
| 9,020,745 B2 | 4/2015 | Johnston et al. |
| 9,040,574 B2 | 5/2015 | Wang et al. |
| 9,055,416 B2 | 6/2015 | Rosen et al. |
| 9,083,770 B1 | 7/2015 | Drose et al. |
| 9,086,776 B2 | 7/2015 | Ye et al. |
| 9,094,137 B1 | 7/2015 | Sehn et al. |
| 9,098,167 B1 | 8/2015 | Issa et al. |
| 9,100,806 B2 | 8/2015 | Rosen et al. |
| 9,100,807 B2 | 8/2015 | Rosen et al. |
| 9,105,014 B2 | 8/2015 | Collet et al. |
| 9,113,301 B1 | 8/2015 | Spiegel et al. |
| 9,119,027 B2 | 8/2015 | Sharon et al. |
| 9,123,074 B2 | 9/2015 | Jacobs et al. |
| 9,135,726 B2 | 9/2015 | Kafuku |
| 9,143,382 B2 | 9/2015 | Bhogal et al. |
| 9,143,681 B1 | 9/2015 | Ebsen et al. |
| 9,148,424 B1 | 9/2015 | Yang |
| 9,152,477 B1 | 10/2015 | Campbell et al. |
| 9,191,776 B2 | 11/2015 | Root et al. |
| 9,204,252 B2 | 12/2015 | Root |
| 9,224,220 B2 | 12/2015 | Toyoda et al. |
| 9,225,805 B2 | 12/2015 | Kujawa et al. |
| 9,225,897 B1 | 12/2015 | Sehn et al. |
| 9,237,202 B1 | 1/2016 | Sehn |
| 9,241,184 B2 | 1/2016 | Weerasinghe |
| 9,247,377 B2 | 1/2016 | Pai et al. |
| 9,256,860 B2 | 2/2016 | Herger et al. |

(56) References Cited

U.S. PATENT DOCUMENTS

| | | |
|---|---|---|
| 9,256,950 B1 | 2/2016 | Xu et al. |
| 9,258,459 B2 | 2/2016 | Hartley |
| 9,264,463 B2 | 2/2016 | Rubinstein et al. |
| 9,276,886 B1 | 3/2016 | Samaranayake |
| 9,285,951 B2 | 3/2016 | Makofsky et al. |
| 9,294,425 B1 | 3/2016 | Son |
| 9,298,257 B2 | 3/2016 | Hwang et al. |
| 9,314,692 B2 | 4/2016 | Konoplev et al. |
| 9,330,483 B2 | 5/2016 | Du et al. |
| 9,344,606 B2 | 5/2016 | Hartley et al. |
| 9,357,174 B2 | 5/2016 | Li et al. |
| 9,361,510 B2 | 6/2016 | Yao et al. |
| 9,369,422 B1 | 6/2016 | Ozog |
| 9,378,576 B2 | 6/2016 | Bouaziz et al. |
| 9,380,325 B1 | 6/2016 | Cormie et al. |
| 9,385,983 B1 | 7/2016 | Sehn |
| 9,392,308 B2 | 7/2016 | Ahmed et al. |
| 9,396,354 B1 | 7/2016 | Murphy et al. |
| 9,402,057 B2 | 7/2016 | Kaytaz et al. |
| 9,407,712 B1 | 8/2016 | Sehn |
| 9,407,816 B1 | 8/2016 | Sehn |
| 9,412,192 B2 | 8/2016 | Mandel et al. |
| 9,430,783 B1 | 8/2016 | Sehn |
| 9,439,041 B2 | 9/2016 | Parvizi et al. |
| 9,443,227 B2 | 9/2016 | Evans et al. |
| 9,450,907 B2 | 9/2016 | Pridmore et al. |
| 9,459,778 B2 | 10/2016 | Hogeg et al. |
| 9,460,541 B2 | 10/2016 | Li et al. |
| 9,480,924 B2 | 11/2016 | Haslam |
| 9,482,882 B1 | 11/2016 | Hanover et al. |
| 9,482,883 B1 | 11/2016 | Meisenholder |
| 9,485,747 B1 | 11/2016 | Rodoper et al. |
| 9,489,661 B2 | 11/2016 | Evans et al. |
| 9,489,760 B2 | 11/2016 | Li et al. |
| 9,491,134 B2 | 11/2016 | Rosen et al. |
| 9,503,845 B2 | 11/2016 | Vincent |
| 9,508,197 B2 | 11/2016 | Quinn et al. |
| 9,532,171 B2 | 12/2016 | Allen et al. |
| 9,537,811 B2 | 1/2017 | Allen et al. |
| 9,544,257 B2 | 1/2017 | Ogundokun et al. |
| 9,560,006 B2 | 1/2017 | Prado et al. |
| 9,576,400 B2 | 2/2017 | Van Os et al. |
| 9,584,455 B2 | 2/2017 | Zheng |
| 9,589,357 B2 | 3/2017 | Li et al. |
| 9,592,449 B2 | 3/2017 | Barbalet et al. |
| 9,628,416 B2 | 4/2017 | Henderson |
| 9,628,950 B1 | 4/2017 | Noeth et al. |
| 9,635,195 B1 | 4/2017 | Green et al. |
| 9,641,870 B1 | 5/2017 | Cormie et al. |
| 9,648,376 B2 | 5/2017 | Chang et al. |
| 9,652,809 B1 | 5/2017 | Levinson |
| 9,652,896 B1 | 5/2017 | Jurgenson et al. |
| 9,659,244 B2 | 5/2017 | Anderton et al. |
| 9,693,191 B2 | 6/2017 | Sehn |
| 9,697,635 B2 | 7/2017 | Quinn et al. |
| 9,705,831 B2 | 7/2017 | Spiegel |
| 9,706,040 B2 | 7/2017 | Kadirvel et al. |
| 9,710,821 B2 | 7/2017 | Heath |
| 9,742,713 B2 | 8/2017 | Spiegel et al. |
| 9,744,466 B2 | 8/2017 | Fujioka |
| 9,746,990 B2 | 8/2017 | Anderson et al. |
| 9,749,270 B2 | 8/2017 | Collet et al. |
| 9,773,284 B2 | 9/2017 | Huang et al. |
| 9,785,796 B1 | 10/2017 | Murphy et al. |
| 9,792,714 B2 | 10/2017 | Li et al. |
| 9,824,463 B2 | 11/2017 | Ingrassia et al. |
| 9,825,898 B2 | 11/2017 | Sehn |
| 9,839,844 B2 | 12/2017 | Dunstan et al. |
| 9,854,219 B2 | 12/2017 | Sehn |
| 9,883,838 B2 | 2/2018 | Kaleal, III et al. |
| 9,894,476 B2 | 2/2018 | Fraccaroli |
| 9,898,849 B2 | 2/2018 | Du et al. |
| 9,911,073 B1 | 3/2018 | Spiegel et al. |
| 9,936,165 B2 | 4/2018 | Li et al. |
| 9,959,037 B2 | 5/2018 | Chaudhri et al. |
| 9,961,520 B2 | 5/2018 | Brooks et al. |
| 9,980,100 B1 | 5/2018 | Charlton et al. |
| 9,990,373 B2 | 6/2018 | Fortkort |
| 9,990,653 B1 | 6/2018 | Lewis et al. |
| 10,039,988 B2 | 8/2018 | Lobb et al. |
| 10,097,492 B2 | 10/2018 | Tsuda et al. |
| 10,116,598 B2 | 10/2018 | Tucker et al. |
| 10,121,055 B1 | 11/2018 | Savvides et al. |
| 10,127,945 B2 | 11/2018 | Ho et al. |
| 10,146,748 B1 | 12/2018 | Barndollar et al. |
| 10,155,168 B2 | 12/2018 | Blackstock et al. |
| 10,158,589 B2 | 12/2018 | Collet et al. |
| 10,178,507 B1 | 1/2019 | Roberts |
| 10,194,270 B2 | 1/2019 | Yokoyama et al. |
| 10,212,541 B1 | 2/2019 | Brody et al. |
| 10,237,692 B2 | 3/2019 | Shan et al. |
| 10,242,477 B1 | 3/2019 | Charlton et al. |
| 10,242,503 B2 | 3/2019 | McPhee et al. |
| 10,251,128 B2 | 4/2019 | Nguyen |
| 10,262,250 B1 | 4/2019 | Spiegel et al. |
| 10,325,417 B1 | 6/2019 | Scapel et al. |
| 10,339,365 B2 | 7/2019 | Gusarov et al. |
| 10,360,708 B2 | 7/2019 | Bondich et al. |
| 10,362,219 B2 | 7/2019 | Wilson et al. |
| 10,375,519 B2 | 8/2019 | Pai et al. |
| 10,382,378 B2 | 8/2019 | Garcia et al. |
| 10,432,498 B1 | 10/2019 | Mcclendon |
| 10,432,559 B2 | 10/2019 | Baldwin et al. |
| 10,454,857 B1 | 10/2019 | Blackstock et al. |
| 10,475,225 B2 | 11/2019 | Park et al. |
| 10,496,661 B2 | 12/2019 | Morgan et al. |
| 10,504,266 B2 | 12/2019 | Blattner et al. |
| 10,573,048 B2 | 2/2020 | Ni et al. |
| 10,657,701 B2 | 5/2020 | Osman et al. |
| 10,803,527 B1 | 10/2020 | Zankat et al. |
| 10,805,248 B2 | 10/2020 | Luo et al. |
| 10,880,246 B2 | 12/2020 | Baldwin et al. |
| 10,938,758 B2 | 3/2021 | Allen et al. |
| 10,952,013 B1 | 3/2021 | Brody et al. |
| 10,963,529 B1 | 3/2021 | Amitay et al. |
| 10,979,375 B2 | 4/2021 | Young et al. |
| 10,984,569 B2 | 4/2021 | Bondich et al. |
| 11,048,916 B2 | 6/2021 | Gusarov et al. |
| 11,218,433 B2 | 1/2022 | Baldwin et al. |
| 11,229,849 B2 | 1/2022 | Blackstock et al. |
| 11,385,763 B2 | 7/2022 | Amitay et al. |
| 11,392,264 B1 | 7/2022 | Amitay et al. |
| 11,418,906 B2 | 8/2022 | Brody et al. |
| 11,425,068 B2 | 8/2022 | Collet et al. |
| 11,451,956 B1 | 9/2022 | Amitay et al. |
| 11,474,663 B2 | 10/2022 | Amitay et al. |
| 11,513,658 B1 | 11/2022 | Olsen et al. |
| 11,607,616 B2 | 3/2023 | Blackstock et al. |
| 11,631,276 B2 | 4/2023 | Gusarov et al. |
| 11,842,411 B2 | 12/2023 | Amitay et al. |
| 11,843,456 B2 | 12/2023 | Allen et al. |
| 11,870,743 B1 | 1/2024 | Blackstock et al. |
| 11,876,762 B1 | 1/2024 | Allen et al. |
| 11,893,647 B2 | 2/2024 | Brody et al. |
| 11,925,869 B2 | 3/2024 | Blackstock et al. |
| 12,113,760 B2 | 10/2024 | Allen et al. |
| 2002/0022506 A1 | 2/2002 | Rifkin |
| 2002/0024528 A1 | 2/2002 | Lambertsen |
| 2002/0029252 A1 | 3/2002 | Segan et al. |
| 2002/0035607 A1 | 3/2002 | Checkoway et al. |
| 2002/0047868 A1 | 4/2002 | Miyazawa |
| 2002/0059193 A1 | 5/2002 | Decime et al. |
| 2002/0067362 A1 | 6/2002 | Agostino Nocera et al. |
| 2002/0078456 A1 | 6/2002 | Hudson et al. |
| 2002/0087631 A1 | 7/2002 | Sharma |
| 2002/0097257 A1 | 7/2002 | Miller et al. |
| 2002/0122659 A1 | 9/2002 | Mcgrath et al. |
| 2002/0128047 A1 | 9/2002 | Gates |
| 2002/0144154 A1 | 10/2002 | Tomkow |
| 2002/0169644 A1 | 11/2002 | Greene |
| 2003/0001846 A1 | 1/2003 | Davis et al. |
| 2003/0016247 A1 | 1/2003 | Lai et al. |
| 2003/0017823 A1 | 1/2003 | Mager et al. |
| 2003/0020623 A1 | 1/2003 | Cao et al. |

(56)     References Cited

U.S. PATENT DOCUMENTS

| | | |
|---|---|---|
| 2003/0023874 A1 | 1/2003 | Prokupets et al. |
| 2003/0037124 A1 | 2/2003 | Yamaura et al. |
| 2003/0045334 A1 | 3/2003 | Hosokawa |
| 2003/0052925 A1 | 3/2003 | Daimon et al. |
| 2003/0101230 A1 | 5/2003 | Benschoter et al. |
| 2003/0110503 A1 | 6/2003 | Perkes |
| 2003/0126215 A1 | 7/2003 | Udell |
| 2003/0148773 A1 | 8/2003 | Spriestersbach et al. |
| 2003/0164856 A1 | 9/2003 | Prager et al. |
| 2003/0206171 A1 | 11/2003 | Kim et al. |
| 2003/0217106 A1 | 11/2003 | Adar et al. |
| 2003/0229607 A1 | 12/2003 | Zellweger et al. |
| 2004/0027371 A1 | 2/2004 | Jaeger |
| 2004/0064429 A1 | 4/2004 | Hirstius et al. |
| 2004/0078367 A1 | 4/2004 | Anderson et al. |
| 2004/0111467 A1 | 6/2004 | Willis |
| 2004/0158739 A1 | 8/2004 | Wakai et al. |
| 2004/0189465 A1 | 9/2004 | Capobianco et al. |
| 2004/0203959 A1 | 10/2004 | Coombes |
| 2004/0215625 A1 | 10/2004 | Svendsen et al. |
| 2004/0243531 A1 | 12/2004 | Dean |
| 2004/0243688 A1 | 12/2004 | Wugofski |
| 2005/0021444 A1 | 1/2005 | Bauer et al. |
| 2005/0022211 A1 | 1/2005 | Veselov et al. |
| 2005/0048989 A1 | 3/2005 | Jung |
| 2005/0078804 A1 | 4/2005 | Yomoda |
| 2005/0097176 A1 | 5/2005 | Schatz et al. |
| 2005/0102381 A1 | 5/2005 | Jiang et al. |
| 2005/0104976 A1 | 5/2005 | Currans |
| 2005/0114783 A1 | 5/2005 | Szeto |
| 2005/0119936 A1 | 6/2005 | Buchanan et al. |
| 2005/0122405 A1 | 6/2005 | Voss et al. |
| 2005/0143136 A1 | 6/2005 | Lev et al. |
| 2005/0144241 A1 | 6/2005 | Stata et al. |
| 2005/0162419 A1 | 7/2005 | Kim et al. |
| 2005/0182693 A1 | 8/2005 | Alivandi |
| 2005/0193340 A1 | 9/2005 | Amburgey et al. |
| 2005/0193345 A1 | 9/2005 | Klassen et al. |
| 2005/0198128 A1 | 9/2005 | Anderson |
| 2005/0206610 A1 | 9/2005 | Cordelli |
| 2005/0223066 A1 | 10/2005 | Buchheit et al. |
| 2005/0280660 A1 | 12/2005 | Seo et al. |
| 2005/0288954 A1 | 12/2005 | McCarthy et al. |
| 2006/0026067 A1 | 2/2006 | Nicholas et al. |
| 2006/0031412 A1 | 2/2006 | Adams et al. |
| 2006/0107297 A1 | 5/2006 | Toyama et al. |
| 2006/0114338 A1 | 6/2006 | Rothschild |
| 2006/0119882 A1 | 6/2006 | Harris et al. |
| 2006/0145944 A1 | 7/2006 | Tarlton et al. |
| 2006/0242239 A1 | 10/2006 | Morishima et al. |
| 2006/0252438 A1 | 11/2006 | Ansamaa et al. |
| 2006/0265417 A1 | 11/2006 | Amato et al. |
| 2006/0270419 A1 | 11/2006 | Crowley et al. |
| 2006/0287878 A1 | 12/2006 | Wadhwa et al. |
| 2006/0294465 A1 | 12/2006 | Ronen et al. |
| 2007/0004426 A1 | 1/2007 | Pfleging et al. |
| 2007/0011270 A1 | 1/2007 | Klein et al. |
| 2007/0038715 A1 | 2/2007 | Collins et al. |
| 2007/0040931 A1 | 2/2007 | Nishizawa |
| 2007/0064899 A1 | 3/2007 | Boss et al. |
| 2007/0073517 A1 | 3/2007 | Panje |
| 2007/0073823 A1 | 3/2007 | Cohen et al. |
| 2007/0075898 A1 | 4/2007 | Markhovsky et al. |
| 2007/0082707 A1 | 4/2007 | Flynt et al. |
| 2007/0113181 A1 | 5/2007 | Blattner et al. |
| 2007/0136228 A1 | 6/2007 | Petersen |
| 2007/0168863 A1 | 7/2007 | Blattner et al. |
| 2007/0174273 A1 | 7/2007 | Jones et al. |
| 2007/0176921 A1 | 8/2007 | Iwasaki et al. |
| 2007/0192128 A1 | 8/2007 | Celestini |
| 2007/0198340 A1 | 8/2007 | Lucovsky et al. |
| 2007/0198495 A1 | 8/2007 | Buron et al. |
| 2007/0208751 A1 | 9/2007 | Cowan et al. |
| 2007/0210936 A1 | 9/2007 | Nicholson |
| 2007/0214180 A1 | 9/2007 | Crawford |
| 2007/0214216 A1 | 9/2007 | Carrer et al. |
| 2007/0218987 A1 | 9/2007 | Luchene et al. |
| 2007/0233556 A1 | 10/2007 | Koningstein |
| 2007/0233801 A1 | 10/2007 | Eren et al. |
| 2007/0233859 A1 | 10/2007 | Zhao et al. |
| 2007/0243887 A1 | 10/2007 | Bandhole et al. |
| 2007/0244750 A1 | 10/2007 | Grannan et al. |
| 2007/0255456 A1 | 11/2007 | Funayama |
| 2007/0258656 A1 | 11/2007 | Aarabi et al. |
| 2007/0260984 A1 | 11/2007 | Marks et al. |
| 2007/0281690 A1 | 12/2007 | Altman et al. |
| 2008/0022329 A1 | 1/2008 | Glad |
| 2008/0025701 A1 | 1/2008 | Ikeda |
| 2008/0032703 A1 | 2/2008 | Krumm et al. |
| 2008/0033930 A1 | 2/2008 | Warren |
| 2008/0043041 A2 | 2/2008 | Hedenstroem et al. |
| 2008/0049704 A1 | 2/2008 | Witteman et al. |
| 2008/0055269 A1 | 3/2008 | Lemay et al. |
| 2008/0062141 A1 | 3/2008 | Chandhri |
| 2008/0070593 A1 | 3/2008 | Altman et al. |
| 2008/0076505 A1 | 3/2008 | Ngyen et al. |
| 2008/0092233 A1 | 4/2008 | Tian et al. |
| 2008/0094387 A1 | 4/2008 | Chen |
| 2008/0097979 A1 | 4/2008 | Heidloff et al. |
| 2008/0104503 A1 | 5/2008 | Beall et al. |
| 2008/0109159 A1 | 5/2008 | Shi et al. |
| 2008/0109844 A1 | 5/2008 | Baldeschweiler et al. |
| 2008/0120409 A1 | 5/2008 | Sun et al. |
| 2008/0147730 A1 | 6/2008 | Lee et al. |
| 2008/0148150 A1 | 6/2008 | Mall |
| 2008/0158222 A1 | 7/2008 | Li et al. |
| 2008/0158230 A1 | 7/2008 | Sharma et al. |
| 2008/0168033 A1 | 7/2008 | Ott et al. |
| 2008/0168489 A1 | 7/2008 | Schraga |
| 2008/0189177 A1 | 8/2008 | Anderton et al. |
| 2008/0195699 A1 | 8/2008 | Min et al. |
| 2008/0201638 A1 | 8/2008 | Nair |
| 2008/0207176 A1 | 8/2008 | Brackbill et al. |
| 2008/0208692 A1 | 8/2008 | Garaventi et al. |
| 2008/0209329 A1 | 8/2008 | Defranco et al. |
| 2008/0214210 A1 | 9/2008 | Rasanen et al. |
| 2008/0216092 A1 | 9/2008 | Serlet |
| 2008/0222108 A1 | 9/2008 | Prahlad et al. |
| 2008/0222545 A1 | 9/2008 | Lemay |
| 2008/0255976 A1 | 10/2008 | Altberg et al. |
| 2008/0256446 A1 | 10/2008 | Yamamoto |
| 2008/0256577 A1 | 10/2008 | Funaki et al. |
| 2008/0266421 A1 | 10/2008 | Takahata et al. |
| 2008/0270938 A1 | 10/2008 | Carlson |
| 2008/0288338 A1 | 11/2008 | Wiseman et al. |
| 2008/0306826 A1 | 12/2008 | Kramer et al. |
| 2008/0309617 A1 | 12/2008 | Kong et al. |
| 2008/0309675 A1 | 12/2008 | Fleury et al. |
| 2008/0313329 A1 | 12/2008 | Wang et al. |
| 2008/0313346 A1 | 12/2008 | Kujawa et al. |
| 2008/0318616 A1 | 12/2008 | Chipalkatti et al. |
| 2009/0006191 A1 | 1/2009 | Arankalle et al. |
| 2009/0006565 A1 | 1/2009 | Velusamy et al. |
| 2009/0013268 A1 | 1/2009 | Amit |
| 2009/0015703 A1 | 1/2009 | Kim et al. |
| 2009/0016617 A1 | 1/2009 | Bregman-amitai et al. |
| 2009/0024956 A1 | 1/2009 | Kobayashi |
| 2009/0030774 A1 | 1/2009 | Rothschild et al. |
| 2009/0030884 A1 | 1/2009 | Pulfer et al. |
| 2009/0030999 A1 | 1/2009 | Gatzke et al. |
| 2009/0036216 A1 | 2/2009 | Ratcliff |
| 2009/0040324 A1 | 2/2009 | Nonaka |
| 2009/0042588 A1 | 2/2009 | Lottin et al. |
| 2009/0044113 A1 | 2/2009 | Jones et al. |
| 2009/0047972 A1 | 2/2009 | Neeraj |
| 2009/0055484 A1 | 2/2009 | Vuong et al. |
| 2009/0058822 A1 | 3/2009 | Chaudhri |
| 2009/0070688 A1 | 3/2009 | Gyorfi et al. |
| 2009/0079743 A1 | 3/2009 | Pearson et al. |
| 2009/0079846 A1 | 3/2009 | Chou |
| 2009/0087035 A1 | 4/2009 | Wen et al. |
| 2009/0089678 A1 | 4/2009 | Sacco et al. |
| 2009/0089710 A1 | 4/2009 | Wood et al. |
| 2009/0093261 A1 | 4/2009 | Ziskind |

(56)　　　　　References Cited

U.S. PATENT DOCUMENTS

| | | |
|---|---|---|
| 2009/0099925 A1 | 4/2009 | Mehta et al. |
| 2009/0100367 A1 | 4/2009 | Dargahi et al. |
| 2009/0106672 A1 | 4/2009 | Burstrom |
| 2009/0132341 A1 | 5/2009 | Klinger |
| 2009/0132371 A1 | 5/2009 | Strietzel et al. |
| 2009/0132453 A1 | 5/2009 | Hangartner et al. |
| 2009/0132665 A1 | 5/2009 | Thomsen et al. |
| 2009/0144639 A1 | 6/2009 | Nims et al. |
| 2009/0148045 A1 | 6/2009 | Lee et al. |
| 2009/0150778 A1 | 6/2009 | Nicol |
| 2009/0153492 A1 | 6/2009 | Popp |
| 2009/0153552 A1 | 6/2009 | Fidaleo et al. |
| 2009/0157450 A1 | 6/2009 | Athsani et al. |
| 2009/0157752 A1 | 6/2009 | Gonzalez |
| 2009/0158150 A1 | 6/2009 | Lyle et al. |
| 2009/0158170 A1 | 6/2009 | Narayanan et al. |
| 2009/0160970 A1 | 6/2009 | Fredlund et al. |
| 2009/0163182 A1 | 6/2009 | Gatti et al. |
| 2009/0164459 A1 | 6/2009 | Jennings et al. |
| 2009/0175521 A1 | 7/2009 | Shadan et al. |
| 2009/0177299 A1 | 7/2009 | Van De Sluis |
| 2009/0177976 A1 | 7/2009 | Bokor et al. |
| 2009/0192900 A1 | 7/2009 | Collision |
| 2009/0199242 A1 | 8/2009 | Johnson et al. |
| 2009/0202114 A1 | 8/2009 | Morin et al. |
| 2009/0215469 A1 | 8/2009 | Fisher et al. |
| 2009/0228811 A1 | 9/2009 | Adams et al. |
| 2009/0232354 A1 | 9/2009 | Camp, Jr. et al. |
| 2009/0234815 A1 | 9/2009 | Boerries et al. |
| 2009/0239552 A1 | 9/2009 | Churchill et al. |
| 2009/0249222 A1 | 10/2009 | Schmidt et al. |
| 2009/0249244 A1 | 10/2009 | Robinson et al. |
| 2009/0254840 A1 | 10/2009 | Churchill et al. |
| 2009/0254859 A1 | 10/2009 | Arrasvuori et al. |
| 2009/0265604 A1 | 10/2009 | Howard et al. |
| 2009/0265647 A1 | 10/2009 | Martin et al. |
| 2009/0284551 A1 | 11/2009 | Stanton |
| 2009/0288022 A1 | 11/2009 | Almstrand et al. |
| 2009/0291672 A1 | 11/2009 | Treves et al. |
| 2009/0292608 A1 | 11/2009 | Polachek |
| 2009/0300525 A1 | 12/2009 | Jolliff et al. |
| 2009/0303984 A1 | 12/2009 | Clark et al. |
| 2009/0319178 A1 | 12/2009 | Khosravy et al. |
| 2009/0319607 A1 | 12/2009 | Belz et al. |
| 2009/0327073 A1 | 12/2009 | Li |
| 2009/0328122 A1 | 12/2009 | Amento et al. |
| 2010/0009747 A1 | 1/2010 | Reville et al. |
| 2010/0010951 A1 | 1/2010 | Miyazaki et al. |
| 2010/0011422 A1 | 1/2010 | Mason et al. |
| 2010/0023885 A1* | 1/2010 | Reville ................... A63F 13/79 |
| | | 715/764 |
| 2010/0026698 A1 | 2/2010 | Reville et al. |
| 2010/0045660 A1 | 2/2010 | Dettinger et al. |
| 2010/0045697 A1 | 2/2010 | Reville et al. |
| 2010/0048358 A1 | 2/2010 | Tchao et al. |
| 2010/0058212 A1 | 3/2010 | Belitz et al. |
| 2010/0062794 A1 | 3/2010 | Han |
| 2010/0066746 A1* | 3/2010 | Fujioka ................... A63F 13/63 |
| | | 345/473 |
| 2010/0070858 A1 | 3/2010 | Malik et al. |
| 2010/0073458 A1 | 3/2010 | Pace |
| 2010/0082427 A1 | 4/2010 | Burgener et al. |
| 2010/0082693 A1 | 4/2010 | Hugg et al. |
| 2010/0083138 A1 | 4/2010 | Dawson et al. |
| 2010/0083140 A1 | 4/2010 | Dawson et al. |
| 2010/0083148 A1 | 4/2010 | Finn et al. |
| 2010/0100568 A1 | 4/2010 | Papin et al. |
| 2010/0100828 A1 | 4/2010 | Khandelwal et al. |
| 2010/0113065 A1 | 5/2010 | Narayan et al. |
| 2010/0115422 A1 | 5/2010 | Schroeter et al. |
| 2010/0115426 A1 | 5/2010 | Liu et al. |
| 2010/0121915 A1 | 5/2010 | Wang |
| 2010/0130233 A1 | 5/2010 | Parker |
| 2010/0131880 A1 | 5/2010 | Lee et al. |
| 2010/0131895 A1 | 5/2010 | Wohlert |
| 2010/0138755 A1 | 6/2010 | Kulkarni et al. |
| 2010/0146407 A1 | 6/2010 | Bokor et al. |
| 2010/0153144 A1 | 6/2010 | Miller et al. |
| 2010/0153868 A1 | 6/2010 | Allen et al. |
| 2010/0159944 A1 | 6/2010 | Pascal et al. |
| 2010/0161658 A1 | 6/2010 | Hamynen et al. |
| 2010/0161831 A1 | 6/2010 | Haas et al. |
| 2010/0162149 A1 | 6/2010 | Sheleheda et al. |
| 2010/0179953 A1 | 7/2010 | Kan et al. |
| 2010/0179991 A1 | 7/2010 | Lorch et al. |
| 2010/0183280 A1 | 7/2010 | Beauregard et al. |
| 2010/0185552 A1 | 7/2010 | Deluca et al. |
| 2010/0185640 A1 | 7/2010 | Dettinger et al. |
| 2010/0185665 A1 | 7/2010 | Horn et al. |
| 2010/0191631 A1 | 7/2010 | Weidmann |
| 2010/0197318 A1 | 8/2010 | Petersen et al. |
| 2010/0197319 A1 | 8/2010 | Petersen et al. |
| 2010/0197396 A1* | 8/2010 | Fujii ..................... A63F 13/10 |
| | | 463/31 |
| 2010/0198683 A1 | 8/2010 | Aarabi |
| 2010/0198694 A1 | 8/2010 | Muthukrishnan |
| 2010/0198826 A1 | 8/2010 | Petersen et al. |
| 2010/0198828 A1 | 8/2010 | Petersen et al. |
| 2010/0198862 A1 | 8/2010 | Jennings et al. |
| 2010/0198870 A1 | 8/2010 | Petersen et al. |
| 2010/0198917 A1 | 8/2010 | Petersen et al. |
| 2010/0201482 A1 | 8/2010 | Robertson et al. |
| 2010/0201536 A1 | 8/2010 | Robertson et al. |
| 2010/0203968 A1 | 8/2010 | Gill et al. |
| 2010/0214436 A1 | 8/2010 | Kim et al. |
| 2010/0223128 A1 | 9/2010 | Dukellis et al. |
| 2010/0223343 A1 | 9/2010 | Bosan et al. |
| 2010/0227682 A1 | 9/2010 | Reville et al. |
| 2010/0250109 A1 | 9/2010 | Johnston et al. |
| 2010/0257196 A1 | 10/2010 | Waters et al. |
| 2010/0259386 A1 | 10/2010 | Holley et al. |
| 2010/0262915 A1 | 10/2010 | Bocking et al. |
| 2010/0273509 A1 | 10/2010 | Sweeney et al. |
| 2010/0274724 A1 | 10/2010 | Bible, Jr. et al. |
| 2010/0279713 A1 | 11/2010 | Dicke |
| 2010/0281045 A1 | 11/2010 | Dean |
| 2010/0281433 A1 | 11/2010 | Moody et al. |
| 2010/0290756 A1 | 11/2010 | Karaoguz et al. |
| 2010/0299060 A1 | 11/2010 | Snavely et al. |
| 2010/0306669 A1 | 12/2010 | Della Pasqua |
| 2010/0332980 A1 | 12/2010 | Sun et al. |
| 2011/0004071 A1 | 1/2011 | Faiola et al. |
| 2011/0010205 A1 | 1/2011 | Richards |
| 2011/0022965 A1 | 1/2011 | Lawrence et al. |
| 2011/0029512 A1 | 2/2011 | Folgner et al. |
| 2011/0040783 A1 | 2/2011 | Uemichi et al. |
| 2011/0040804 A1 | 2/2011 | Peirce et al. |
| 2011/0047404 A1 | 2/2011 | Metzler et al. |
| 2011/0047505 A1 | 2/2011 | Fillion et al. |
| 2011/0050909 A1 | 3/2011 | Ellenby et al. |
| 2011/0050915 A1 | 3/2011 | Wang et al. |
| 2011/0064388 A1 | 3/2011 | Brown et al. |
| 2011/0066664 A1 | 3/2011 | Goldman et al. |
| 2011/0066743 A1 | 3/2011 | Hurley et al. |
| 2011/0083101 A1 | 4/2011 | Sharon et al. |
| 2011/0093780 A1 | 4/2011 | Dunn |
| 2011/0099507 A1 | 4/2011 | Nesladek et al. |
| 2011/0102630 A1 | 5/2011 | Rukes |
| 2011/0113323 A1 | 5/2011 | Fillion et al. |
| 2011/0115798 A1 | 5/2011 | Nayar et al. |
| 2011/0119133 A1 | 5/2011 | Igelman et al. |
| 2011/0126096 A1 | 5/2011 | Ohashi et al. |
| 2011/0137881 A1 | 6/2011 | Cheng et al. |
| 2011/0145564 A1 | 6/2011 | Moshir et al. |
| 2011/0148864 A1 | 6/2011 | Lee et al. |
| 2011/0153759 A1 | 6/2011 | Rathod |
| 2011/0159890 A1 | 6/2011 | Fortescue et al. |
| 2011/0161076 A1 | 6/2011 | Davis et al. |
| 2011/0164163 A1 | 7/2011 | Bilbrey et al. |
| 2011/0167125 A1 | 7/2011 | Achlioptas |
| 2011/0197194 A1 | 8/2011 | D'Angelo et al. |
| 2011/0202598 A1 | 8/2011 | Evans et al. |
| 2011/0202968 A1 | 8/2011 | Nurmi |
| 2011/0211534 A1 | 9/2011 | Schmidt et al. |

(56)  References Cited

U.S. PATENT DOCUMENTS

| | | | |
|---|---|---|---|
| 2011/0211764 A1 | 9/2011 | Krupka et al. | |
| 2011/0213845 A1 | 9/2011 | Logan et al. | |
| 2011/0215966 A1 | 9/2011 | Kim et al. | |
| 2011/0225048 A1 | 9/2011 | Nair | |
| 2011/0238762 A1 | 9/2011 | Soni et al. | |
| 2011/0238763 A1 | 9/2011 | Shin et al. | |
| 2011/0239136 A1 | 9/2011 | Goldman et al. | |
| 2011/0239143 A1 | 9/2011 | Ye et al. | |
| 2011/0244952 A1 | 10/2011 | Schueller et al. | |
| 2011/0246330 A1 | 10/2011 | Tikku et al. | |
| 2011/0248992 A1* | 10/2011 | Van Os | G06F 3/0482 |
| | | | 345/650 |
| 2011/0249891 A1 | 10/2011 | Li | |
| 2011/0255736 A1 | 10/2011 | Thompson et al. | |
| 2011/0273575 A1 | 11/2011 | Lee | |
| 2011/0282799 A1 | 11/2011 | Huston | |
| 2011/0283188 A1 | 11/2011 | Farrenkopf | |
| 2011/0285703 A1 | 11/2011 | Jin | |
| 2011/0286586 A1 | 11/2011 | Saylor et al. | |
| 2011/0292051 A1 | 12/2011 | Nelson et al. | |
| 2011/0300837 A1 | 12/2011 | Misiag | |
| 2011/0314419 A1 | 12/2011 | Dunn et al. | |
| 2011/0320373 A1 | 12/2011 | Lee et al. | |
| 2012/0013770 A1 | 1/2012 | Stafford et al. | |
| 2012/0015673 A1 | 1/2012 | Klassen et al. | |
| 2012/0028659 A1 | 2/2012 | Whitney et al. | |
| 2012/0033718 A1 | 2/2012 | Kauffman et al. | |
| 2012/0036015 A1 | 2/2012 | Sheikh | |
| 2012/0036443 A1 | 2/2012 | Ohmori et al. | |
| 2012/0054646 A1* | 3/2012 | Hoomani | H04L 51/04 |
| | | | 715/758 |
| 2012/0054797 A1 | 3/2012 | Skog et al. | |
| 2012/0059722 A1 | 3/2012 | Rao | |
| 2012/0059826 A1 | 3/2012 | Mate et al. | |
| 2012/0062805 A1 | 3/2012 | Candelore | |
| 2012/0069028 A1 | 3/2012 | Bouguerra | |
| 2012/0084731 A1 | 4/2012 | Filman et al. | |
| 2012/0084835 A1 | 4/2012 | Thomas et al. | |
| 2012/0099800 A1 | 4/2012 | Llano et al. | |
| 2012/0108293 A1 | 5/2012 | Law et al. | |
| 2012/0110002 A1 | 5/2012 | Giambalvo et al. | |
| 2012/0110096 A1 | 5/2012 | Smarr et al. | |
| 2012/0113106 A1 | 5/2012 | Choi et al. | |
| 2012/0113143 A1 | 5/2012 | Adhikari et al. | |
| 2012/0113272 A1 | 5/2012 | Hata | |
| 2012/0123830 A1 | 5/2012 | Svendsen et al. | |
| 2012/0123871 A1 | 5/2012 | Svendsen et al. | |
| 2012/0123875 A1 | 5/2012 | Svendsen et al. | |
| 2012/0124126 A1 | 5/2012 | Alcazar et al. | |
| 2012/0124176 A1 | 5/2012 | Curtis et al. | |
| 2012/0124458 A1 | 5/2012 | Cruzada | |
| 2012/0130717 A1 | 5/2012 | Xu et al. | |
| 2012/0131502 A1 | 5/2012 | Bock et al. | |
| 2012/0131507 A1 | 5/2012 | Sparandara et al. | |
| 2012/0131512 A1 | 5/2012 | Takeuchi et al. | |
| 2012/0139830 A1 | 6/2012 | Hwang et al. | |
| 2012/0141046 A1 | 6/2012 | Chen et al. | |
| 2012/0143760 A1 | 6/2012 | Abulafia et al. | |
| 2012/0150978 A1 | 6/2012 | Monaco | |
| 2012/0165100 A1 | 6/2012 | Lalancette et al. | |
| 2012/0166971 A1 | 6/2012 | Sachson et al. | |
| 2012/0169855 A1 | 7/2012 | Oh | |
| 2012/0172062 A1 | 7/2012 | Altman et al. | |
| 2012/0173991 A1 | 7/2012 | Roberts et al. | |
| 2012/0176401 A1 | 7/2012 | Hayward et al. | |
| 2012/0184248 A1 | 7/2012 | Speede | |
| 2012/0197724 A1 | 8/2012 | Kendall | |
| 2012/0200743 A1 | 8/2012 | Blanchflower et al. | |
| 2012/0209921 A1 | 8/2012 | Adafin et al. | |
| 2012/0209924 A1 | 8/2012 | Evans et al. | |
| 2012/0210244 A1 | 8/2012 | De Francisco Lopez et al. | |
| 2012/0212632 A1 | 8/2012 | Mate et al. | |
| 2012/0215879 A1 | 8/2012 | Bozo | |
| 2012/0220264 A1 | 8/2012 | Kawabata | |
| 2012/0221687 A1 | 8/2012 | Hunter et al. | |
| 2012/0223940 A1 | 9/2012 | Dunstan et al. | |
| 2012/0226748 A1 | 9/2012 | Bosworth et al. | |
| 2012/0229506 A1 | 9/2012 | Nishikawa | |
| 2012/0233000 A1 | 9/2012 | Fisher et al. | |
| 2012/0236162 A1 | 9/2012 | Imamura | |
| 2012/0239761 A1 | 9/2012 | Linner et al. | |
| 2012/0250951 A1 | 10/2012 | Chen | |
| 2012/0252418 A1 | 10/2012 | Kandekar et al. | |
| 2012/0254325 A1 | 10/2012 | Majeti et al. | |
| 2012/0271883 A1 | 10/2012 | Montoya et al. | |
| 2012/0278387 A1 | 11/2012 | Garcia et al. | |
| 2012/0278692 A1 | 11/2012 | Shi | |
| 2012/0290637 A1 | 11/2012 | Perantatos et al. | |
| 2012/0290977 A1 | 11/2012 | Devecka | |
| 2012/0299954 A1 | 11/2012 | Wada et al. | |
| 2012/0304052 A1 | 11/2012 | Tanaka et al. | |
| 2012/0304080 A1 | 11/2012 | Wormald et al. | |
| 2012/0307096 A1 | 12/2012 | Ford et al. | |
| 2012/0307112 A1 | 12/2012 | Kunishige et al. | |
| 2012/0309520 A1 | 12/2012 | Evertt et al. | |
| 2012/0310791 A1 | 12/2012 | Weerasinghe | |
| 2012/0315987 A1 | 12/2012 | Walling | |
| 2012/0319904 A1 | 12/2012 | Lee et al. | |
| 2012/0323933 A1 | 12/2012 | He et al. | |
| 2012/0324018 A1 | 12/2012 | Metcalf et al. | |
| 2013/0006759 A1 | 1/2013 | Srivastava et al. | |
| 2013/0024757 A1 | 1/2013 | Doll et al. | |
| 2013/0031180 A1 | 1/2013 | Abendroth et al. | |
| 2013/0036165 A1 | 2/2013 | Tseng et al. | |
| 2013/0036364 A1 | 2/2013 | Johnson | |
| 2013/0045753 A1 | 2/2013 | Obermeyer et al. | |
| 2013/0050260 A1 | 2/2013 | Reitan | |
| 2013/0055083 A1 | 2/2013 | Fino | |
| 2013/0057587 A1 | 3/2013 | Leonard et al. | |
| 2013/0059607 A1 | 3/2013 | Herz et al. | |
| 2013/0060690 A1 | 3/2013 | Oskolkov et al. | |
| 2013/0063369 A1 | 3/2013 | Malhotra et al. | |
| 2013/0067027 A1 | 3/2013 | Song et al. | |
| 2013/0071093 A1 | 3/2013 | Hanks et al. | |
| 2013/0073970 A1 | 3/2013 | Plantino et al. | |
| 2013/0073984 A1 | 3/2013 | Lessin et al. | |
| 2013/0080254 A1 | 3/2013 | Thramann | |
| 2013/0085790 A1 | 4/2013 | Palmer et al. | |
| 2013/0086072 A1 | 4/2013 | Peng et al. | |
| 2013/0090171 A1 | 4/2013 | Holton et al. | |
| 2013/0095857 A1 | 4/2013 | Garcia et al. | |
| 2013/0097547 A1 | 4/2013 | Ohwa et al. | |
| 2013/0103760 A1 | 4/2013 | Golding et al. | |
| 2013/0103766 A1 | 4/2013 | Gupta | |
| 2013/0104053 A1 | 4/2013 | Thornton et al. | |
| 2013/0110631 A1 | 5/2013 | Mitchell et al. | |
| 2013/0110885 A1 | 5/2013 | Brundrett, III | |
| 2013/0111354 A1 | 5/2013 | Marra et al. | |
| 2013/0111514 A1 | 5/2013 | Slavin et al. | |
| 2013/0124091 A1 | 5/2013 | Matas et al. | |
| 2013/0128059 A1 | 5/2013 | Kristensson | |
| 2013/0129084 A1 | 5/2013 | Appleton | |
| 2013/0129252 A1 | 5/2013 | Lauper | |
| 2013/0132477 A1 | 5/2013 | Bosworth et al. | |
| 2013/0141463 A1 | 6/2013 | Barnett et al. | |
| 2013/0145286 A1 | 6/2013 | Feng et al. | |
| 2013/0151988 A1 | 6/2013 | Sorin et al. | |
| 2013/0152000 A1 | 6/2013 | Liu et al. | |
| 2013/0155169 A1 | 6/2013 | Hoover et al. | |
| 2013/0159110 A1 | 6/2013 | Rajaram et al. | |
| 2013/0159919 A1 | 6/2013 | Leydon | |
| 2013/0169822 A1 | 7/2013 | Zhu et al. | |
| 2013/0173729 A1 | 7/2013 | Starenky et al. | |
| 2013/0174059 A1 | 7/2013 | Van Wie et al. | |
| 2013/0179520 A1 | 7/2013 | Lee et al. | |
| 2013/0182133 A1 | 7/2013 | Tanabe | |
| 2013/0185131 A1 | 7/2013 | Sinha et al. | |
| 2013/0191198 A1 | 7/2013 | Carlson et al. | |
| 2013/0194280 A1 | 8/2013 | Kwon et al. | |
| 2013/0194301 A1 | 8/2013 | Robbins et al. | |
| 2013/0198176 A1 | 8/2013 | Kim | |
| 2013/0198210 A1 | 8/2013 | Lee et al. | |
| 2013/0201187 A1 | 8/2013 | Tong et al. | |
| 2013/0218965 A1 | 8/2013 | Abrol et al. | |

(56) References Cited

U.S. PATENT DOCUMENTS

| | | |
|---|---|---|
| 2013/0218968 A1 | 8/2013 | Mcevilly et al. |
| 2013/0222323 A1 | 8/2013 | Mckenzie |
| 2013/0227476 A1 | 8/2013 | Frey |
| 2013/0232194 A1 | 9/2013 | Knapp et al. |
| 2013/0249948 A1 | 9/2013 | Reitan |
| 2013/0257876 A1 | 10/2013 | Davis |
| 2013/0257877 A1 | 10/2013 | Davis |
| 2013/0258040 A1 | 10/2013 | Kaytaz et al. |
| 2013/0258117 A1 | 10/2013 | Penov et al. |
| 2013/0260800 A1 | 10/2013 | Asakawa et al. |
| 2013/0263031 A1 | 10/2013 | Oshiro et al. |
| 2013/0265450 A1 | 10/2013 | Barnes, Jr. |
| 2013/0267253 A1 | 10/2013 | Case et al. |
| 2013/0275505 A1 | 10/2013 | Gauglitz et al. |
| 2013/0288757 A1 | 10/2013 | Guthridge et al. |
| 2013/0290443 A1 | 10/2013 | Collins et al. |
| 2013/0304646 A1 | 11/2013 | De Geer |
| 2013/0311255 A1 | 11/2013 | Cummins et al. |
| 2013/0311452 A1 | 11/2013 | Jacoby |
| 2013/0325964 A1 | 12/2013 | Berberat |
| 2013/0332068 A1 | 12/2013 | Kesar et al. |
| 2013/0339868 A1 | 12/2013 | Sharpe et al. |
| 2013/0344896 A1 | 12/2013 | Kirmse et al. |
| 2013/0344961 A1 | 12/2013 | Iannetta |
| 2013/0346869 A1 | 12/2013 | Asver et al. |
| 2013/0346877 A1 | 12/2013 | Borovoy et al. |
| 2014/0006129 A1 | 1/2014 | Heath |
| 2014/0011538 A1 | 1/2014 | Mulcahy et al. |
| 2014/0011576 A1 | 1/2014 | Barbalet et al. |
| 2014/0019264 A1 | 1/2014 | Wachman et al. |
| 2014/0032682 A1 | 1/2014 | Prado et al. |
| 2014/0035913 A1 | 2/2014 | Higgins et al. |
| 2014/0039842 A1 | 2/2014 | Yuen et al. |
| 2014/0040066 A1 | 2/2014 | Fujioka |
| 2014/0043204 A1 | 2/2014 | Basnayake et al. |
| 2014/0043329 A1 | 2/2014 | Wang et al. |
| 2014/0045530 A1 | 2/2014 | Gordon et al. |
| 2014/0047016 A1 | 2/2014 | Rao |
| 2014/0047045 A1 | 2/2014 | Baldwin et al. |
| 2014/0047335 A1 | 2/2014 | Lewis et al. |
| 2014/0049652 A1 | 2/2014 | Moon et al. |
| 2014/0052485 A1 | 2/2014 | Shidfar |
| 2014/0052633 A1 | 2/2014 | Gandhi |
| 2014/0052794 A1 | 2/2014 | Tucker et al. |
| 2014/0055554 A1 | 2/2014 | Du et al. |
| 2014/0057660 A1 | 2/2014 | Wager |
| 2014/0082651 A1 | 3/2014 | Sharifi |
| 2014/0085293 A1 | 3/2014 | Konoplev et al. |
| 2014/0092130 A1 | 4/2014 | Anderson et al. |
| 2014/0095293 A1 | 4/2014 | Abhyanker |
| 2014/0096029 A1 | 4/2014 | Schultz |
| 2014/0114565 A1 | 4/2014 | Aziz et al. |
| 2014/0122658 A1 | 5/2014 | Haeger et al. |
| 2014/0122787 A1 | 5/2014 | Shalvi et al. |
| 2014/0125678 A1 | 5/2014 | Wang et al. |
| 2014/0128166 A1 | 5/2014 | Tam et al. |
| 2014/0129343 A1 | 5/2014 | Finster et al. |
| 2014/0129953 A1 | 5/2014 | Spiegel |
| 2014/0141889 A1 | 5/2014 | Chowdhary et al. |
| 2014/0143143 A1 | 5/2014 | Fasoli et al. |
| 2014/0143241 A1 | 5/2014 | Barello et al. |
| 2014/0149519 A1 | 5/2014 | Redfern et al. |
| 2014/0155102 A1 | 6/2014 | Cooper et al. |
| 2014/0157139 A1 | 6/2014 | Coroy et al. |
| 2014/0160149 A1 | 6/2014 | Blackstock et al. |
| 2014/0173424 A1 | 6/2014 | Hogeg et al. |
| 2014/0173457 A1 | 6/2014 | Wang et al. |
| 2014/0176662 A1 | 6/2014 | Goodman |
| 2014/0189592 A1 | 7/2014 | Benchenaa et al. |
| 2014/0199970 A1 | 7/2014 | Klotz |
| 2014/0201527 A1 | 7/2014 | Krivorot |
| 2014/0207679 A1 | 7/2014 | Cho |
| 2014/0214471 A1 | 7/2014 | Schreiner, III |
| 2014/0218394 A1 | 8/2014 | Hochmuth et al. |
| 2014/0221089 A1 | 8/2014 | Fortkort |
| 2014/0222564 A1 | 8/2014 | Kranendonk et al. |
| 2014/0223372 A1 | 8/2014 | Dostie et al. |
| 2014/0258405 A1 | 9/2014 | Perkin |
| 2014/0265359 A1 | 9/2014 | Cheng et al. |
| 2014/0266703 A1 | 9/2014 | Dalley, Jr. et al. |
| 2014/0279061 A1 | 9/2014 | Elimellah et al. |
| 2014/0279436 A1 | 9/2014 | Dorsey et al. |
| 2014/0279540 A1 | 9/2014 | Jackson |
| 2014/0280058 A1 | 9/2014 | St. Clair |
| 2014/0280537 A1 | 9/2014 | Pridmore et al. |
| 2014/0282096 A1 | 9/2014 | Rubinstein et al. |
| 2014/0287779 A1 | 9/2014 | O'Keefe et al. |
| 2014/0289216 A1 | 9/2014 | Voellmer et al. |
| 2014/0289833 A1 | 9/2014 | Briceno |
| 2014/0306884 A1 | 10/2014 | Sano et al. |
| 2014/0306986 A1 | 10/2014 | Gottesman et al. |
| 2014/0317302 A1 | 10/2014 | Naik |
| 2014/0324627 A1 | 10/2014 | Haver et al. |
| 2014/0324629 A1 | 10/2014 | Jacobs |
| 2014/0325383 A1 | 10/2014 | Brown et al. |
| 2014/0347368 A1 | 11/2014 | Kishore et al. |
| 2014/0359024 A1 | 12/2014 | Spiegel |
| 2014/0359032 A1 | 12/2014 | Spiegel et al. |
| 2014/0362091 A1 | 12/2014 | Bouaziz et al. |
| 2014/0372420 A1 | 12/2014 | Slep |
| 2014/0380195 A1 | 12/2014 | Graham et al. |
| 2015/0005064 A1 | 1/2015 | Lee et al. |
| 2015/0005066 A1 | 1/2015 | Krauss et al. |
| 2015/0020086 A1 | 1/2015 | Chen et al. |
| 2015/0038806 A1 | 2/2015 | Kaleal, III et al. |
| 2015/0042663 A1 | 2/2015 | Mandel et al. |
| 2015/0046278 A1 | 2/2015 | Pei et al. |
| 2015/0067880 A1 | 3/2015 | Ward et al. |
| 2015/0071619 A1 | 3/2015 | Brough |
| 2015/0081694 A1 | 3/2015 | Friedlander et al. |
| 2015/0084984 A1 | 3/2015 | Tomii et al. |
| 2015/0086087 A1 | 3/2015 | Ricanek, Jr. et al. |
| 2015/0087263 A1 | 3/2015 | Branscomb et al. |
| 2015/0088464 A1 | 3/2015 | Yuen et al. |
| 2015/0088622 A1 | 3/2015 | Ganschow et al. |
| 2015/0095020 A1 | 4/2015 | Leydon |
| 2015/0096042 A1 | 4/2015 | Mizrachi |
| 2015/0116529 A1 | 4/2015 | Wu et al. |
| 2015/0121251 A1 | 4/2015 | Kadirvel et al. |
| 2015/0123967 A1 | 5/2015 | Quinn et al. |
| 2015/0155007 A1 | 6/2015 | Barfield, Jr. et al. |
| 2015/0160832 A1 | 6/2015 | Walkin et al. |
| 2015/0169139 A1 | 6/2015 | Leva et al. |
| 2015/0169142 A1 | 6/2015 | Longo et al. |
| 2015/0169827 A1 | 6/2015 | Laborde |
| 2015/0169938 A1 | 6/2015 | Yao et al. |
| 2015/0172393 A1 | 6/2015 | Oplinger et al. |
| 2015/0172534 A1 | 6/2015 | Miyakawa et al. |
| 2015/0178260 A1 | 6/2015 | Brunson |
| 2015/0181380 A1 | 6/2015 | Altman et al. |
| 2015/0193522 A1 | 7/2015 | Chol et al. |
| 2015/0193585 A1 | 7/2015 | Sunna |
| 2015/0193819 A1 | 7/2015 | Chang |
| 2015/0195235 A1 | 7/2015 | Trussel et al. |
| 2015/0199082 A1 | 7/2015 | Scholler et al. |
| 2015/0201030 A1 | 7/2015 | Longo et al. |
| 2015/0206349 A1 | 7/2015 | Rosenthal et al. |
| 2015/0213604 A1 | 7/2015 | Li et al. |
| 2015/0220774 A1 | 8/2015 | Ebersman et al. |
| 2015/0222814 A1 | 8/2015 | Li et al. |
| 2015/0227602 A1 | 8/2015 | Ramu et al. |
| 2015/0232065 A1 | 8/2015 | Ricci et al. |
| 2015/0234942 A1 | 8/2015 | Harmon |
| 2015/0245168 A1 | 8/2015 | Martin |
| 2015/0261917 A1 | 9/2015 | Smith |
| 2015/0264432 A1 | 9/2015 | Cheng |
| 2015/0279098 A1 | 10/2015 | Kim et al. |
| 2015/0295866 A1 | 10/2015 | Collet et al. |
| 2015/0304806 A1 | 10/2015 | Vincent |
| 2015/0312184 A1 | 10/2015 | Langholz et al. |
| 2015/0324348 A1 | 11/2015 | Peterson et al. |
| 2015/0334077 A1 | 11/2015 | Feldman |
| 2015/0342266 A1 | 12/2015 | Cooper et al. |
| 2015/0347519 A1 | 12/2015 | Hornkvist et al. |

(56) References Cited

U.S. PATENT DOCUMENTS

| | | |
|---|---|---|
| 2015/0350136 A1 | 12/2015 | Flynn, III et al. |
| 2015/0350262 A1 | 12/2015 | Rainisto et al. |
| 2015/0365795 A1 | 12/2015 | Allen et al. |
| 2015/0369623 A1 | 12/2015 | Blumenberg et al. |
| 2015/0370830 A1 | 12/2015 | Murphy-Chutorian et al. |
| 2015/0378502 A1 | 12/2015 | Hu et al. |
| 2016/0006927 A1 | 1/2016 | Sehn |
| 2016/0012066 A1 | 1/2016 | Ning et al. |
| 2016/0014063 A1 | 1/2016 | Hogeg et al. |
| 2016/0021153 A1 | 1/2016 | Hull et al. |
| 2016/0035111 A1 | 2/2016 | Ingrassia et al. |
| 2016/0042548 A1 | 2/2016 | Du et al. |
| 2016/0045834 A1 | 2/2016 | Burns |
| 2016/0050169 A1 | 2/2016 | Ben et al. |
| 2016/0077603 A1 | 3/2016 | Rinfret et al. |
| 2016/0078095 A1 | 3/2016 | Man et al. |
| 2016/0080438 A1 | 3/2016 | Liang |
| 2016/0085773 A1 | 3/2016 | Chang et al. |
| 2016/0085863 A1 | 3/2016 | Allen et al. |
| 2016/0086500 A1 | 3/2016 | Kaleal, III |
| 2016/0086670 A1 | 3/2016 | Gross et al. |
| 2016/0092035 A1 | 3/2016 | Crocker et al. |
| 2016/0093078 A1 | 3/2016 | Davis et al. |
| 2016/0099901 A1 | 4/2016 | Allen et al. |
| 2016/0110922 A1 | 4/2016 | Haring |
| 2016/0134840 A1 | 5/2016 | Mcculloch |
| 2016/0158600 A1 | 6/2016 | Rolley |
| 2016/0163084 A1 | 6/2016 | Corazza et al. |
| 2016/0164823 A1 | 6/2016 | Nordstrom et al. |
| 2016/0179297 A1 | 6/2016 | Lundin et al. |
| 2016/0179823 A1 | 6/2016 | Yang |
| 2016/0180391 A1 | 6/2016 | Zabaneh |
| 2016/0180447 A1 | 6/2016 | Kamalie et al. |
| 2016/0180887 A1 | 6/2016 | Sehn |
| 2016/0182422 A1 | 6/2016 | Sehn et al. |
| 2016/0182875 A1 | 6/2016 | Sehn |
| 2016/0188997 A1 | 6/2016 | Desnoyer et al. |
| 2016/0189310 A1 | 6/2016 | O'kane |
| 2016/0210500 A1 | 7/2016 | Feng et al. |
| 2016/0217292 A1 | 7/2016 | Faaborg et al. |
| 2016/0217784 A1 | 7/2016 | Gelfenbeyn et al. |
| 2016/0234060 A1 | 8/2016 | Pai et al. |
| 2016/0234149 A1 | 8/2016 | Tsuda et al. |
| 2016/0239248 A1 | 8/2016 | Sehn |
| 2016/0241500 A1 | 8/2016 | Bostick et al. |
| 2016/0241504 A1 | 8/2016 | Raji et al. |
| 2016/0253807 A1 | 9/2016 | Jones et al. |
| 2016/0275721 A1 | 9/2016 | Park et al. |
| 2016/0277419 A1 | 9/2016 | Allen et al. |
| 2016/0286244 A1 | 9/2016 | Chang et al. |
| 2016/0292273 A1 | 10/2016 | Murphy et al. |
| 2016/0292905 A1 | 10/2016 | Nehmadi et al. |
| 2016/0294891 A1 | 10/2016 | Miller |
| 2016/0298982 A1 | 10/2016 | Bailiang |
| 2016/0313957 A1 | 10/2016 | Ebert et al. |
| 2016/0314759 A1 | 10/2016 | Shin et al. |
| 2016/0321708 A1 | 11/2016 | Sehn |
| 2016/0343160 A1 | 11/2016 | Blattner et al. |
| 2016/0350297 A1 | 12/2016 | Riza |
| 2016/0357578 A1 | 12/2016 | Kim et al. |
| 2016/0359957 A1 | 12/2016 | Laliberte |
| 2016/0359987 A1 | 12/2016 | Laliberte |
| 2016/0359993 A1 | 12/2016 | Hendrickson et al. |
| 2016/0378278 A1 | 12/2016 | Sirpal |
| 2016/0379415 A1 | 12/2016 | Espeset et al. |
| 2017/0006094 A1 | 1/2017 | Abou Mahmoud et al. |
| 2017/0006322 A1 | 1/2017 | Dury et al. |
| 2017/0010768 A1 | 1/2017 | Watson et al. |
| 2017/0027528 A1 | 2/2017 | Kaleal, III et al. |
| 2017/0034173 A1 | 2/2017 | Miller et al. |
| 2017/0039452 A1 | 2/2017 | Osindero et al. |
| 2017/0039752 A1 | 2/2017 | Quinn et al. |
| 2017/0061308 A1 | 3/2017 | Chen et al. |
| 2017/0064240 A1 | 3/2017 | Mangat et al. |
| 2017/0069124 A1 | 3/2017 | Tong et al. |
| 2017/0076011 A1 | 3/2017 | Gannon |
| 2017/0080346 A1 | 3/2017 | Abbas |
| 2017/0087473 A1 | 3/2017 | Siegel et al. |
| 2017/0113140 A1 | 4/2017 | Blackstock et al. |
| 2017/0118145 A1 | 4/2017 | Aittoniemi et al. |
| 2017/0124116 A1 | 5/2017 | League |
| 2017/0126592 A1 | 5/2017 | El Ghoul |
| 2017/0132649 A1 | 5/2017 | Oliva et al. |
| 2017/0147185 A1 | 5/2017 | Milvaney et al. |
| 2017/0161382 A1 | 6/2017 | Ouimet et al. |
| 2017/0199855 A1 | 7/2017 | Fishbeck |
| 2017/0235848 A1 | 8/2017 | Van Deusen et al. |
| 2017/0256039 A1 | 9/2017 | Hsu et al. |
| 2017/0263029 A1 | 9/2017 | Yan et al. |
| 2017/0270970 A1 | 9/2017 | Ho et al. |
| 2017/0286752 A1 | 10/2017 | Gusarov et al. |
| 2017/0287006 A1 | 10/2017 | Azmoodeh et al. |
| 2017/0293673 A1 | 10/2017 | Purumala et al. |
| 2017/0295250 A1 | 10/2017 | Samaranayake et al. |
| 2017/0310934 A1 | 10/2017 | Du et al. |
| 2017/0312634 A1 | 11/2017 | Ledoux et al. |
| 2017/0324688 A1 | 11/2017 | Collet et al. |
| 2017/0336960 A1 | 11/2017 | Chaudhri et al. |
| 2017/0339006 A1 | 11/2017 | Austin et al. |
| 2017/0344807 A1 | 11/2017 | Jillela et al. |
| 2017/0352179 A1 | 12/2017 | Hardee et al. |
| 2017/0353477 A1 | 12/2017 | Faigon et al. |
| 2017/0358117 A1 | 12/2017 | Goossens et al. |
| 2017/0374003 A1 | 12/2017 | Allen et al. |
| 2017/0374508 A1 | 12/2017 | Davis et al. |
| 2018/0005420 A1 | 1/2018 | Bondich et al. |
| 2018/0005483 A1 | 1/2018 | Washington et al. |
| 2018/0024726 A1 | 1/2018 | Hviding |
| 2018/0025367 A1 | 1/2018 | Jain |
| 2018/0032212 A1 | 2/2018 | Choi et al. |
| 2018/0047200 A1 | 2/2018 | O'hara et al. |
| 2018/0060363 A1 | 3/2018 | Ko et al. |
| 2018/0068019 A1 | 3/2018 | Novikoff et al. |
| 2018/0069817 A1 | 3/2018 | Constantinides |
| 2018/0088777 A1 | 3/2018 | Daze et al. |
| 2018/0091732 A1 | 3/2018 | Wilson et al. |
| 2018/0097762 A1 | 4/2018 | Garcia et al. |
| 2018/0113587 A1 | 4/2018 | Allen et al. |
| 2018/0115503 A1 | 4/2018 | Baldwin et al. |
| 2018/0167468 A1 | 6/2018 | Johnson et al. |
| 2018/0205681 A1 | 7/2018 | Gong et al. |
| 2018/0315076 A1 | 11/2018 | Andreou |
| 2018/0315133 A1 | 11/2018 | Brody et al. |
| 2018/0315134 A1 | 11/2018 | Amitay et al. |
| 2018/0352150 A1 | 12/2018 | Purwar et al. |
| 2018/0373924 A1 | 12/2018 | Yoo et al. |
| 2018/0374242 A1 | 12/2018 | Li et al. |
| 2019/0001223 A1 | 1/2019 | Blackstock et al. |
| 2019/0057616 A1 | 2/2019 | Cohen et al. |
| 2019/0097958 A1 | 3/2019 | Collet et al. |
| 2019/0188920 A1 | 6/2019 | Mcphee et al. |
| 2019/0220932 A1 | 7/2019 | Amitay et al. |
| 2019/0266390 A1 | 8/2019 | Gusarov et al. |
| 2019/0287287 A1 | 9/2019 | Bondich et al. |
| 2019/0332851 A1 | 10/2019 | Han et al. |
| 2019/0386941 A1 | 12/2019 | Baldwin et al. |
| 2020/0117339 A1 | 4/2020 | Amitay et al. |
| 2020/0117340 A1 | 4/2020 | Amitay et al. |
| 2020/0120097 A1 | 4/2020 | Amitay et al. |
| 2020/0120170 A1 | 4/2020 | Amitay et al. |
| 2020/0226848 A1 | 7/2020 | Van Os et al. |
| 2021/0027513 A1 | 1/2021 | Choi et al. |
| 2021/0152505 A1 | 5/2021 | Baldwin et al. |
| 2021/0217217 A1 | 7/2021 | Bondich et al. |
| 2021/0243548 A1 | 8/2021 | Brody et al. |
| 2021/0266277 A1 | 8/2021 | Allen et al. |
| 2021/0286840 A1 | 9/2021 | Amitay et al. |
| 2021/0295018 A1 | 9/2021 | Gusarov et al. |
| 2021/0357104 A1 | 11/2021 | Amitay et al. |
| 2022/0109648 A1 | 4/2022 | Baldwin et al. |
| 2022/0134236 A1 | 5/2022 | Blackstock et al. |
| 2022/0270322 A1 | 8/2022 | Huang et al. |
| 2022/0291812 A1 | 9/2022 | Amitay et al. |
| 2023/0033214 A1 | 2/2023 | Brody et al. |

(56) References Cited

U.S. PATENT DOCUMENTS

| | | | |
|---|---|---|---|
| 2023/0051468 A1 | 2/2023 | Amitay et al. |
| 2023/0067248 A1 | 3/2023 | Amitay et al. |
| 2023/0269208 A1 | 8/2023 | Allen et al. |
| 2024/0195767 A1 | 6/2024 | Allen et al. |

FOREIGN PATENT DOCUMENTS

| | | | | |
|---|---|---|---|---|
| CN | 1455374 | A | 11/2003 |
| CN | 101098241 | A | 1/2008 |
| CN | 101127109 | A | 2/2008 |
| CN | 101363743 | A | 2/2009 |
| CN | 101720010 | A | 6/2010 |
| CN | 101884036 | A | 11/2010 |
| CN | 102016887 | A | 4/2011 |
| CN | 102037716 | A | 4/2011 |
| CN | 102289796 | A | 12/2011 |
| CN | 102450031 | A | 5/2012 |
| CN | 102609247 | A | 7/2012 |
| CN | 102664819 | A | 9/2012 |
| CN | 102985951 | A | 3/2013 |
| CN | 103116853 | A | 5/2013 |
| CN | 103124894 | A | 5/2013 |
| CN | 103154994 | A | 6/2013 |
| CN | 103412885 | A | 11/2013 |
| CN | 103426194 | A | 12/2013 |
| CN | 103635892 | A | 3/2014 |
| CN | 104054077 | A | 9/2014 |
| CN | 104616540 | A | 5/2015 |
| CN | 104717366 | A | 6/2015 |
| CN | 104782120 | A | 7/2015 |
| CN | 105095272 | A | 11/2015 |
| CN | 105118023 | A | 12/2015 |
| CN | 105190700 | A | 12/2015 |
| CN | 105279354 | A | 1/2016 |
| CN | 105359162 | A | 2/2016 |
| CN | 105409197 | A | 3/2016 |
| CN | 105554311 | A | 5/2016 |
| CN | 105630846 | A | 6/2016 |
| CN | 105765620 | A | 7/2016 |
| CN | 105893579 | A | 8/2016 |
| CN | 106066990 | A | 11/2016 |
| CN | 106157155 | A | 11/2016 |
| CN | 106530008 | A | 3/2017 |
| CN | 107210948 | A | 9/2017 |
| CN | 108885795 | A | 11/2018 |
| CN | 109643370 | A | 4/2019 |
| CN | 109863532 | A | 6/2019 |
| CN | 110023985 | A | 7/2019 |
| CN | 110168478 | A | 8/2019 |
| CN | 110799937 | A | 2/2020 |
| CN | 110800018 | A | 2/2020 |
| CN | 110832538 | A | 2/2020 |
| CN | 110945555 | A | 3/2020 |
| CN | 111010882 | A | 4/2020 |
| CN | 111343075 | A | 6/2020 |
| CN | 111489264 | A | 8/2020 |
| CN | 111343075 | B | 9/2022 |
| CN | 110023985 | B | 7/2023 |
| CN | 116684370 | A | 9/2023 |
| CN | 116684370 | B | 11/2024 |
| EP | 1736931 | A2 | 12/2006 |
| EP | 2051480 | A1 | 4/2009 |
| EP | 2151797 | A1 | 2/2010 |
| EP | 2184092 | A2 | 5/2010 |
| EP | 3549089 | B1 | 1/2024 |
| GB | 2399928 | A | 9/2004 |
| JP | 2001230801 | A | 8/2001 |
| JP | 2014006881 | A | 1/2014 |
| JP | 5497931 | B2 | 3/2014 |
| JP | 2014191414 | A | 10/2014 |
| KR | 19990073076 | A | 10/1999 |
| KR | 20000063919 | A | 11/2000 |
| KR | 20010078417 | A | 8/2001 |
| KR | 20040063436 | A | 7/2004 |
| KR | 1020050036963 | A | 4/2005 |
| KR | 20060124865 | A | 12/2006 |
| KR | 20070008417 | | 1/2007 |
| KR | 20080011553 | A | 2/2008 |
| KR | 20110012491 | A | 2/2011 |
| KR | 20110014224 | A | 2/2011 |
| KR | 20110054492 | A | 5/2011 |
| KR | 101060961 | B1 | 8/2011 |
| KR | 1020120070898 | A | 7/2012 |
| KR | 20130075380 | A | 7/2013 |
| KR | 20140015725 | A | 2/2014 |
| KR | 20140033088 | A | 3/2014 |
| KR | 20140062706 | A | 5/2014 |
| KR | 20140103881 | A | 8/2014 |
| KR | 101445263 | B1 | 9/2014 |
| KR | 20150081694 | A | 7/2015 |
| KR | 101583181 | B1 | 1/2016 |
| KR | 20160001847 | A | 1/2016 |
| KR | 20160016532 | A | 2/2016 |
| KR | 20160018954 | A | 2/2016 |
| KR | 101604654 | B1 | 3/2016 |
| KR | 20160025365 | A | 3/2016 |
| KR | 20160028028 | A | 3/2016 |
| KR | 20160051536 | A | 5/2016 |
| KR | 101698031 | B1 | 1/2017 |
| KR | 20170025454 | A | 3/2017 |
| KR | 20170091803 | A | 8/2017 |
| KR | 102233700 | B1 | 3/2021 |
| KR | 102253891 | B1 | 5/2021 |
| KR | 102335138 | B1 | 12/2021 |
| KR | 102372756 | B1 | 3/2022 |
| KR | 102434361 | B1 | 8/2022 |
| KR | 102444789 | B1 | 9/2022 |
| KR | 102449545 | B1 | 10/2022 |
| KR | 102455041 | B1 | 10/2022 |
| KR | 102459610 | B1 | 10/2022 |
| KR | 102486490 | B1 | 1/2023 |
| KR | 102530504 | B1 | 5/2023 |
| WO | WO-1996024213 | A1 | 8/1996 |
| WO | WO-1999063453 | A1 | 12/1999 |
| WO | WO-2000058882 | A1 | 10/2000 |
| WO | WO-2001029642 | A1 | 4/2001 |
| WO | WO-2001050703 | A3 | 7/2001 |
| WO | WO-2003094072 | A1 | 11/2003 |
| WO | WO-2004079530 | A2 | 9/2004 |
| WO | WO-2004095308 | A1 | 11/2004 |
| WO | WO-2006107182 | A1 | 10/2006 |
| WO | WO-2006118755 | A2 | 11/2006 |
| WO | WO-2007092668 | A2 | 8/2007 |
| WO | WO-2007134402 | A1 | 11/2007 |
| WO | WO-2009043020 | A2 | 4/2009 |
| WO | WO-2011040821 | A1 | 4/2011 |
| WO | WO-2011119407 | A1 | 9/2011 |
| WO | WO-2012000107 | A1 | 1/2012 |
| WO | WO-2012139276 | A1 | 10/2012 |
| WO | WO-2012166072 | A1 | 12/2012 |
| WO | WO-2012166679 | A2 * | 12/2012 | ........... H04L 67/131 |
| WO | WO-2013008238 | A1 | 1/2013 |
| WO | WO-2013008251 | A2 | 1/2013 |
| WO | WO-2013027893 | A1 | 2/2013 |
| WO | WO-2013045753 | A1 | 4/2013 |
| WO | WO-2013152454 | A1 | 10/2013 |
| WO | WO-2013166588 | A1 | 11/2013 |
| WO | WO-2014006129 | A1 | 1/2014 |
| WO | WO-2014031899 | A1 | 2/2014 |
| WO | WO-2014068573 | A1 | 5/2014 |
| WO | WO-2014115136 | A1 | 7/2014 |
| WO | WO-2014194262 | A2 | 12/2014 |
| WO | WO-2014194439 | A1 | 12/2014 |
| WO | WO-2015192026 | A1 | 12/2015 |
| WO | WO-2016044424 | A1 | 3/2016 |
| WO | WO-2016054562 | A1 | 4/2016 |
| WO | WO-2016065131 | A1 | 4/2016 |
| WO | WO-2016090605 | A1 | 6/2016 |
| WO | WO-2016100318 | A2 | 6/2016 |
| WO | WO-2016100318 | A3 | 6/2016 |
| WO | WO-2016100342 | A1 | 6/2016 |
| WO | WO-2016/112299 | A1 | 7/2016 |
| WO | WO-2016149594 | A1 | 9/2016 |
| WO | WO-2016179166 | A1 | 11/2016 |

(56)     References Cited

FOREIGN PATENT DOCUMENTS

| WO | WO-2016179235 A1 | 11/2016 |
| WO | WO-2017173319 A1 | 10/2017 |
| WO | WO-2017176739 A1 | 10/2017 |
| WO | WO-2017176992 A1 | 10/2017 |
| WO | WO-2018005644 A1 | 1/2018 |
| WO | WO-2018006053 A1 | 1/2018 |
| WO | WO-2018081013 A1 | 5/2018 |
| WO | WO-2018102562 A1 | 6/2018 |
| WO | WO-2018129531 A1 | 7/2018 |
| WO | WO-2018200042 A1 | 11/2018 |
| WO | WO-2018200043 A1 | 11/2018 |
| WO | WO-2018201102 A1 | 11/2018 |
| WO | WO-2018201104 A1 | 11/2018 |
| WO | WO-2018201106 A1 | 11/2018 |
| WO | WO-2018201107 A1 | 11/2018 |
| WO | WO-2018201108 A1 | 11/2018 |
| WO | WO-2018201109 A1 | 11/2018 |
| WO | WO-2019089613 A1 | 5/2019 |

OTHER PUBLICATIONS

U.S. Appl. No. 15/401,926 U.S. Pat. No. 11,229,849, filed Jan. 9, 2017, System and Method for Generating and Displaying Avatars.

U.S. Appl. No. 16/126,869 U.S. Pat. No. 11,607,616, filed Sep. 10, 2018, System and Method for Generating and Displaying Avatars.

U.S. Appl. No. 17/450,040, filed Oct. 5, 2021, System and Method for Generating and Displaying Avatars.

U.S. Appl. No. 15/365,046 U.S. Pat. No. 10,432,559, filed Nov. 30, 2016, Generating and Displaying Customized Avatars in Electronic Messages.

U.S. Appl. No. 16/552,003 U.S. Pat. No. 10,880,246, filed Aug. 27, 2019, Generating and Displaying Customized Avatars in Electronic Messages.

U.S. Appl. No. 17/451,285, filed Oct. 18, 2021, Generating and Displaying Customized Avatars in Electronic Messages.

U.S. Appl. No. 17/247,169 U.S. Pat. No. 11,218,433, filed Dec. 2, 2016, Generating and Displaying Customized Avatars in Electronic Messages.

U.S. Appl. No. 15/369,499 U.S. Pat. No. 10,938,758, filed Dec. 5, 2016, Generating and Displaying Customized Avatars in Media Overlays.

U.S. Appl. No. 16/115,259 U.S. Pat. No. 11,876,762, filed Aug. 28, 2018, Generating and Displaying Customized Avatars in Media Overlays.

U.S. Appl. No. 17/314,963 U.S. Pat. No. 11,843,456, filed May 7, 2021, Generating and Displaying Customized Avatars in Media Overlays.

U.S. Appl. No. 18/138,552, filed Apr. 24, 2023, Generating and Displaying Customized Avatars in Media Overlays.

U.S. Appl. No. 18/969,983, filed Dec. 5, 2024, Generating and Displaying Customized Avatars in Electronic Messages.

U.S. Appl. No. 18/586,080, filed Feb. 23, 2024, Generating and Displaying Customized Avatars in Media Overlays.

"U.S. Appl. No. 15/628,408, Corrected Notice of Allowability mailed Nov. 15, 2023", 2 pgs.

"U.S. Appl. No. 15/628,408, Corrected Notice of Allowability mailed Nov. 24, 2023", 2 pgs.

"U.S. Appl. No. 15/628,408, Examiner Interview Summary mailed Jul. 27, 2022", 2 pgs.

"U.S. Appl. No. 15/628,408, Final Office Action mailed Jun. 10, 2022", 33 pgs.

"U.S. Appl. No. 15/628,408, Non Final Office Action mailed Feb. 4, 2022", 30 pgs.

"U.S. Appl. No. 15/628,408, Non Final Office Action mailed Dec. 27, 2022", 36 pgs.

"U.S. Appl. No. 15/628,408, Notice of Allowance mailed Aug. 3, 2023", 9 pgs.

"U.S. Appl. No. 15/628,408, Response filed Apr. 27, 2023 to Non Final Office Action mailed Dec. 27, 2022", 13 pgs.

"U.S. Appl. No. 15/628,408, Response filed May 4, 2022 to Non Final Office Action mailed Feb. 4, 2022", 9 pgs.

"U.S. Appl. No. 15/628,408, Response filed Aug. 10, 2022 to Final Office Action mailed Jun. 10, 2022", 14 pgs.

"U.S. Appl. No. 15/628,408, Supplemental Notice of Allowability mailed Oct. 21, 2021", 2 pgs.

"U.S. Appl. No. 15/965,744, Final Office Action mailed Jul. 28, 2021", 29 pgs.

"U.S. Appl. No. 15/965,744, Final Office Action mailed Oct. 21, 2022", 31 pgs.

"U.S. Appl. No. 15/965,744, Non Final Office Action mailed Mar. 4, 2022", 31 pgs.

"U.S. Appl. No. 15/965,744, Non Final Office Action mailed Mar. 30, 2023", 34 pgs.

"U.S. Appl. No. 15/965,744, Response filed Feb. 21, 2023 to Final Office Action mailed Oct. 21, 2022", 14 pgs.

"U.S. Appl. No. 15/965,744, Response filed Jun. 1, 2021 to Non Final Office Action mailed Feb. 1, 2021", 11 pgs.

"U.S. Appl. No. 15/965,744, Response filed Jul. 5, 2022 to Non Final Office Action mailed Mar. 4, 2022", 13 pgs.

"U.S. Appl. No. 15/965,744, Response filed Nov. 29, 2021 to Final Office Action mailed Jul. 28, 2021", 13 pgs.

"U.S. Appl. No. 15/965,749, Corrected Notice of Allowability mailed Jun. 16, 2022", 2 pgs.

"U.S. Appl. No. 15/965,749, Non Final Office Action mailed Jul. 9, 2021", 14 pgs.

"U.S. Appl. No. 15/965,749, Notice of Allowance mailed Feb. 2, 2022", 25 pgs.

"U.S. Appl. No. 15/965,749, Response filed Mar. 30, 2021 to Non Final Office Action mailed Nov. 30, 2020", 13 pgs.

"U.S. Appl. No. 15/965,749, Response filed Nov. 9, 2021 to Non Final Office Action mailed Jul. 9, 2021", 14 pgs.

"U.S. Appl. No. 15/965,749, Supplemental Notice of Allowability mailed Apr. 7, 2022", 3 jpgs.

"U.S. Appl. No. 15/965,749, Supplemental Notice of Allowability mailed May 5, 2022", 3 pgs.

"U.S. Appl. No. 15/965,756, Final Office Action mailed Aug. 19, 2021", 17 pgs.

"U.S. Appl. No. 15/965,756, Non Final Office Action mailed Mar. 31, 2022", 17 pgs.

"U.S. Appl. No. 15/965,756, Non Final Office Action mailed Nov. 14, 2022", 16 pgs.

"U.S. Appl. No. 15/965,756, Response filed Feb. 14, 2023 to Non Final Office Action mailed Nov. 14, 2022", 13 pgs.

"U.S. Appl. No. 15/965,756, Response filed May 13, 2021 to Non Final Office Action mailed Jan. 13, 2021", 12 pgs.

"U.S. Appl. No. 15/965,756, Response filed Aug. 1, 2022 to Non Final Office Action mailed Mar. 31, 2022", 12 pgs.

"U.S. Appl. No. 15/965,756, Response filed Dec. 20, 2021 to Final Office Action mailed Aug. 19, 2021", 13 pgs.

"U.S. Appl. No. 15/965,764, Corrected Notice of Allowability mailed Mar. 30, 2022", 1 pg.

"U.S. Appl. No. 15/965,764, Corrected Notice of Allowability mailed Apr. 20, 2022", 2 pgs.

"U.S. Appl. No. 15/965,764, Corrected Notice of Allowability mailed Jun. 28, 2022", 2 pgs.

"U.S. Appl. No. 15/965,764, Final Office Action mailed Jun. 15, 2021", 19 pgs.

"U.S. Appl. No. 15/965,764, Notice of Allowance mailed Mar. 9, 2022", 8 pgs.

"U.S. Appl. No. 15/965,764, PTO Response to Rule 312 Communication mailed Aug. 16, 2022", 2 pgs.

"U.S. Appl. No. 15/965,764, Response filed May 24, 2021 to Non Final Office Action mailed Feb. 22, 2021", 13 pgs.

"U.S. Appl. No. 15/965,764, Response filed Nov. 15, 2021 to Final Office Action mailed Jun. 15, 2021", 12 pgs.

"U.S. Appl. No. 15/965,775, Corrected Notice of Allowability mailed Apr. 7, 2022", 3 pgs.

"U.S. Appl. No. 15/965,775, Corrected Notice of Allowability mailed Jun. 1, 2022", 3 pgs.

"U.S. Appl. No. 15/965,775, Corrected Notice of Allowability mailed Jun. 15, 2022", 2 pgs.

(56)                    References Cited

OTHER PUBLICATIONS

"U.S. Appl. No. 15/965,775, Final Office Action mailed Jul. 6, 2021", 12 pgs.

"U.S. Appl. No. 15/965,775, Notice of Allowance mailed Feb. 22, 2022", 19 pgs.

"U.S. Appl. No. 15/965,775, Response filed Oct. 6, 2021 to Final Office Action mailed Jul. 6, 2021", 11 pgs.

"U.S. Appl. No. 16/115,259, Notice of Allowability mailed Dec. 14, 2023", 3 pgs.

"U.S. Appl. No. 16/193,938, Non Final Office Action mailed Nov. 12, 2021", 5 pgs.

"U.S. Appl. No. 16/193,938, Notice of Allowance mailed Mar. 3, 2022", 8 pgs.

"U.S. Appl. No. 16/193,938, PTO Response to Rule 312 Communication mailed Jul. 13, 2022", 2 pgs.

"U.S. Appl. No. 16/193,938, Response filed Feb. 14, 2022 to Non Final Office Action mailed Nov. 12, 2021", 3 pgs.

"U.S. Appl. No. 16/232,824, Final Office Action mailed Jun. 23, 2022", 26 pgs.

"U.S. Appl. No. 16/232,824, Final Office Action mailed Nov. 2, 2021", 25 pgs.

"U.S. Appl. No. 16/232,824, Non Final Office Action mailed Mar. 30, 2023", 27 pgs.

"U.S. Appl. No. 16/232,824, Response filed May 2, 2022 to Final Office Action mailed Nov. 2, 2021", 13 pgs.

"U.S. Appl. No. 16/232,824, Response filed Aug. 19, 2021 to Non Final Office Action mailed Feb. 19, 2021", 12 pgs.

"U.S. Appl. No. 16/232,824, Response filed Nov. 22, 2022 to Final Office Action mailed Jun. 23, 2022", 12 pgs.

"U.S. Appl. No. 16/365,300, Advisory Action mailed Mar. 9, 2023", 3 pgs.

"U.S. Appl. No. 16/365,300, Examiner Interview Summary mailed Jul. 29, 2022", 2 pgs.

"U.S. Appl. No. 16/365,300, Examiner Interview Summary mailed Nov. 29, 2021", 2 pgs.

"U.S. Appl. No. 16/365,300, Final Office Action mailed Mar. 25, 2022", 29 pgs.

"U.S. Appl. No. 16/365,300, Final Office Action mailed Dec. 30, 2022", 31 pgs.

"U.S. Appl. No. 16/365,300, Non Final Office Action mailed Aug. 18, 2022", 31 pgs.

"U.S. Appl. No. 16/365,300, Notice of Allowability mailed Nov. 6, 2023", 3 pgs.

"U.S. Appl. No. 16/365,300, Notice of Allowance mailed Jul. 17, 2023", 19 pgs.

"U.S. Appl. No. 16/365,300, Response filed Feb. 28, 2023 to Final Office Action mailed Dec. 30, 2022", 13 pgs.

"U.S. Appl. No. 16/365,300, Response filed May 1, 2023 to Advisory Action mailed Mar. 9, 2023", 13 pgs.

"U.S. Appl. No. 16/365,300, Response filed Jul. 25, 2022 to Final Office Action mailed Mar. 25, 2022", 13 pgs.

"U.S. Appl. No. 16/365,300, Response filed Dec. 2, 2021 to Non Final Office Action mailed Aug. 3, 2021", 10 pgs.

"U.S. Appl. No. 16/365,300, Response filed Dec. 19, 2022 to Non Final Office Action mailed Aug. 18, 2022", 11 pgs.

"U.S. Appl. No. 16/563,445, Corrected Notice of Allowability mailed Sep. 7, 2023", 2 pgs.

"U.S. Appl. No. 16/563,445, Corrected Notice of Allowability mailed Nov. 15, 2023", 2 pgs.

"U.S. Appl. No. 16/563,445, Decision on Pre-Appeal Brief Request mailed Mar. 13, 2023".

"U.S. Appl. No. 16/563,445, Examiner Interview Summary mailed Jun. 30, 2023".

"U.S. Appl. No. 16/563,445, Final Office Action mailed Jan. 11, 2022", 17 pgs.

"U.S. Appl. No. 16/563,445, Final Office Action mailed Nov. 18, 2022", 20 pgs.

"U.S. Appl. No. 16/563,445, Non Final Office Action mailed Apr. 5, 2023", 16 pgs.

"U.S. Appl. No. 16/563,445, Non Final Office Action mailed May 19, 2022", 17 pgs.

"U.S. Appl. No. 16/563,445, Notice of Allowance mailed Aug. 23, 2023", 7 pgs.

"U.S. Appl. No. 16/563,445, Pre-Appeal Brief Request filed Feb. 21, 2023", 10 pgs.

"U.S. Appl. No. 16/563,445, Response filed Apr. 11, 2022 to Final Office Action mailed Jan. 11, 2022", 10 pgs.

"U.S. Appl. No. 16/563,445, Response filed Jul. 5, 2023 to Non Final Office Action mailed Apr. 5, 2023", 10 pgs.

"U.S. Appl. No. 16/563,445, Response filed Oct. 19, 2022 to Non Final Office Action mailed May 19, 2022", 13 pgs.

"U.S. Appl. No. 16/563,445, Response filed Nov. 22, 2021 to Non Final Office Action mailed Aug. 20, 2021", 10 pgs.

"U.S. Appl. No. 17/131,598, Non Final Office Action mailed Sep. 27, 2022", 27 pgs.

"U.S. Appl. No. 17/131,598, Preliminary Amendment filed Jun. 8, 2021", 10 pages.

"U.S. Appl. No. 17/131,598, Response filed Jan. 27, 2023 to Non Final Office Action mailed Sep. 27, 2022", 15 pgs.

"U.S. Appl. No. 17/215,152, Advisory Action mailed Mar. 10, 2023", 2 pgs.

"U.S. Appl. No. 17/215,152, Examiner Interview Summary mailed Jul. 17, 2023", 2 pgs.

"U.S. Appl. No. 17/215,152, Examiner Interview Summary mailed Nov. 20, 2023", 2 pgs.

"U.S. Appl. No. 17/215,152, Final Office Action mailed Jan. 6, 2023", 23 pgs.

"U.S. Appl. No. 17/215,152, Final Office Action mailed Jul. 6, 2022", 24 pgs.

"U.S. Appl. No. 17/215,152, Final Office Action mailed Aug. 22, 2023", 23 pgs.

"U.S. Appl. No. 17/215,152, Non Final Office Action mailed Mar. 14, 2022", 28 pgs.

"U.S. Appl. No. 17/215,152, Non Final Office Action mailed Oct. 12, 2022", 24 pgs.

"U.S. Appl. No. 17/215,152, Non Final Office Action mailed Dec. 7, 2023", 22 pgs.

"U.S. Appl. No. 17/215,152, Non-Final Office Action mailed Apr. 20, 2023", 20 pgs.

"U.S. Appl. No. 17/215,152, Response filed Mar. 2, 2023 to Final Office Action mailed Jan. 6, 2023", 12 pgs.

"U.S. Appl. No. 17/215,152, Response filed Jun. 14, 2022 to Non Final Office Action mailed Mar. 14, 2022", 12 pgs.

"U.S. Appl. No. 17/215,152, Response filed Jul. 18, 2023 to Non-Final Office Action mailed Apr. 20, 2023", 13 pgs.

"U.S. Appl. No. 17/215,152, Response filed Sep. 2, 2022 to Final Office Action Mailed Jul. 6, 2022", 11 pgs.

"U.S. Appl. No. 17/215,152, Response filed Nov. 17, 2023 to Final Office Action mailed Aug. 22, 2023", 13 pgs.

"U.S. Appl. No. 17/215,152, Response filed Dec. 21, 2022 to Non Final Office Action mailed Oct. 12, 2022", 11 pgs.

"U.S. Appl. No. 17/248,841, Notice of Allowability mailed Jul. 18, 2022", 2 pgs.

"U.S. Appl. No. 17/248,841, Notice of Allowance mailed Apr. 7, 2022", 9 pgs.

"U.S. Appl. No. 17/248,841, Preliminary Amendment filed Apr. 22, 2021", 7 pgs.

"U.S. Appl. No. 17/249,201, Corrected Notice of Allowability mailed Jun. 24, 2022", 2 pgs.

"U.S. Appl. No. 17/249,201, Corrected Notice of Allowability mailed Sep. 22, 2022", 2 pgs.

"U.S. Appl. No. 17/249,201, Non Final Office Action mailed May 26, 2022", 5 pgs.

"U.S. Appl. No. 17/249,201, Notice of Allowance mailed Jun. 9, 2022", 7 pgs.

"U.S. Appl. No. 17/249,201, Preliminary Amendment filed Oct. 6, 2021", 9 pgs.

"U.S. Appl. No. 17/249,201, Response filed May 27, 2022 to Non Final Office Action mailed May 26, 2022", 10 pgs.

"U.S. Appl. No. 17/303,875, Corrected Notice of Allowability mailed Dec. 21, 2022", 5 pgs.

(56) References Cited

OTHER PUBLICATIONS

"U.S. Appl. No. 17/303,875, Notice of Allowance mailed Dec. 9, 2022", 9 pgs.

"U.S. Appl. No. 17/451,285, Corrected Notice of Allowability mailed Oct. 4, 2024", 2 pgs.

"U.S. Appl. No. 17/451,285, Non Final Office Action mailed May 29, 2024", 7 pgs.

"U.S. Appl. No. 17/451,285, Notice of Allowance mailed Sep. 26, 2024", 9 pgs.

"U.S. Appl. No. 17/451,285, Response filed Aug. 27, 2024 to Non Final Office Action mailed May 29, 2024", 9 pgs.

"U.S. Appl. No. 17/804,771, Non Final Office Action mailled Mar. 17, 2023", 20 pgs.

"U.S. Appl. No. 17/805,127, Preliminary Amendment filed Nov. 8, 2022", 10 pgs.

"U.S. Appl. No. 17/818,896, Non Final Office Action mailed Mar. 16, 2023", 13 pgs.

"U.S. Appl. No. 17/818,896, Preliminary Amendment filed Oct. 24, 2022", 6 pgs.

"U.S. Appl. No. 17/946,337, Preliminary Amendment filed Oct. 31, 2022", 7 pgs.

"U.S. Appl. No. 18/047,213, Preliminary Amendment filed Oct. 31, 2022", 8 pgs.

"U.S. Appl. No. 18/138,552, Corrected Notice of Allowability mailed Jan. 4, 2024", 2 pgs.

"U.S. Appl. No. 18/138,552, Corrected Notice of Allowability mailed Sep. 9, 2024", 2 pgs.

"U.S. Appl. No. 18/138,552, Notice of Allowance mailed Apr. 9, 2024", 5 pgs.

"U.S. Appl. No. 18/138,552, Notice of Allowance mailed Dec. 20, 2023", 6 pgs.

"U.S. Appl. No. 18/586,080, Non Final Office Action mailed Sep. 18, 2024", 46 pgs.

"U.S. Appl. No. 18/586,080, Response filed Dec. 17, 2024 to Non Final Office Action mailed Sep. 18, 2024", 11 pgs.

"Chinese Application Serial No. 201780022014.5, Decision of Rejection mailed Sep. 28, 2022", w/ English Translation, 10 pgs.

"Chinese Application Serial No. 201780022014.5, Office Action mailed Dec. 22, 2021", w/ English Translation, 13 pgs.

"Chinese Application Serial No. 201780022014.5, Response filed May 6, 2022 to Office Action filed Dec. 22, 2021", w/ English Claims, 15 pgs.

"Chinese Application Serial No. 201780052571.1, Decision of Rejection mailed Nov. 29, 2023", w/ English Translation, 12 pgs.

"Chinese Application Serial No. 201780052571.1, Office Action mailed Jun. 30, 2023", W/English Translation, 9 pgs.

"Chinese Application Serial No. 201780052571.1, Office Action mailed Dec. 5, 2022", w/ English Translation, 15 pgs.

"Chinese Application Serial No. 201780052571.1, Response Filed Sep. 15, 2023 to Office Action mailed Jun. 30, 2023", W/English Claims, 12 pgs.

"Chinese Application Serial No. 201780065441.1, Office Action mailed May 26, 2023", w/ English Translation, 14 pgs.

"Chinese Application Serial No. 201780065441.1, Office Action mailed Aug. 18, 2023", w/ English Translation, 6 pgs.

"Chinese Application Serial No. 201780065441.1, Office Action mailed Dec. 2, 2022", w/ English translation, 13 pgs.

"Chinese Application Serial No. 201780065441.1, Response filed Apr. 7, 2023 to Office Action mailed Dec. 2, 2022", w/ current English claims, 9 pgs.

"Chinese Application Serial No. 201780065441.1, Response filed Jul. 25, 2023 to Office Action mailed May 26, 2023", w/ English claims, 13 pgs.

"Chinese Application Serial No. 201780065441.1, Response filed Oct. 31, 2023 to Office Action mailed Aug. 18, 2023", w/ English claims, 13 pgs.

"Chinese Application Serial No. 201880042674.4, Office Action mailed Feb. 20, 2023", w/ English Translation, 13 pgs.

"Chinese Application Serial No. 201880043199.2, Office Action mailed Mar. 31, 2023", w/ English Translation, 12 pgs.

"Chinese Application Serial No. 201880043199.2, Office Action mailed Dec. 18, 2023", w/ English Translation, 15 pgs.

"Chinese Application Serial No. 202010079763.5, Office Action mailed Apr. 12, 2022" W/English Translation, 14 pgs.

"Chinese Application Serial No. 202010079763.5, Office Action mailed Aug. 27, 2021", w/ English Translation, 15 pgs.

"Chinese Application Serial No. 202010079763.5, Response filed Jun. 1, 2022 to Office Action mailed Apr. 12, 2022", w/ English Claims, 12 pgs.

"Chinese Application Serial No. 202010079763.5, Response Filed Jan. 11, 2022 to Office Action mailed Aug. 27, 2021", w/ English Claims, 13 pgs.

"Chinese Application Serial No. 202310817574.7, Office Action mailed Mar. 14, 2024", w/ English translation, 10 pgs.

"Chinese Application Serial No. 202310817574.7, Response filed Jul. 5, 2024 to Office Action mailed Mar. 14, 2024", W/English Claims, 37 pgs.

"European Application Serial No. 17751497.3, EPO Written Decision to Refuse mailed Jul. 18, 2023", 11 pgs.

"European Application Serial No. 17751497.3, Response filed Sep. 16, 2021 to Communication Pursuant to Article 94(3) EPC mailed Jun. 2, 2021", 15 pgs.

"European Application Serial No. 17751497.3, Summons to Attend Oral Proceedings mailed Dec. 20, 2022", 5 pgs.

"European Application Serial No. 17776809.0, Communication Pursuant to Article 94(3) EPC mailed Dec. 19, 2022", 7 pgs.

"European Application Serial No. 18789872.1, Summons to Attend Oral Proceedings mailed Jun. 23, 2021", 9 pgs.

"European Application Serial No. 18789872.1, Summons to Attend Oral Proceedings mailed Sep. 13, 2021", 9 pgs.

"European Application Serial No. 18790189.7, Summons to attend oral proceedings mailed Jul. 8, 2021", 13 pgs.

"European Application Serial No. 18790319.0, Communication Pursuant to Article 94(3) EPC mailed Jul. 21, 2021", 7 pgs.

"European Application Serial No. 18790319.0, Response Filed Jan. 28, 2022 to Communication Pursuant to Article 94(3) EPC mailed Jul. 21, 2021", 16 pgs.

"European Application Serial No. 19206595.1, Communication Pursuant to Article 94(3) EPC mailed Jul. 22, 2021", 7 pgs.

"European Application Serial No. 19206595.1, Response filed Jan. 28, 2022 to Communication Pursuant to Article 94(3) EPC mailed Jul. 22, 2021", 18 pgs.

"European Application Serial No. 19206610.8, Communication Pursuant to Article 94(3) EPC mailed Jul. 21, 2021", 8 pgs.

"European Application Serial No. 19206610.8, Response filed Jan. 26, 2022 to Communication Pursuant to Article 94(3) EPC mailed Jul. 21, 2021", 23 pgs.

"European Application Serial No. 22165083.1, Extended European Search Report mailed Jul. 12, 2022", 7 pgs.

"European Application Serial No. 22173072.4, Extended European Search Report mailed Aug. 26, 2022", 6 pgs.

"European Application Serial No. 23191199.1, Extended European Search Report mailed Nov. 3, 2023", 6 pgs.

"European Application Serial No. 24151986.7, Extended European Search Report mailed Apr. 24, 2024", 9 pgs.

"Korean Application Serial No. 10-2019-7034512, Notice of Preliminary Rejection mailed May 17, 2021", With English translation, 15 pgs.

"Korean Application Serial No. 10-2019-7034512, Notice of Preliminary Rejection mailed Nov. 2, 2021", w/ English translation, 8 pgs.

"Korean Application Serial No. 10-2019-7034512, Response Filed Jan. 3, 2022 to Notice of Preliminary Rejection mailed Nov. 2, 2021", w/ English Claims, 18 pgs.

"Korean Application Serial No. 10-2019-7034598, Notice of Preliminary Rejection mailed Jan. 10, 2022", w/ English translation, 13 pgs.

"Korean Application Serial No. 10-2019-7034598, Notice of Preliminary Rejection mailed Jun. 3, 2021", With English translation, 10 pgs.

"Korean Application Serial No. 10-2019-7034598, Response filed Sep. 3, 2021 to Notice of Preliminary Rejection mailed Jun. 3, 2021", w/ English Claims, 27 pgs.

(56) References Cited

OTHER PUBLICATIONS

"Korean Application Serial No. 10-2019-7034598, Response Filed Mar. 10, 2022 to Notice of Preliminary Rejection mailed Jan. 10, 2022", W/ English Claims, 24 pgs.

"Korean Application Serial No. 10-2019-7034715, Final Office Action mailed Mar. 7, 2022", w/ English translation, 9 pgs.

"Korean Application Serial No. 10-2019-7034715, Notice of Preliminary Rejection mailed May 21, 2021", With English translation, 15 pgs.

"Korean Application Serial No. 10-2019-7034715, Office Action mailed Jan. 30, 2023", With English machine translation, 3 pgs.

"Korean Application Serial No. 10-2019-7034715, Office Action mailed Feb. 27, 2023", w/ English Machine Translation, 46 pgs.

"Korean Application Serial No. 10-2019-7034715, Office Action mailed Jun. 27, 2022", w/ English Translation, 7 pgs.

"Korean Application Serial No. 10-2019-7034715, Response filed Nov. 22, 2021 to Office Action mailed May 21, 2021", w/ English Claims, 22 pgs.

"Korean Application Serial No. 10-2019-7034751, Final Office Action mailed Mar. 7, 2022", w/ English translation, 11 pgs.

"Korean Application Serial No. 10-2019-7034751, Notice of Preliminary Rejection mailed May 21, 2021", With English translation, 18 pgs.

"Korean Application Serial No. 10-2019-7034751, Response filed Jun. 7, 2022 to Office Action mailed Mar. 7, 2022", w/ English Claims, 27 pgs.

"Korean Application Serial No. 10-2019-7034899, Final Office Action mailed Dec. 3, 2021", w/ English translation, 10 pgs.

"Korean Application Serial No. 10-2019-7035443, Notice of Preliminary Rejection mailed Apr. 11, 2022", w/ English translation, 8 pgs.

"Korean Application Serial No. 10-2019-7035443, Notice of Preliminary Rejection mailed May 26, 2021", w/ English translation, 14 pgs.

"Korean Application Serial No. 10-2019-7035443, Response filed May 6, 2022 to Office Action mailed Apr. 12, 2022", w/ English Claims, 17 pgs.

"Korean Application Serial No. 10-2021-7010821, Final Office Action mailed Nov. 29, 2021", w/ English translation, 7 pgs.

"Korean Application Serial No. 10-2021-7014438, Response filed Oct. 12, 2021 to Notice of Preliminary Rejection mailed Aug. 9, 2021", w/ English Claims, 15 pgs.

"Korean Application Serial No. 10-2021-7039311, Notice of Preliminary Rejection mailed Jan. 24, 2022", w/ English Translation, 11 pgs.

"Korean Application Serial No. 10-2021-7039311, Response Filed Feb. 23, 2022 to Notice of Preliminary Rejection mailed Jan. 24, 2022", w/ English Claims, 24 pgs.

"Korean Application Serial No. 10-2022-7013956, Final Office Action mailed Sep. 11, 2023", w/ English Translation, 11 pgs.

"Korean Application Serial No. 10-2022-7013956, Notice of Preliminary Rejection mailed Jan. 13, 2023", w/ English Translation, 22 pgs.

"Korean Application Serial No. 10-2022-7015893, Notice of Preliminary Rejection mailed Aug. 11, 2022", W/English Translation, 6 pgs.

"Korean Application Serial No. 10-2022-7015893, Response filed Oct. 7, 2022 to Notice of Preliminary Rejection mailed Aug. 11, 2022", w/ English Claims, 17 pgs.

"Korean Application Serial No. 10-2022-7031802, Final Office Action mailed Aug. 16, 2024", w/ English translation, 10 pgs.

"Korean Application Serial No. 10-2022-7031802, Notice of Preliminary Rejection mailed Dec. 7, 2023", w/ English Translation, 16 pgs.

"Korean Application Serial No. 10-2022-7031802, Response filed Feb. 29, 2024 to Notice of Preliminary Rejection mailed Dec. 7, 2023", w/ English claims, 20 pgs.

"Korean Application Serial No. 10-2023-7015209, Notice of Preliminary Rejection mailed Jul. 3, 2023", W/English Translation, 6 pgs.

"Korean Application Serial No. 10-2023-7015209, Response Filed Sep. 4, 2023 to Notice of Preliminary Rejection mailed Jul. 3, 2023", W/ English Claims, 19 Pgs.

"Korean Application Serial No. 10-2019-7034715, Response filed Jun. 7, 2022 to Office Action mailed Mar. 7, 2022", w/ English Claims, 18 pgs.

"Korean Application Serial No. 10-2019-7034751, Response filed Nov. 22, 2021 to Office Action mailed May 21, 2021", w/ English Claims, 28 pgs.

"Korean Application Serial No. 10-2019-7034899, Office Action mailed Jan. 24, 2022", w/ English Translation, 12 pgs.

"Korean Application Serial No. 10-2019-7034899, Response filed Jan. 5, 2022 to Office Action mailed Dec. 3, 2021", w/ English Translation of Claims, 12 pgs.

"Korean Application Serial No. 10-2021-7010821, Response filed Dec. 30, 2021 to Office Action mailed Nov. 29, 2021", w/ English Translation of Claims, 22 pgs.

"Tiled web map—Wikipedia", <URL:https://en.wikipedia.org/w/index.php?title=Tiled_web_map&oldid=758691778>, (Jan. 6, 2017), 1-3.

"What is interpolation?", CUNY, [Online] Retrieved from the internet: <http://www.geography.hunter.cuny.edu/~jochen/gtech361/lectures/lecture11/concepts/What%20is%20interpolation.htm>, (May 8, 2016), 2 pgs.

Birchall, Andrew Alexander, "The delivery of notifications that user perceives,", IP.com English Translation of CN 107210948 A Filed Dec. 16, 2014, (2014), 28 pgs.

Dempsey, C, "What is the difference between a heat map and a hot spot map?", [Online] Retrieved from the internet: <https://www.gislounge.com/difference-heat-map-hot-spot-map/>, (Aug. 10, 2014), 8 pgs.

Frisch, Mathias, et al., "Grids & guides: multi-touch layout and alignment tools", Proceedings of the ACM SIGCHI Conference on Human Factors in Computing Systems, Vancouver, BC, CA, (2011), 4 pgs.

Grubert, "Towards pervasive augmented reality context awareness in Augmented reality", (2017), 20 pgs.

Vaynerchuk, Gary, "How to Create and Use Snapchat's New Custom Geofilters", [Online] Retrieved from the Internet: <https://garyvaynerchuk.com/how-to-create-and-use-snapchats-new-custom-geofilters/>, (Mar. 15, 2016), 15 pgs.

Xu, B, et al., "Automatic archiving versus default deletion: what Snapchat tells us about ephemerality in design", In Proceedings of the 19th ACM conference on computer-supported cooperative work & social computing, (Feb. 2016), 1662-1675.

"A Guide to Advertising on Campus With Snapchat Geofilters", College Marketing Group, [Online] Retrieved from the Internet : <URL: https://collegemarketinggroup.com/blog/a-guide-to-advertising-on-campus-with-snapchat-geofilters/>, (Jul. 25, 2016), 5 pgs.

"A Whole New Story", Snap, Inc., [Online] Retrieved from the Internet: <URL: https://www.snap.com/en-us/news/>, (2017), 13 pgs.

"Adding photos to your listing", eBay, [Online] Retrieved from the Internet: <URL: http://pages.ebay.com/help/sell/pictures.html>, (accessed May 24, 2017), 4 pgs.

"U.S. Appl. No. 12/471,811, Advisory Action mailed Mar. 28, 2012", 6 pgs.

"U.S. Appl. No. 12/471,811, Examiner Interview Summary mailed Feb. 2, 2012", 3 pgs.

"U.S. Appl. No. 12/471,811, Examiner Interview Summary mailed Apr. 18, 2011", 3 pgs.

"U.S. Appl. No. 12/471,811, Examiner Interview Summary mailed May 27, 2014", 2 pgs.

"U.S. Appl. No. 12/471,811, Final Office Action mailed Dec. 23, 2011", 20 pgs.

"U.S. Appl. No. 12/471,811, Non Final Office Action mailed Jan. 13, 2011", 15 pgs.

"U.S. Appl. No. 12/471,811, Non Final Office Action mailed Jun. 28, 2011", 26 pgs.

"U.S. Appl. No. 12/471,811, Non Final Office Action malled Oct. 24, 2014", 21 pgs.

"U.S. Appl. No. 12/471,811, Notice of Allowance mailed Apr. 1, 2015", 6 pgs.

(56)          References Cited

OTHER PUBLICATIONS

"U.S. Appl. No. 12/471,811, Response filed Jan. 26, 2015 to Non Final Office Action mailed Oct. 24, 2014", 18 pgs.

"U.S. Appl. No. 12/471,811, Response filed Feb. 23, 2012 to Final Office Action mailed Dec. 23, 2011", 12 pgs.

"U.S. Appl. No. 12/471,811, Response filed Mar. 28, 2012 to Advisory Action mailed Mar. 28, 2012", 14 pgs.

"U.S. Appl. No. 12/471,811, Response filed Apr. 13, 2011 to Non Final Office Action mailed Jan. 13, 2011", 5 pgs.

"U.S. Appl. No. 12/471,811, Response filed Sep. 28, 2011 to Non Final Office Action mailed Jun. 28, 2011", 19 pgs.

"U.S. Appl. No. 13/979,974, Corrected Notice of Allowability mailed Nov. 19, 2018", 2 pgs.

"U.S. Appl. No. 13/979,974, Examiner Interview Summary mailed Jun. 29, 2017", 3 pgs.

"U.S. Appl. No. 13/979,974, Examiner Interview Summary mailed Sep. 15, 2017", 3 pgs.

"U.S. Appl. No. 13/979,974, Final Office Action mailed Apr. 25, 2018", 18 pgs.

"U.S. Appl. No. 13/979,974, Final Office Action mailed Jun. 9, 2017", 20 pgs.

"U.S. Appl. No. 13/979,974, Final Office Action mailed Oct. 12, 2016", 13 pgs.

"U.S. Appl. No. 13/979,974, Non Final Office Action mailed Feb. 22, 2017", 17 pgs.

"U.S. Appl. No. 13/979,974, Non Final Office Action mailed Apr. 27, 2016", 16 pgs.

"U.S. Appl. No. 13/979,974, Non Final Office Action mailed Oct. 3, 2017", 17 pgs.

"U.S. Appl. No. 13/979,974, Notice of Allowance mailed Aug. 10, 2018", 9 pgs.

"U.S. Appl. No. 13/979,974, Response filed Jan. 3, 2018 to Non Final Office Action mailed Oct. 3, 2017", 8 pgs.

"U.S. Appl. No. 13/979,974, Response filed May 22, 2017 to Non Final Office Action mailed Feb. 22, 2017", 10 pgs.

"U.S. Appl. No. 13/979,974, Response filed Jul. 25, 2018 to Final Office Action mailed Apr. 25, 2018", 10 pgs.

"U.S. Appl. No. 13/979,974, Response filed Jul. 26, 2016 to Non Final Office Action mailed Apr. 27, 2016", 8 pgs.

"U.S. Appl. No. 13/979,974, Response filed Sep. 11, 2017 to Final Office Action mailed Jun. 9, 2017", 8 pgs.

"U.S. Appl. No. 13/979,974, Response filed Jan. 12, 2017 to Non Final Office Action mailed Apr. 27, 2016", 8 pgs.

"U.S. Appl. No. 14/753,200, Non Final Office Action mailed Oct. 11, 2016", 6 pgs.

"U.S. Appl. No. 14/753,200, Notice of Allowance mailed Apr. 27, 2017", 7 pgs.

"U.S. Appl. No. 14/753,200, Response filed Feb. 13, 2017 to Non Final Office Action mailed Oct. 11, 2016", 9 pgs.

"U.S. Appl. No. 15/086,749, Final Office Action mailed Oct. 31, 2017", 15 pgs.

"U.S. Appl. No. 15/086,749, Final Office Action mailed Dec. 31, 2018", 14 pgs.

"U.S. Appl. No. 15/086,749, Non Final Office Action mailed Mar. 13, 2017", 12 pgs.

"U.S. Appl. No. 15/086,749, Non Final Office Action mailed Apr. 30, 2018", 14 pgs.

"U.S. Appl. No. 15/086,749, Notice of Allowance mailed Feb. 26, 2019", 7 pgs.

"U.S. Appl. No. 15/086,749, Response filed Feb. 11, 2019 to Final Office Action mailed Dec. 31, 2018", 10 pgs.

"U.S. Appl. No. 15/086,749, Response filed Apr. 2, 2018 to Final Office Action mailed Oct. 31, 2017", 14 pgs.

"U.S. Appl. No. 15/086,749, Response filed Aug. 29, 2018 to Non Final Office Action mailed Apr. 30, 2018", 12 pgs.

"U.S. Appl. No. 15/199,472, Final Office Action mailed Mar. 1, 2018", 31 pgs.

"U.S. Appl. No. 15/199,472, Final Office Action mailed Nov. 15, 2018", 37 pgs.

"U.S. Appl. No. 15/199,472, Non Final Office Action mailed Jul. 25, 2017", 30 pgs.

"U.S. Appl. No. 15/199,472, Non Final Office Action mailed Sep. 21, 2018", 33 pgs.

"U.S. Appl. No. 15/199,472, Notice of Allowability mailed May 13, 2019", 3 pgs.

"U.S. Appl. No. 15/199,472, Notice of Allowance mailed Mar. 18, 2019", 23 pgs.

"U.S. Appl. No. 15/199,472, Response filed Jan. 15, 2019 to Final Office Action mailed Nov. 15, 2018", 14 pgs.

"U.S. Appl. No. 15/199,472, Response filed Jan. 25, 2018 to Non Final Office Action mailed Jul. 25, 2017", 13 pgs.

"U.S. Appl. No. 15/199,472, Response filed Aug. 31, 2018 to Final Office Action mailed Mar. 1, 2018", 14 pgs.

"U.S. Appl. No. 15/199,472, Response filed Oct. 17, 2018 to Non Final Office Action mailed Sep. 31, 2018", 11 pgs.

"U.S. Appl. No. 15/365,046, Non Final Office Action mailed Dec. 20, 2018", 36 pgs.

"U.S. Appl. No. 15/365,046, Notice of Allowance mailed May 21, 2019", 14 pgs.

"U.S. Appl. No. 15/365,046, Response filed Mar. 20, 2019 to Non Final Office Action nailed Dec. 20, 2018", 20 pgs.

"U.S. Appl. No. 15/369,499, Corrected Notice of Allowability mailed Jan. 28, 2021", 3 pgs.

"U.S. Appl. No. 15/369,499, Examiner Interview Summary mailed Sep. 21, 2020", 3 pgs.

"U.S. Appl. No. 15/369,499, Examiner Interview Summary mailed Oct. 9, 2020", 2 pgs.

"U.S. Appl. No. 15/369,499, Final Office Action mailed Jan. 31, 2019", 22 pgs.

"U.S. Appl. No. 15/369,499, Final Office Action mailed Jun. 15, 2020", 17 pgs.

"U.S. Appl. No. 15/369,499, Final Office Action mailed Oct. 1, 2019", 17 pgs.

"U.S. Appl. No. 15/369,499, Non Final Office Action mailed Mar. 2, 2020", 17 pgs.

"U.S. Appl. No. 15/369,499, Non Final Office Action mailed Jun. 17, 2019", 17 pgs.

"U.S. Appl. No. 15/369,499, Non Final Office Action mailed Aug. 15, 2018", 22 pgs.

"U.S. Appl. No. 15/369,499, Notice of Allowance mailed Oct. 26, 2020", 17 pgs.

"U.S. Appl. No. 15/369,499, Response filed Feb. 3, 2020 to Final Office Action mailed Oct. 1, 2019", 10 pgs.

"U.S. Appl. No. 15/369,499, Response filed Mar. 14, 2019 to Final Office Action mailed Jan. 31, 2019", 12 pgs.

"U.S. Appl. No. 15/369,499, Response filed Jun. 2, 2020 to Non Final Office Action mailed Mar. 2, 2020", 9 pgs.

"U.S. Appl. No. 15/369,499, Response filed Sep. 15, 2020 to Final Office Action mailed Jun. 15, 2020", 10 pgs.

"U.S. Appl. No. 15/369,499, Response filed Nov. 15, 2018 to Non Final Office Action mailed Aug. 15, 2018", 10 pgs.

"U.S. Appl. No. 15/369,499, Response filed Sep. 10, 2019 to Non-Final Office Action mailed Jun. 17, 2019", 9 pgs.

"U.S. Appl. No. 15/401,926, Advisory Action mailed Mar. 11, 2020", 2 pgs.

"U.S. Appl. No. 15/401,926, Corrected Notice of Allowability mailed Nov. 15, 2021", 2 pgs.

"U.S. Appl. No. 15/401,926, Corrected Notice of Allowability mailed Nov. 16, 2021", 2 pgs.

"U.S. Appl. No. 15/401,926, Corrected Notice of Allowability mailed Dec. 22, 2021", 2 pgs.

"U.S. Appl. No. 15/401,926, Final Office Action mailed Feb. 12, 2021", 10 pgs.

"U.S. Appl. No. 15/401,926, Final Office Action mailed Nov. 21, 2019", 9 pgs.

"U.S. Appl. No. 15/401,926, Non Final Office Action mailed Mar. 30, 2020", 9 pgs.

"U.S. Appl. No. 15/401,926, Non Final Office Action mailed Aug. 6, 2019", 9 pgs.

"U.S. Appl. No. 15/401,926, Non Final Office Action mailed Oct. 27, 2020", 10 pgs.

(56) References Cited

OTHER PUBLICATIONS

"U.S. Appl. No. 15/401,926, Notice of Allowance mailed May 26, 2021", 8 pgs.

"U.S. Appl. No. 15/401,926, Response filed Jan. 27, 2021 to Non Final Office Action mailed Oct. 27, 2020", 9 pgs.

"U.S. Appl. No. 15/401,926, Response filed Feb. 21, 2020 to Final Office Action mailed Nov. 21, 2019", 9 pgs.

"U.S. Appl. No. 15/401,926, Response filed May 12, 2021 to Final Office Action mailed Feb. 12, 2021", 9 pgs.

"U.S. Appl. No. 15/401,926, Response filed May 20, 2019 to Restriction Requirement mailed Mar. 29, 2019", 9 pgs.

"U.S. Appl. No. 15/401,926, Response filed Jul. 30, 2020 to Non Final Office Action mailed Mar. 30, 2020", 10 pgs.

"U.S. Appl. No. 15/401,926, Response filed Nov. 6, 2019 to Non Final Office Action mailed Aug. 6, 2019", 10 pgs.

"U.S. Appl. No. 15/401,926, Restriction Requirement mailed Mar. 29, 2019", 7 pgs.

"U.S. Appl. No. 15/583,142, Jan. 28, 2019 to Response filed Non Final Office Action mailed Oct. 25, 2018", 19 pgs.

"U.S. Appl. No. 15/583,142, Final Office Action mailed Mar. 22, 2019", 11 pgs.

"U.S. Appl. No. 15/583,142, Non Final Office Action mailed Oct. 25, 2018", 14 pgs.

"U.S. Appl. No. 15/583,142, Notice of Allowance mailed Jun. 6, 2019", 8 pgs.

"U.S. Appl. No. 15/583,142, Response filed May 9, 2019 to Final Office Action mailed Mar. 22, 2019", 8 pgs.

"U.S. Appl. No. 15/628,408, Corrected Notice of Allowability mailed Jul. 21, 2021", 7 pgs.

"U.S. Appl. No. 15/628,408, Final Office Action mailed Apr. 13, 2020", 45 pgs.

"U.S. Appl. No. 15/628,408, Final Office Action mailed Jun. 10, 2019", 44 pgs.

"U.S. Appl. No. 15/628,408, Non Final Office Action mailed Jan. 2, 2019", 28 pgs.

"U.S. Appl. No. 15/628,408, Non Final Office Action mailed Oct. 30, 2019", 45 pgs.

"U.S. Appl. No. 15/628,408, Notice of Allowance mailed Jul. 8, 2021", 11 pgs.

"U.S. Appl. No. 15/628,408, Notice of Allowance mailed Sep. 29, 2020", 13 pgs.

"U.S. Appl. No. 15/628,408, Response filed Jan. 30, 2020 to Non Final Office Action mailed Oct. 30, 2019", 17 pgs.

"U.S. Appl. No. 15/628,408, Response filed Apr. 2, 2019 to Non Final Office Action mailed Jan. 2, 2019", 15 pgs.

"U.S. Appl. No. 15/628,408, Response filed Jul. 13, 2020 to Final Office Action mailed Apr. 13, 2020", 20 pgs.

"U.S. Appl. No. 15/628,408, Response filed Aug. 12, 2019 to Final Office Action mailed Jun. 10, 2019", 12 pgs.

"U.S. Appl. No. 15/628,408, Supplemental Amendment filed Apr. 4, 2019 to Non Final Office Action mailed Jan. 2, 2019", 12 pgs.

"U.S. Appl. No. 15/661,953, Examiner Interview Summary mailed Nov. 13, 2018", 3 pgs.

"U.S. Appl. No. 15/661,953, Non Final Office Action mailed Mar. 26, 2018", 6 pgs.

"U.S. Appl. No. 15/661,953, Notice of Allowance mailed Aug. 10, 2018", 7 pgs.

"U.S. Appl. No. 15/661,953, PTO Response to Rule 312 Communication mailed Oct. 30, 2018", 2 pgs.

"U.S. Appl. No. 15/661,953, PTO Response to Rule 312 Communication mailed Nov. 7, 2018", 2 pgs.

"U.S. Appl. No. 15/661,953, Response filed Jun. 26, 2018 to Non Final Office Action mailed Mar. 26, 2018", 13 pgs.

"U.S. Appl. No. 15/859,101, Examiner Interview Summary mailed Sep. 18, 2018", 3 pgs.

"U.S. Appl. No. 15/859,101, Non Final Office Action mailed Jun. 15, 2018", 10 pgs.

"U.S. Appl. No. 15/859,101, Notice of Allowance mailed Oct. 4, 2018", 9 pgs.

"U.S. Appl. No. 15/859,101, Response filed Sep. 17, 2018 to Non Final Office Action mailed Jun. 15, 2018", 17 pgs.

"U.S. Appl. No. 15/901,387, Non Final Office Action mailed Oct. 30, 2019", 40 pgs.

"U.S. Appl. No. 15/965,361, Non Final Office Action mailed Jun. 22, 2020", 35 pgs.

"U.S. Appl. No. 15/965,744, Examiner Interview Summary mailed Feb. 21, 2020", 3 pgs.

"U.S. Appl. No. 15/965,744, Final Office Action mailed Feb. 6, 2020", 19 pgs.

"U.S. Appl. No. 15/965,744, Non Final Office Action mailed Feb. 1, 2021", 29 pgs.

"U.S. Appl. No. 15/965,744, Non Final Office Action mailed Jun. 12, 2019", 18 pgs.

"U.S. Appl. No. 15/965,744, Response filed Jun. 8, 2020 to Final Office Action mailed Feb. 6, 2020", 11 pgs.

"U.S. Appl. No. 15/965,744, Response filed Nov. 12, 2019 to Non Final Office Action mailed Jun. 12, 2019", 10 pgs.

"U.S. Appl. No. 15/965,749, Examiner Interview Summary mailed Jul. 29, 2020", 3 pgs.

"U.S. Appl. No. 15/965,749, Final Office Action mailed Jun. 11, 2020", 12 pgs.

"U.S. Appl. No. 15/965,749, Non Final Office Action mailed Jan. 27, 2020", 9 pgs.

"U.S. Appl. No. 15/965,749, Non Final Office Action mailed Jul. 10, 2019", 8 pgs.

"U.S. Appl. No. 15/965,749, Non Final Office Action mailed Nov. 30, 2020", 13 pgs.

"U.S. Appl. No. 15/965,749, Response filed Feb. 28, 2020 to Non Final Office Action mailed Jan. 27, 2020", 12 pgs.

"U.S. Appl. No. 15/965,749, Response filed Oct. 10, 2019 to Non-Final Office Action mailed Jul. 10, 2019", 11 pgs.

"U.S. Appl. No. 15/965,749, Response filed Oct. 12, 2020 to Final Office Action mailed Jun. 11, 2020", 14 pgs.

"U.S. Appl. No. 15/965,754, Corrected Notice of Allowability mailed Jan. 6, 2021", 2 pgs.

"U.S. Appl. No. 15/965,754, Corrected Notice of Allowability mailed Mar. 1, 2021", 2 pgs.

"U.S. Appl. No. 15/965,754, Final Office Action mailed Jul. 17, 2020", 14 pgs.

"U.S. Appl. No. 15/965,754, Non Final Office Action mailed Mar. 30, 2020", 13 pgs.

"U.S. Appl. No. 15/965,754, Notice of Allowance mailed Nov. 16, 2020", 7 pgs.

"U.S. Appl. No. 15/965,754, Response filed Jun. 30, 2020 to Non Final Office Action mailed Mar. 30, 2020", 12 pgs.

"U.S. Appl. No. 15/965,754, Response filed Oct. 19, 2020 to Final Office Action mailed Jul. 17, 2020", 14 pgs.

"U.S. Appl. No. 15/965,754, Supplemental Notice of Allowability mailed Dec. 16, 2020", 2 pgs.

"U.S. Appl. No. 15/965,756, Non Final Office Action mailed Jan. 13, 2021", 16 pgs.

"U.S. Appl. No. 15/965,756, Non Final Office Action mailed Jun. 24, 2020", 16 pgs.

"U.S. Appl. No. 15/965,756, Response filed Sep. 24, 2020 to Non Final Office Action mailed Jun. 24, 2020", 11 pgs.

"U.S. Appl. No. 15/965,764, Examiner Interview Summary mailed Aug. 6, 2020", 3 pgs.

"U.S. Appl. No. 15/965,764, Final Office Action mailed May 14, 2020", 18 pgs.

"U.S. Appl. No. 15/965,764, Non Final Office Action mailed Jan. 2, 2020", 18 pgs.

"U.S. Appl. No. 15/965,764, Non Final Office Action mailed Feb. 22, 2021", 18 pgs.

"U.S. Appl. No. 15/965,764, Response filed Apr. 2, 2020 to Non Final Office Action mailed Jan. 2, 2020", 11 pgs.

"U.S. Appl. No. 15/965,764, Response filed Oct. 14, 2020 to Final Office Action mailed May 14, 2020", 11 pgs.

"U.S. Appl. No. 15/965,775, Final Office Action mailed Jan. 30, 2020", 10 pgs.

"U.S. Appl. No. 15/965,775, Non Final Office Action mailed Jun. 19, 2020", 12 pgs.

(56) References Cited

OTHER PUBLICATIONS

"U.S. Appl. No. 15/965,775, Non Final Office Action mailed Jul. 29, 2019", 8 pgs.

"U.S. Appl. No. 15/965,775, Non Final Office Action malled Oct. 16, 2020", 11 pgs.

"U.S. Appl. No. 15/965,775, Response filed Mar. 16, 2021 to Non Final Office Action mailed Oct. 16, 2020", 10 pgs.

"U.S. Appl. No. 15/965,775, Response filed Jun. 1, 2020 to Final Office Action mailed Jan. 30, 2020", 10 pgs.

"U.S. Appl. No. 15/965,775, Response filed Jul. 7, 2020 to Non Final Office Action mailed Jun. 19, 2020", 9 pgs.

"U.S. Appl. No. 15/965,775, Response filed Oct. 29, 2019 to Non Final Office Action mailed Jul. 29, 2019", 10 pgs.

"U.S. Appl. No. 15/965,811, Final Office Action malled Feb. 12, 2020", 16 pgs.

"U.S. Appl. No. 15/965,811, Non Final Office Action mailed Jun. 26, 2020", 20 pgs.

"U.S. Appl. No. 15/965,811, Non Final Office Action mailed Aug. 8, 2019", 15 pgs.

"U.S. Appl. No. 15/965,811, Response filed Jun. 12, 2020 to Final Office Action mailed Feb. 12, 2020", 13 pgs.

"U.S. Appl. No. 15/965,811, Response filed Nov. 8, 2019 to Non Final Office Action mailed Aug. 8, 2019", 14 pgs.

"U.S. Appl. No. 16/115,259, Corrected Notice of Allowability mailed Jun. 12, 2023", 3 pgs.

"U.S. Appl. No. 16/115,259, Examiner Interview Summary mailed Feb. 16, 2023", 2 pgs.

"U.S. Appl. No. 16/115,259, Final Office Action malled Apr. 4, 2022", 18 pgs.

"U.S. Appl. No. 16/115,259, Final Office Action mailed Jul. 13, 2021", 18 pgs.

"U.S. Appl. No. 16/115,259, Final Office Action mailed Jul. 22, 2020", 20 pgs.

"U.S. Appl. No. 16/115,259, Final Office Action malled Dec. 16, 2019", 23 pgs.

"U.S. Appl. No. 16/115,259, Non Final Office Action mailed Jan. 11, 2021", 17 pgs.

"U.S. Appl. No. 16/115,259, Non Final Office Action mailed Apr. 9, 2020", 18 pgs.

"U.S. Appl. No. 16/115,259, Non Final Office Action mailed Jul. 30, 2019", 21 pgs.

"U.S. Appl. No. 16/115,259, Non Final Office Action mailed Nov. 1, 2022", 18 pgs.

"U.S. Appl. No. 16/115,259, Non Final Office Action mailed Nov. 8, 2021", 17 pgs.

"U.S. Appl. No. 16/115,259, Notice of Allowance mailed Feb. 27, 2023", 8 pgs.

"U.S. Appl. No. 16/115,259, Preliminary Amendment filed Oct. 18, 2018 t", 6 pgs.

"U.S. Appl. No. 16/115,259, Response filed Feb. 1, 2023 to Non Final Office Action mailed Nov. 1, 2022", 10 pgs.

"U.S. Appl. No. 16/115,259, Response filed Feb. 8, 2022 to Non Final Office Action mailed Nov. 8, 2021", 9 pgs.

"U.S. Appl. No. 16/115,259, Response filed Mar. 13, 2020 to Final Office Action mailed Dec. 16, 2019", 9 pgs.

"U.S. Appl. No. 16/115,259, Response filed May 11, 2021 to Non Final Office Action mailed Jan. 11, 2021", 14 pgs.

"U.S. Appl. No. 16/115,259, Response filed Jul. 9, 2020 to Non Final Office Action mailed Apr. 9, 2020", 8 pgs.

"U.S. Appl. No. 16/115,259, Response filed Sep. 6, 2022 to Final Office Action mailed Apr. 4, 2022", 10 pgs.

"U.S. Appl. No. 16/115,259, Response filed Oct. 13, 2021 to Final Office Action mailed Jul. 13, 2021", 10 pgs.

"U.S. Appl. No. 16/115,259, Response filed Oct. 22, 2020 to Final Office Action mailed Jul. 22, 2020", 10 pgs.

"U.S. Appl. No. 16/115,259, Response filed Oct. 30, 2019 to Non Final Office Action mailed Jul. 30, 2019", 9 pgs.

"U.S. Appl. No. 16/126,869, Appeal Brief filed Sep. 13, 2022", 14 pgs.

"U.S. Appl. No. 16/126,869, Corrected Notice of Allowability mailed Nov. 16, 2022", 2 pgs.

"U.S. Appl. No. 16/126,869, Decision on Pre-Appeal Brief Request for Review mailed May 13, 2022", 2 pgs.

"U.S. Appl. No. 16/126,869, Final Office Action mailed Feb. 8, 2021", 8 pgs.

"U.S. Appl. No. 16/126,869, Final Office Action mailed Jul. 7, 2020", 8 pgs.

"U.S. Appl. No. 16/126,869, Final Office Action mailed Nov. 29, 2021", 9 pgs.

"U.S. Appl. No. 16/126,869, Non Final Office Action mailed Feb. 5, 2020", 7 pgs.

"U.S. Appl. No. 16/126,869, Non Final Office Action mailed May 19, 2021", 8 pgs.

"U.S. Appl. No. 16/126,869, Non Final Office Action mailed Oct. 30, 2020", 9 pgs.

"U.S. Appl. No. 16/126,869, Notice of Allowance malled Nov. 9, 2022", 7 pgs.

"U.S. Appl. No. 16/126,869, Pre-Appeal Brief Request for Review filed Mar. 29, 2022", 4 pgs.

"U.S. Appl. No. 16/126,869, Response filed Feb. 1, 2021 to Non Final Office Action mailed Oct. 30, 2020", 9 pgs.

"U.S. Appl. No. 16/126,869, Response filed May 5, 2020 to Non Final Office Action mailed Feb. 5, 2020", 8 pgs.

"U.S. Appl. No. 16/126,869, Response filed May 10, 2021 to Final Office Action mailed Feb. 8, 2021", 10 pgs.

"U.S. Appl. No. 16/126,869, Response filed Aug. 19, 2021 to Non Final Office Action mailed May 19, 2021", 10 pgs.

"U.S. Appl. No. 16/126,869, Response filed Oct. 7, 2020 to Final Office Action mailed Jul. 7, 2020", 10 pgs.

"U.S. Appl. No. 16/126,869, Supplemental Notice of Allowability mailed Feb. 16, 2023", 2 pgs.

"U.S. Appl. No. 16/193,938, Advisory Action mailed Aug. 17, 2021", 2 pgs.

"U.S. Appl. No. 16/193,938, Final Office Action mailed Jun. 10, 2021", 11 pgs.

"U.S. Appl. No. 16/193,938, Final Office Action malled Aug. 28, 2020", 10 pgs.

"U.S. Appl. No. 16/193,938, Non Final Office Action mailed Jan. 16, 2020", 11 pgs.

"U.S. Appl. No. 16/193,938, Non Final Office Action mailed Feb. 24, 2021", 10 pgs.

"U.S. Appl. No. 16/193,938, Preliminary Amendment filed Nov. 27, 2018", 7 pgs.

"U.S. Appl. No. 16/193,938, Response filed Mar. 24, 2020 to Non Final Office Action mailed Jan. 16, 2020", 10 pgs.

"U.S. Appl. No. 16/193,938, Response filed May 24, 2021 to Non Final Office Action mailed Feb. 24, 2021", 9 pgs.

"U.S. Appl. No. 16/193,938, Response filed Aug. 10, 2021 to Final Office Action mailed Jun. 10, 2021", 10 pgs.

"U.S. Appl. No. 16/193,938, Response filed Nov. 30, 2020 to Final Office Action malled Aug. 28, 2020", 9 pgs.

"U.S. Appl. No. 16/232,824, Examiner Interview Summary mailed Jul. 24, 2020", 3 pgs.

"U.S. Appl. No. 16/232,824, Final Office Action mailed Apr. 30, 2020", 19 pgs.

"U.S. Appl. No. 16/232,824, Non Final Office Action mailed Feb. 19, 2021", 28 pgs.

"U.S. Appl. No. 16/232,824, Non Final Office Action malled Oct. 21, 2019", 18 pgs.

"U.S. Appl. No. 16/232,824, Response filed Feb. 21, 2020 to Non Final Office Action mailed Oct. 21, 2019", 9 pgs.

"U.S. Appl. No. 16/232,824, Response filed Jul. 15, 2020 to Final Office Action mailed Apr. 30, 2020", 11 pgs.

"U.S. Appl. No. 16/245,660, Final Office Action mailed Feb. 6, 2020", 12 pgs.

"U.S. Appl. No. 16/245,660, Non Final Office Action malled Jun. 27, 2019", 11 pgs.

"U.S. Appl. No. 16/245,660, Notice of Allowability mailed Nov. 18, 2020", 2 pgs.

"U.S. Appl. No. 16/245,660, Notice of Allowance mailed Jul. 8, 2020", 8 pgs.

(56)     References Cited

OTHER PUBLICATIONS

"U.S. Appl. No. 16/245,660, Notice of Allowance mailed Nov. 3, 2020", 8 pgs.

"U.S. Appl. No. 16/245,660, Response filed Jun. 8, 2020 to Final Office Action mailed Feb. 6, 2020", 16 pgs.

"U.S. Appl. No. 16/245,660, Response filed Nov. 6, 2019 to Non Final Office Action mailed Jun. 27, 2019", 11 pgs.

"U.S. Appl. No. 16/365,300, Final Office Action mailed Apr. 15, 2021", 31 pgs.

"U.S. Appl. No. 16/365,300, Final Office Action mailed May 13, 2020", 44 pgs.

"U.S. Appl. No. 16/365,300, Non Final Office Action mailed Aug. 3, 2021", 29 pgs.

"U.S. Appl. No. 16/365,300, Non Final Office Action mailed Sep. 28, 2020", 40 pgs.

"U.S. Appl. No. 16/365,300, Non Final Office Action mailed Oct. 30, 2019", 40 pgs.

"U.S. Appl. No. 16/365,300, Response filed Jan. 28, 2021 to Non Final Office Action mailed Sep. 28, 2020", 17 pgs.

"U.S. Appl. No. 16/365,300, Response filed Jan. 30, 2020 to Non Final Office Action mailed Oct. 30, 2019", 16 pgs.

"U.S. Appl. No. 16/365,300, Response filed Jul. 15, 2021 to Final Office Action mailed Apr. 15, 2021", 11 pgs.

"U.S. Appl. No. 16/365,300, Response filed Aug. 13, 2020 to Final Office Action mailed May 13, 2020", 16 pgs.

"U.S. Appl. No. 16/409,390, Corrected Notice of Allowability mailed May 19, 2021", 4 pgs.

"U.S. Appl. No. 16/409,390, Final Office Action mailed Jun. 15, 2020", 12 pgs.

"U.S. Appl. No. 16/409,390, Final Office Action mailed Dec. 23, 2020", 15 pgs.

"U.S. Appl. No. 16/409,390, Non Final Office Action mailed Jan. 8, 2020", 14 pgs.

"U.S. Appl. No. 16/409,390, Non Final Office Action mailed Sep. 11, 2020", 15 pgs.

"U.S. Appl. No. 16/409,390, Notice of Allowance mailed Feb. 22, 2021", 7 pgs.

"U.S. Appl. No. 16/409,390, Response filed Feb. 8, 2021 to Final Office Action mailed Dec. 23, 2020", 11 pgs.

"U.S. Appl. No. 16/409,390, Response filed Apr. 2, 2020 to Non Final Office Action mailed Jan. 8, 2020", 10 pgs.

"U.S. Appl. No. 16/409,390, Response filed Aug. 5, 2020 to Final Office Action mailed Jun. 15, 2020", 11 pgs.

"U.S. Appl. No. 16/409,390, Response filed Dec. 8, 2020 to Non Final Office Action mailed Sep. 11, 2020", 12 pgs.

"U.S. Appl. No. 16/433,725, Examiner Interview Summary mailed Jul. 20, 2020", 4 pgs.

"U.S. Appl. No. 16/433,725, Final Office Action mailed Jun. 2, 2020", 29 pgs.

"U.S. Appl. No. 16/433,725, Non Final Office Action mailed Feb. 27, 2020", 34 pgs.

"U.S. Appl. No. 16/433,725, Non Final Office Action mailed Aug. 20, 2020", 29 pgs.

"U.S. Appl. No. 16/433,725, Notice of Allowance mailed Dec. 16, 2020", 8 pgs.

"U.S. Appl. No. 16/433,725, Response filed May 8, 2020 to Non Final Office Action mailed Feb. 27, 2020", 13 pgs.

"U.S. Appl. No. 16/433,725, Response filed Aug. 3, 2020 to Final Office Action mailed Jun. 2, 2020", 12 pgs.

"U.S. Appl. No. 16/433,725, Response filed Nov. 16, 2020 to Non Final Office Action mailed Aug. 20, 2020", 12 pgs.

"U.S. Appl. No. 16/433,725, Supplemental Notice of Allowability mailed Jan. 25, 2021", 2 pgs.

"U.S. Appl. No. 16/552,003, Notice of Allowance mailed Aug. 27, 2020", 15 pgs.

"U.S. Appl. No. 16/563,445, Final Office Action mailed Mar. 8, 2021", 11 pgs.

"U.S. Appl. No. 16/563,445, Non Final Office Action mailed Aug. 20, 2021", 15 pgs.

"U.S. Appl. No. 16/563,445, Non Final Office Action mailed Sep. 29, 2020", 11 pgs.

"U.S. Appl. No. 16/563,445, Response filed Jan. 29, 2021 to Non Final Office Action mailed Sep. 29, 2020", 9 pgs.

"U.S. Appl. No. 16/563,445, Response filed Jun. 8, 2021 to Final Office Action mailed Mar. 8, 2021", 8 pages.

"U.S. Appl. No. 17/247,169, Corrected Notice of Allowability mailed Jul. 9, 2021", 2 pgs.

"U.S. Appl. No. 17/247,169, Corrected Notice of Allowability mailed Oct. 15, 2021", 7 pgs.

"U.S. Appl. No. 17/247,169, Corrected Notice of Allowability mailed Nov. 30, 2021", 2 pgs.

"U.S. Appl. No. 17/247,169, Notice of Allowance mailed Jul. 2, 2021", 14 pgs.

"U.S. Appl. No. 17/247,169, Preliminary Amendment filed Feb. 2, 2021", 7 pgs.

"U.S. Appl. No. 17/314,963, Advisory Action malled Sep. 27, 22", 3 pgs.

"U.S. Appl. No. 17/314,963, Corrected Notice of Allowability mailed Jan. 26, 2023", 2 pgs.

"U.S. Appl. No. 17/314,963, Final Office Action mailed Jul. 11, 2022", 25 pgs.

"U.S. Appl. No. 17/314,963, Non Final Office Action mailed Feb. 2, 2022", 24 pgs.

"U.S. Appl. No. 17/314,963, Notice of Allowance mailed Jan. 13, 2023", 6 pgs.

"U.S. Appl. No. 17/314,963, Notice of Allowance mailed Apr. 14, 2023", 5 pgs.

"U.S. Appl. No. 17/314,963, Notice of Allowance mailed Aug. 2, 2023", 5 pgs.

"U.S. Appl. No. 17/314,963, Response filed May 2, 2022 to Non Final Office Action mailed Feb. 2, 2022", 10 pgs.

"U.S. Appl. No. 17/314,963, Response filed Sep. 12, 22 to Final Office Action mailed Jul. 11, 22", 11 pgs.

"U.S. Appl. No. 17/314,963, Response filed Oct. 11, 2022 to Advisory Action mailed Sep. 27, 2022", 10 pgs.

"U.S. Appl. No. 17/450,040, Corrected Notice of Allowability mailed Nov. 17, 2023", 2 pgs.

"U.S. Appl. No. 17/450,040, Non Final Office Action mailed Aug. 1, 2023", 7 pgs.

"U.S. Appl. No. 17/450,040, Notice of Allowance mailed Nov. 7, 2023", 8 pgs.

"U.S. Appl. No. 17/450,040, Preliminary Amendment filed Jan. 19, 2022", 7 pgs.

"U.S. Appl. No. 17/450,040, Response filed Oct. 31, 2023 to Non Final Office Action mailed Aug. 1, 2023", 4 pgs.

"U.S. Appl. No. 17/451,285, Preliminary Amendment filed Dec. 28, 2021", 7 pgs.

"BlogStomp", StompSoftware, [Online] Retrieved from the Internet: <URL: http://stompsoftware.com/blogstomp>, (accessed May 24, 2017), 12 pgs.

"Chinese Application Serial No. 201780073911.9, Office Action mailed Nov. 2, 2022", W/ English Translation, 7 pgs.

"Chinese Application Serial No. 201780073911.9, Response filed Mar. 17, 2023 to Office Action mailed Nov. 2, 2022", w/ English Claims, 11 pgs.

"Cup Magic Starbucks Holiday Red Cups come to life with AR app", Blast Radius, [Online] Retrieved from the Internet: <URL: https://web.archive.org/web/20160711202454/http://www.blastradius.com/work/cup-magic>, (2016), 7 pgs.

"Daily App: InstaPlace (iOS/Android): Give Pictures a Sense of Place", TechPP, [Online] Retrieved from the Internet: <URL: http://techpp.com/2013/02/15/instaplace-app-review>, (2013), 13 pgs.

"European Application Serial No. 19206595.1, Extended European Search Report mailed Mar. 31, 2020", 6 pgs.

"European Application Serial No. 17751497.3, Communication Pursuant to Article 94(3) EPC mailed Jun. 2, 2021", 4 pgs.

"European Application Serial No. 17751497.3, Response filed May 20, 2019 to Communication pursuant to Rules 161(1) and 162 EPC mailed Feb. 14, 2019", w/ English Claims, 24 pgs.

"European Application Serial No. 17776809.0, Communication Pursuant to Article 94(3) EPC mailed Apr. 23, 2021", 4 pgs.

(56)        References Cited

OTHER PUBLICATIONS

"European Application Serial No. 17776809.0, Communication Pursuant to Article 94(3) EPC mailed Dec. 9, 2019", 4 pgs.
"European Application Serial No. 17776809.0, Extended European Search Report mailed Feb. 27, 2019", 7 pgs.
"European Application Serial No. 17776809.0, Response filed Mar. 19, 2020 to Communication Pursuant to Article 94(3) EPC mailed Dec. 9, 2019", 25 pgs.
"European Application Serial No. 17776809.0, Response filed Aug. 20, 2021 to Communication Pursuant to Article 94(3) EPC mailed Apr. 23, 2021", 7 pgs.
"European Application Serial No. 17876226.6, Communication Pursuant to Article 94(3) EPC mailed May 29, 2020", 5 pgs.
"European Application Serial No. 17876226.6, Communication Pursuant to Article 94(3) EPC mailed Dec. 14, 2021", 4 pgs.
"European Application Serial No. 17876226.6, Extended European Search Report mailed Sep. 5, 2019", 10 pgs.
"European Application Serial No. 17876226.6, Response filed Mar. 30, 2020 to Extended European Search Report mailed Sep. 5, 2019", 22 pgs.
"European Application Serial No. 17876226.6, Response filed Oct. 2, 20 to Communication Pursuant to Article 94(3) EPC mailed May 29, 20", 22 pgs.
"European Application Serial No. 17876226.6, Response Filed Apr. 22, 2022 Communication Pursuant to Article 94(3) EPC mailed Dec. 14, 2021", 16 pgs.
"European Application Serial No. 18789872.1, Communication Pursuant to Article 94(3) EPC mailed Aug. 11, 2020", 6 pgs.
"European Application Serial No. 18789872.1, Extended European Search Report mailed Jan. 2, 2020", 8 pgs.
"European Application Serial No. 18789872.1, Response filed Feb. 18, 2021 to Communication Pursuant to Article 94(3) EPC mailed Aug. 11, 2020", 15 pgs.
"European Application Serial No. 18790189.7, Communication Pursuant to Article 94(3) EPC mailed Jul. 30, 2020", 9 pgs.
"European Application Serial No. 18790189.7, Extended European Search Report mailed Jan. 2, 2020", 7 pgs.
"European Application Serial No. 18790189.7, Response filed Feb. 9, 2021 to Communication Pursuant to Article 94(3) EPC mailed Jul. 30, 2020", 11 pgs.
"European Application Serial No. 18790189.7, Response Filed Jul. 14, 2020 to Extended European Search Report mailed Jan. 2, 2020", 21 pgs.
"European Application Serial No. 18790319.0, Extended European Search Report mailed Feb. 12, 2020", 6 pgs.
"European Application Serial No. 18790319.0, Response filed Aug. 27, 2020 to Extended European Search Report mailed Feb. 12, 2020", 19 pgs.
"European Application Serial No. 18791363.7, Communication Pursuant to Article 94(3) EPC mailed Aug. 11, 2020", 9 pgs.
"European Application Serial No. 18791363.7, Extended European Search Report mailed Jan. 2, 2020", 8 pgs.
"European Application Serial No. 18791363.7, Response filed Jul. 14, 2020 to Extended European Search Report mailed Jan. 2, 2020", 31 pgs.
"European Application Serial No. 18791925.3, Communication Pursuant to Article 94(3) EPC mailed May 11, 2021", 7 pgs.
"European Application Serial No. 18791925.3, Extended European Search Report mailed Jan. 2, 2020", 6 pgs.
"European Application Serial No. 18791925.3, Response Filed Jul. 27, 2020 to Extended European Search Report mailed Jan. 2, 2020", 19 pgs.
"European Application Serial No. 19206595.1, Response filed Dec. 16, 2020 to Extended European Search Report mailed Mar. 31, 2020", 43 pgs.
"European Application Serial No. 19206610.8, Extended European Search Report mailed Feb. 12, 2020", 6 pgs.
"European Application Serial No. 19206610.8, Response filed Sep. 23, 2020 to Extended European Search Report mailed Feb. 12, 2020", 109 pgs.

"InstaPlace Photo App Tell the Whole Story", [Online] Retrieved from the Internet: <URL: youtu.be/uF_gFkg1hBM>, (Nov. 8, 2013), 113 pgs., 1:02 min.
"International Application Serial No. PCT/CA2013/000454, International Preliminary Report on Patentability mailed Nov. 20, 2014", 9 pgs.
"International Application Serial No. PCT/CA2013/000454, International Search Report mailed Aug. 20, 13", 3 pgs.
"International Application Serial No. PCT/CA2013/000454, Written Opinion mailed Aug. 20, 2013", 7 pgs.
"International Application Serial No. PCT/US2015/037251, International Search Report mailed Sep. 29, 2015", 2 pgs.
"International Application Serial No. PCT/US2017/025460, International Preliminary Report on Patentability malled Oct. 11, 2018", 9 pgs.
"International Application Serial No. PCT/US2017/025460, International Search Report mailed Jun. 20, 2017", 2 pgs.
"International Application Serial No. PCT/US2017/025460, Written Opinion mailed Jun. 20, 2017", 7 pgs.
"International Application Serial No. PCT/US2017/040447, International Preliminary Report on Patentability mailed Jan. 10, 2019", 8 pgs.
"International Application Serial No. PCT/US2017/040447, International Search Report mailed Oct. 2, 2017", 4 pgs.
"International Application Serial No. PCT/US2017/040447, Written Opinion mailed Oct. 2, 2017", 6 pgs.
"International Application Serial No. PCT/US2017/057918, International Preliminary Report on Patentability mailed May 9, 2019", 9 pgs.
"International Application Serial No. PCT/US2017/057918, International Search Report mailed Jan. 19, 2018", 3 pgs.
"International Application Serial No. PCT/US2017/057918, Written Opinion mailed Jan. 19, 2018", 7 pgs.
"International Application Serial No. PCT/US2017/063981, International Preliminary Report on Patentability mailed Jun. 13, 2019", 10 pgs.
"International Application Serial No. PCT/US2017/063981, International Search Report mailed Mar. 22, 2018", 3 pgs.
"International Application Serial No. PCT/US2017/063981, Written Opinion mailed Mar. 22, 2018", 8 pgs.
"International Application Serial No. PCT/US2018/000112, International Preliminary Report on Patentability mailed Nov. 7, 2019", 6 pgs.
"International Application Serial No. PCT/US2018/000112, International Search Report mailed Jul. 20, 2018", 2 pgs.
"International Application Serial No. PCT/US2018/000112, Written Opinion mailed Jul. 20, 2018", 4 pgs.
"International Application Serial No. PCT/US2018/000113, International Preliminary Report on Patentability mailed Nov. 7, 2019", 6 pgs.
"International Application Serial No. PCT/US2018/000113, International Search Report mailed Jul. 13, 2018", 2 pgs.
"International Application Serial No. PCT/US2018/000113, Written Opinion mailed Jul. 13, 2018", 4 pgs.
"International Application Serial No. PCT/US2018/030039, International Preliminary Report on Patentability mailed Nov. 7, 2019", 6 pgs.
"International Application Serial No. PCT/US2018/030039, International Search Report mailed Jul. 11, 2018", 2 pgs.
"International Application Serial No. PCT/US2018/030039, Written Opinion mailed Jul. 11, 2018", 4 pgs.
"International Application Serial No. PCT/US2018/030041, International Preliminary Report on Patentability mailed Nov. 7, 2019", 5 pgs.
"International Application Serial No. PCT/US2018/030041, International Search Report mailed Jul. 11, 2018", 2 pgs.
"International Application Serial No. PCT/US2018/030041, Written Opinion mailed Jul. 11, 2018", 3 pgs.
"International Application Serial No. PCT/US2018/030043, International Preliminary Report on Patentability mailed Nov. 7, 2019", 7 pgs.
"International Application Serial No. PCT/US2018/030043, International Search Report mailed Jul. 23, 2018", 2 pgs.

(56)         References Cited

OTHER PUBLICATIONS

"International Application Serial No. PCT/US2018/030043, Written Opinion mailed Jul. 23, 2018", 5 pgs.
"International Application Serial No. PCT/US2018/030044, International Preliminary Report on Patentability mailed Nov. 7, 2019", 8 pgs.
"International Application Serial No. PCT/US2018/030044, International Search Report mailed Jun. 26, 2018", 2 pgs.
"International Application Serial No. PCT/US2018/030044, Written Opinion mailed Jun. 26, 2018", 6 pgs.
"International Application Serial No. PCT/US2018/030045, International Preliminary Report on Patentability mailed Nov. 7, 2019", 8 pgs.
"International Application Serial No. PCT/US2018/030045, International Search Report mailed Jul. 3, 2018", 2 pgs.
"International Application Serial No. PCT/US2018/030045, Written Opinion mailed Jul. 3, 2018", 6 pgs.
"International Application Serial No. PCT/US2018/030046, International Preliminary Report on Patentability mailed Nov. 7, 2019", 8 pgs.
"International Application Serial No. PCT/US2018/030046, International Search Report mailed Jul. 6, 2018", 2 pgs.
"International Application Serial No. PCT/US2018/030046, Written Opinion mailed Jul. 6, 2018", 6 pgs.
"Introducing Google Latitude", Google UK, [Online] Retrieved from the Internet: <URL: https://www.youtube.com/watch?v=XecGMKqiA5A>, [Retrieved on: Oct. 23, 2019], (Feb. 3, 2009), 1 pg.
"Introducing Snapchat Stories", [Online] Retrieved from the Internet: <URL: https://web.archive.org/web/20131026084921/https://www.youtube.com/watch?v=88Cu3yN-LIM>, (Oct. 3, 2013), 92 pgs.; 00:47 min.
"Korean Application Serial No. 10-2018-7031055, Notice of Preliminary Rejection mailed Aug. 6, 2019", w/ English Translation, 13 pgs.
"Korean Application Serial No. 10-2018-7031055, Office Action mailed Feb. 25, 2020", w/ English Translation, 7 pgs.
"Korean Application Serial No. 10-2018-7031055, Response filed Mar. 27, 2020 to Office Action mailed Feb. 25, 2020", w/ English claims, 24 pgs.
"Korean Application Serial No. 10-2018-7031055, Response filed Oct. 7, 2019 to Notice of Preliminary Rejection mailed Aug. 6, 2019", w/ English Claims, 30 pgs.
"Korean Application Serial No. 10-2019-7002736, Final Office Action mailed Nov. 26, 2020", w/ English Translation, 8 pgs.
"Korean Application Serial No. 10-2019-7002736, Notice of Preliminary Rejection mailed May 25, 2020", W/English Translation, 16 pgs.
"Korean Application Serial No. 10-2019-7002736, Response filed Jul. 9, 2020 to Notice of Preliminary Rejection mailed May 25, 2020", w/ English Claims, 29 pgs.
"Korean Application Serial No. 10-2019-7002736, Response filed Dec. 28, 2020 to Final Office Action mailed Nov. 26, 2020", w/ English Claims, 16 pgs.
"Korean Application Serial No. 10-2019-7014555, Notice of Preliminary Rejection mailed Jul. 20, 2020", w/ English Translation, 12 pgs.
"Korean Application Serial No. 10-2019-7014555, Response filed Oct. 6, 2020 to Notice of Preliminary Rejection mailed Jul. 20, 2020", w/ English Claims, 27 pgs.
"Korean Application Serial No. 10-2019-7018501, Final Office Action mailed Sep. 8, 2020", w/ English translation, 9 pgs.
"Korean Application Serial No. 10-2019-7018501, Notice of Preliminary Rejection mailed Apr. 16, 2020", w/ English Translation, 20 pgs.
"Korean Application Serial No. 10-2019-7018501, Response filed Jun. 16, 2020 to Notice of Preliminary Rejection mailed Apr. 16, 2020", w/ English Claims, 17 pgs.
"Korean Application Serial No. 10-2019-7018501, Response filed Dec. 7, 2020 to Final Office Action mailed Sep. 8, 2020", w/ English Claims, 27 pgs.
"Korean Application Serial No. 10-2019-7034899, Notice of Preliminary Rejection mailed May 27, 2021", With English translation, 17 pgs.
"Korean Application Serial No. 10-2019-7034899, Response filed Aug. 11, 2021 to Notice of Preliminary Rejection mailed May 27, 2021", With English claims, 26 pgs.
"Korean Application Serial No. 10-2020-7022773, Notice of Preliminary Rejection mailed Feb. 26, 2021", w/ English Translation, 11 pgs.
"Korean Application Serial No. 10-2020-7022773, Notice of Preliminary Rejection mailed Aug. 23, 2020", w/ English translation, 11 pgs.
"Korean Application Serial No. 10-2020-7022773, Response filed Apr. 7, 2021 to Notice of Preliminary Rejection mailed Feb. 26, 2021", w/ English Claims, 12 pgs.
"Korean Application Serial No. 10-2020-7022773, Response filed Oct. 19, 2020 to Notice of Preliminary Rejection mailed Aug. 23, 2020", w/ English Claims, 26 pgs.
"Korean Application Serial No. 10-2020-7035136, Notice of Preliminary Rejection mailed Feb. 25, 2021", w/ English Translation, 5 pgs.
"Korean Application Serial No. 10-2021-7008607, Notice of Preliminary Rejection mailed Jun. 1, 2021", w/ English Translation, 5 pgs.
"Korean Application Serial No. 10-2021-7008607, Notice of Preliminary Rejection mailed Dec. 7, 2021", w/ English translation, 6 pgs.
"Korean Application Serial No. 10-2021-7008607, Response filed Jan. 11, 2022 to Notice of Preliminary Rejection mailed Dec. 7, 2021", w/English Claims, 12 pgs.
"Korean Application Serial No. 10-2021-7008607, Response filed Aug. 2, 2021 to Notice of Preliminary Rejection mailed Jun. 1, 2021", w/ English Claims, 17 pgs.
"Korean Application Serial No. 10-2021-7010821, Notice of Preliminary Rejection mailed May 28, 2021", w/ English Translation, 18 pgs.
"Korean Application Serial No. 10-2021-7010821, Response filed Jul. 28, 2021 to Notice of Preliminary Rejection mailed May 28, 2021", w/ English Claims, 31 pgs.
"Korean Application Serial No. 10-2021-7014438, Notice of Preliminary Rejection mailed Aug. 9, 2021", w/ English Translation, 4 pgs.
"Korean Application Serial No. 10-2022-7031802, Notice of Preliminary Rejection mailed May 12, 2023", W/English Translation, 15 pgs.
"List of IBM Patents or Patent Applications Treated as Related; {Appendix P)", IBM, (Sep. 14, 2018), 2 pgs.
"Macy's Believe-o-Magic", [Online] Retrieved from the Internet: <URL: https://web.archive.org/web/20190422101854/https://www.youtube.com/watch?v=xvzRXy3J0Z0&feature=youtu.be>, (Nov. 7, 2011), 102 pgs.; 00:51 min.
"Macy's Introduces Augmented Reality Experience in Stores across Country as Part of Its 2011 Believe Campaign", Business Wire, [Online] Retrieved from the Internet: <URL: https://www.businesswire.com/news/home/20111102006759/en/Macys-Introduces-Augmented-Reality-Experience-Stores-Country>, (Nov. 2, 2011), 6 pgs.
"Starbucks Cup Magic", [Online] Retrieved from the Internet: <URL: https://www.youtube.com/watch?v=RWwQXI9RG0w>, (Nov. 8, 2011), 87 pgs.; 00:47 min.
"Starbucks Cup Magic for Valentine's Day", [Online] Retrieved from the Internet: <URL: https://www.youtube.com/watch?v=8nvqOzjq10w>, (Feb. 6, 2012), 88 pgs.; 00:45 min.
"Starbucks Holiday Red Cups Come to Life, Signaling the Return of the Merriest Season", Business Wire, [Online] Retrieved from the Internet: <URL: http://www.businesswire.com/news/home/20111115005744/en/2479513/Starbucks-Holiday-Red-Cups-Life-Signaling-Return>, (Nov. 15, 2011), 5 pgs.
"The One Million Tweet Map: Using Maptimize to Visualize Tweets in a World Map | PowerPoint Presentation", fppt.com, [Online] Retrieved form the Internet: <URL: https://web.archive.org/web/

(56) References Cited

OTHER PUBLICATIONS

20121103231906/http://www.free-power-point-templates.com/articles/
the-one-million-tweet-map-using-maptimize-to-visualize-tweets-in-
a-world-map/>, (Nov. 3, 2012), 4 pgs.
Alex, Heath, "What do Snapchat's emojis mean?—Understanding
these emojis will turn you into a Snapchat pro", Business Insider,
[Online] Retrieved from the Internet: <URL: https://www.
businessinsider.com/what-do-snapchats-emojismean-2016-5?
international=true&r=US&IR=T>, (May 28, 2016), 1 pg.
Broderick, Ryan, "Every thing You Need to Know About Japan's
Amazing Photo Booths", [Online] Retrieved from the Internet:
<URL: https://www.buzzfeed.com/ryanhatesthis/look-how-kawaii-
i-am?utm_term =.kra5QwGNZ#.muYoVB7qJ>, (Jan. 22, 2016), 37
pgs.
Carthy, Roi, "Dear All Photo Apps: Mobli Just Won Filters",
TechCrunch, [Online] Retrieved from the Internet: <URL: https://
techcrunch.com/2011/09/08/mobli-filters>, (Sep. 8, 2011), 10 pgs.
Castelluccia, Claude, et al., "EphPub: Toward robust Ephemeral
Publishing", 19th IEEE International Conference on Network Pro-
tocols (ICNP), (Oct. 17, 2011), 18 pgs.
Chan, Connie, "The Elements of Stickers", [Online] Retrieved from
the Internet: <URL: https://a16z.com/2016/06/17/stickers/>, (Jun.
20, 2016), 14 pgs.
Collet, Jean Luc, et al., "Interactive avatar in messaging environ-
ment", U.S. Appl. No. 12/471,811, filed May 26, 2009, (May 26,
2009), 31 pgs.
Dillet, Romain, "Zenly proves that location sharing isn't dead",
[Online] Retrieved from the Internet: <URL: https://techcrunch.
com/2016/05/19/zenly-solomoyolo/>, (accessed Jun. 27, 2018), 6
pgs.
Fajman, "An Extensible Message Format for Message Disposition
Notifications", Request for Comments: 2298, National Institutes of
Health, (Mar. 1998), 28 pgs.
Finn, Greg, "Miss Google Latitude? Google Plus With Location
Sharing Is Now a Suitable Alternative", Cypress North, [Online]
Retrieved from the Internet: <URL: https://cypressnorth.com/social-
media/miss-google-latitude-google-location-sharing-now-suitable-
alternative/>, (Nov. 27, 2013), 9 pgs.
Gundersen, Eric, "Foursquare Switches to MapBox Streets, Joins
the OpenStreetMap Movement", [Online] Retrieved from the Inter-
net: <URL: https://blog.mapbox.com/foursquare-switches-to-mapbox-
streets-joins-the-openstreetmap-movement-29e6a17f4464>, (Mar. 6,
2012), 3 pgs.
Heath, Alex, "Understanding these emojis will turn you into a
Snapchat pro", [Online]. Retrieved from the Internet: <URL: http://
www.businessinsider.com/what-do-snapchats-emojis-mean-2016-5?
international=true&r=US&IR=T>, (May 28, 2016), 3 pgs.
Janthong, Isaranu, "Instaplace ready on Android Google Play store",
Android App Review Thailand, [Online] Retrieved from the Inter-
net: <URL: http://www.android-free-app-review.com/2013/01/
instaplace-android-google-play-store.html>, (Jan. 23, 2013), 9 pgs.
Lapenna, Joe, "The Official Google Blog. Check in with Google
Latitude", Google Blog, [Online] Retrieved from the Internet:
<https://web.archive.org/web/20110201201006/https://googleblog.
blogspot.com/2011/02/check-in-with-google-latitude.html>, [Retrieved
on: Oct. 23, 2019], (Feb. 1, 2011), 3 pgs.
Leyden, John, "This SMS will self-destruct in 40 seconds", [Online]
Retrieved from the Internet: <URL: http://www.theregister.co.uk/
2005/12/12/stealthtext/>, (Dec. 12, 2005), 1 pg.
Macleod, Duncan, "Macys Believe-o-Magic App", [Online] Retrieved
from the Internet: <URL: http://theinspirationroom.com/daily/2011/
macys-believe-o-magic-app>, (Nov. 14, 2011), 10 pgs.
Macleod, Duncan, "Starbucks Cup Magic Lets Merry", [Online]
Retrieved from the Internet: <URL: http://theinspirationroom.com/
daily/2011/starbucks-cup-magic>, (Nov. 12, 2011), 8 pgs.
Melanson, Mike, "This text message will self destruct in 60 sec-
onds", [Online] Retrieved from the Internet: <URL: http://readwrite.
com/2011/02/11/this_text_message_will_self_destruct_in_60_
seconds>, (Feb. 18, 2015), 4 pgs.

Neis, Pascal, "The OpenStreetMap Contributors Map aka Who's
around me?", [Online] Retrieved from the Internet by the examiner
on Jun. 5, 2019: <URL: https://neis-one.org/2013/01/oooc/>, (Jan.
6, 2013), 7 pgs.
Notopoulos, Katie, "A Guide to the New Snapchat Filters and Big
Fonts", [Online] Retrieved from the Internet: <URL: https://www.
buzzfeed.com/katienotopoulos/a-guide-to-the-new-snapchat-filters-
and-big-fonts?utm_term =.bkQ9qVZWe#.nv58YXpkV>, (Dec. 22,
2013), 13 pgs.
Panzarino, Matthew, "Snapchat Adds Filters, a Replay Function and
for Whatever Reason, Time, Temperature and Speed Overlays",
TechCrunch, [Online] Retrieved form the Internet: <URL: https://
techcrunch.com/2013/12/20/snapchat-adds-filters-new-font-and-for-
some-reason-time-temperature-and-speed-overlays/>, (Dec. 20, 2013),
12 pgs.
Perez, Sarah, "Life 360, the Family Locator With More Users Than
Foursquare, Raises a $10 Million Series B", [Online] Retrieved
from the Internet: <URL: https://techcrunch.com/2013/07/10/life360-
the-family-locator-with-more-users-than-foursquare-raises-10-million-
series-b/>, (Jul. 10, 2013), 2 pgs.
Petovello, Mark, "How does a GNSS receiver estimate velocity?",
InsideGNSS, [Online] Retrieved from the Internet: <URL: http://
insidegnss.com/wp-content/uploads/2018/01/marapr15-SOLUTIONS.
pdf>., (Mar.-Apr. 2015), 3 pgs.
Rhee, Chi-Hyoung, et al., "Cartoon-like Avatar Generation Using
Facial Component Matching", International Journal of Multimedia
and Ubiquitous Engineering, (Jul. 30, 2013), 69-78.
Sawers, Paul, "Snapchat for iOS Lets You Send Photos to Friends
and Set How long They're Visible for", [Online] Retrieved from the
Internet: <URL: https://thenextweb.com/news/snapchat-for-ios-lets-
you-send-photos-to-friends-and-set-how-long-theyre-visible-for>, (May
7, 2012), 5 pgs.
Shein, Esther, "Ephemeral Data", Communications of the ACM,
vol. 56, No. 9, (Sep. 2013), 3 pgs.
Sophia, Bernazzani, "A Brief History of Snapchat", Hubspot, [Online]
Retrieved from the Internet: <URL: https://blog.hubspot.com/
marketing/history-of-snapchat>, (Feb. 10, 2017), 12 pgs.
Sulleyman, Aatif, "Google Maps Could Let Strangers Track Your
Real-Time Location for Days at a Time", The Independent, [Online]
Retrieved from the Internet: <URL: https://www.independent.co.
uk/life-style/gadgets-and-tech/news/google-maps-track-location-real-
time-days-privacy-security-stalk-gps-days-a7645721.html>, (Mar. 23,
2017), 5 pgs.
Tripathi, Rohit, "Watermark Images in PHP and Save File on
Server", [Online] Retrieved from the Internet: <URL: http://code.
rohitink.com/2012/12/28/watermark-images-in-php-and-save-file-
on-server>, (Dec. 28, 2012), 4 pgs.
Tumbokon, Karen, "Snapchat Update: How to Add Bitmoji to
Customizable Geofilters", International Business Times, [Online]
Retrieved from the Internet : <URL: https://www.ibtimes.com/
snapchat-update-how-add-bitmoji-customizable-geofilters-
2448152>, (Nov. 18, 2016), 6 pgs.
Vaas, Lisa, "StealthText, Should You Choose to Accept It", [Online]
Retrieved from the Internet: <URL: https://www.eweek.com/
enterprise-apps/stealthtext-should-you-choose-to-accept-it/>, (Dec.
13, 2005), 3 pgs.
Wilmott, Clancy, et al., "Playful Mapping in the Digital Age",
Playful Mapping Collective, Institute of Network Cultures, Amster-
dam, (2016), 158 pgs.
Zibreg, "How to share your real time location on Google Maps",
idownloadblog.com, [Online] Retrieved from the Internet: <URL:
https://www.idownloadblog.com/2017/04/12/how-to-share-location-
google-maps/>, (Apr. 12, 2017), 21 pgs.
"U.S. Appl. No. 18/586,080, Notice of Allowance mailed Jan. 30,
2025", 7 pgs.
"Korean Application Serial No. 10-2022-7031802, Office Action
mailed Feb. 4, 2025", w/ English translation, 9 pgs.
"U.S. Appl. No. 18/969,983, Non Final Office Action mailed Mar.
17, 2026", 12 pgs.
"European Application Serial No. 24151986.7, Communication
Pursuant to Article 94(3) EPC mailed Mar. 18, 2026", 5 pgs.

* cited by examiner

| | File | ID | Category name | Category type | Gender | Sub_category_1 | Sub_category_2 | State_1 | State_2 |
|---|---|---|---|---|---|---|---|---|---|
| Hairstyle | [image] | hairstyle_1 | hairstyle | 1 | 2 | hair_short | hair_straight | | |
| | [image] | hairstyle_2 | hairstyle | 1 | 2 | hair_short | hair_straight | | |
| | [image] | hairstyle_3 | hairstyle | 1 | 2 | hair_medium | hair_wavy | | |
| Eyes | [image] | eyes_1 | eyes | 1 | 0 | round | | eyes_open | eyes_happy |
| | [image] | eyes_1 | eyes | 1 | 0 | round | | eyes_closed | eyes_sad |
| | [image] | eyes_1 | eyes | 1 | 0 | round | | eyes_squinting | eyes_mad |
| Noses | [image] | nose_1 | nose | 1 | 2 | nose_straight | | | |
| | [image] | nose_2 | nose | 1 | 2 | nose_straight | | | |
| | [image] | nose_3 | nose | 1 | 2 | nose_round | | | |
| Jaws | [image] | jaw_1 | jaw | 1 | 2 | | | | |
| | [image] | jaw_2 | jaw | 1 | 2 | | | | |
| | [image] | jaw_3 | jaw | 1 | 2 | | | | |
| Mouth | [image] | mouth_1 | mouth | 1 | 0 | lips_none | | mouth_closed | mouth_neutral |
| | [image] | mouth_1 | mouth | 1 | 0 | lips_none | | mouth_open | mouth_smiling |
| | [image] | mouth_1 | mouth | 1 | 0 | lips_none | | mouth_open_wide | mouth_frowning |
| Headwear | [image] | headwear_1 | headwear | 2 | 0 | | | | |
| | [image] | headwear_2 | headwear | 2 | 0 | | | | |
| | [image] | headwear_3 | headwear | 2 | 0 | | | | |
| Height | [image] | body_1 | body_height | 1 | 1 | | | | |
| | [image] | body_2 | body_height | 1 | 1 | | | | |
| | [image] | body_3 | body_height | 1 | 1 | | | | |

FIG. 2

SYSTEM AND METHOD FOR GENERATING AND DISPLAYING AVATARS

CROSS REFERENCE TO RELATED APPLICATIONS

This application is a continuation of U.S. patent application Ser. No. 17/450,040, filed Oct. 5, 2021, which application is a continuation of U.S. patent application Ser. No. 15/401,926, filed on Jan. 9, 2017, now issued as U.S. Pat. No. 11,229,849, which is a continuation of U.S. patent application Ser. No. 13/979,974, filed on Jul. 16, 2013, which is a U.S. national-phase application filed under 35 U.S.C. § 371 from International Application Serial No. PCT/CA2013/000454, filed on May 8, 2013 and published as WO 2013/166588 on Nov. 14, 2013, which claims the benefit of priority to U.S. Provisional Application Ser. No. 61/644,057, filed on May 8, 2012, each of which are incorporated herein by reference in their entireties.

FIELD OF THE INVENTION

The present invention relates generally to providing user representations in computing environments. The present invention further relates to managing a particular user's representation in avatar form in computing environments.

BACKGROUND OF THE INVENTION

Environments that use avatars to represent users typically provide their own avatar creation tools. An avatar created by a user in one online environment is usually confined to that environment, so for each new environment, the user typically must create a separate, different avatar. To update characteristics of multiple avatars, the user must change each avatar separately within each environment, which can be time consuming.

Despite the apparent inefficiency of such a system, having a multiplicity of avatars may serve a practical purpose. Just as in real life, digital users exist in multiple contexts and may require different identities in different environments; for example, one identity for work, another for family and friends, another for video games, others for interests and hobbies, and so on. A different avatar in each situation allows the user to present a contextually relevant appearance.

Nevertheless, as the number of digital environments grows, the user is compelled to create and manage an ever-increasing number of avatars, which creates a disincentive to design a separate avatar for each new environment. This reduces the value of avatars generally, and for environments that use avatars, adds a barrier to adoption.

There are mechanisms that attempt to solve this problem by enabling users to use the same avatar in multiple environments, such as one disclosed by Mason et al. in U.S. patent application Ser. No. 12/279,643 (published as US 2010/0011422 A1).

However, such mechanisms require an avatar to be rendered identically in each environment, and therefore fail to provide the avatar's fundamental benefits, which include giving the user a contextually relevant identity, and each environment a consistent look and feel.

Therefore, what is needed is a solution to address at least some of these limitations.

SUMMARY OF THE INVENTION

In accordance with an aspect of the present invention, the present disclosure relates to a system and method for providing avatars adaptable to multiple environments. Avatar means any representation of a user, which may be manifested visually in an environment. For example, an avatar may be manifested as a character in a video game, a user profile picture in a social networking website, or an emoticon in a messaging application, etc. Environment in this disclosure broadly means any environment where an avatar may be manifested. For example, an environment may be an avatar creation application, video game, social networking website, messaging application, smartphone address book, or any other application where a user may want to have a representation.

In accordance with an aspect of the present invention, more particularly, the system and method provides data about an avatar's components, such as discrete facial and bodily features, and the relative positions of the features to another, for the purpose of rendering different versions of a user's avatar which may be visually adapted to suit multiple environments.

In accordance with an aspect of the present invention, the system and method enables data about a single avatar to be adapted and re-rendered in multiple environments in a virtually unlimited number of ways. This allows service providers (such as operators of a service environment) to reap the benefits of providing avatars designed to visually match their environments, while relieving the user of the need to create a new avatar specifically for each service. The user can instead create an avatar in one environment, and link the avatar data to a user account in a second environment. The avatar can then be automatically re-rendered with the second environment's art set using avatar data from the first environment. The second environment can therefore choose not to offer an avatar creation tool at all, yet still give the user the full experience of interacting in its environment with a relevant and personalized avatar.

In accordance with an aspect of the present invention, there is provided a method comprising: a first computing device maintaining avatar data describing at least one avatar component of a first avatar designed for a first service environment, the avatar data associated with an identifier; the first computing device receiving a request from a second service environment, the request including identification data and at least one requested avatar component; based at least partly on a correspondence between the respective identifier and the received identification data, the first computing device transmitting to the second service environment the avatar data describing the at least one avatar component corresponding to the at least one requested avatar component type; and the second service environment generating a second avatar for a second service environment based at least partly on the avatar data received from the first computing device.

In accordance with an aspect of the present invention, in this respect, before explaining at least one embodiment of the invention in detail, it is to be understood that the invention is not limited in its application to the details of construction and to the arrangements of the components set forth in the following description or the examples provided therein, or illustrated in the drawings. The invention is capable of other embodiments and of being practiced and carried out in various ways. Also, it is to be understood that the phraseology and terminology employed herein are for the purpose of description and should not be regarded as limiting.

BRIEF DESCRIPTION OF THE DRAWINGS

In the drawings, embodiments of the invention are illustrated by way of example. It is to be expressly understood that the description and drawings are only for the purpose of illustration and as an aid to understanding, and are not intended as a definition of the limits of the invention.

FIG. 2 is a table showing an example of avatar data in accordance with the present invention.

DETAILED DESCRIPTION

As noted above, the present disclosure relates to a system and method for providing avatars adaptable to multiple environments.

In an aspect, the system and method enables data about a single avatar to be adapted and re-rendered in a virtually unlimited number of ways. This is achieved by generating data about an avatar's discrete facial and bodily features, and each feature's relative position to another, for the purpose of rendering different versions of that avatar which are visually adapted to suit multiple service environments.

This allows a service provider to reap the benefits of providing users with avatars that visually match its service environment, while relieving the user of the requirement to create a separate avatar specifically for that service.

Avatars are typically designed and intended for use in a bounded environment, such as a web portal, branded application or website, or video game. Avatars in each service environment may have a distinct look and feel, and services that use avatars may not want to allow sharing of their avatars for use in other environments.

To address the need for each environment to maintain its own look and feel, and simultaneously eliminate the time and effort required of users to create a new avatar in each environment, the present system and method reduces an avatar to a data set of components, which may be used to re-render a different version of that avatar matched to the look and feel of another environment. This effectively adapts the avatar into something new in each environment, while the use of a common data set of components provides a consistency between different versions of the avatar in different environments.

An adaptable avatar designed to be location and appearance-agnostic benefits an environment by automatically customizing an avatar that is appropriate to its look and feel, and provides the user with control over a consistent set of components for personalized avatars across multiple environments.

Various aspects of the present system and method will now be described in more detail with reference to the figures.

Figure 1:
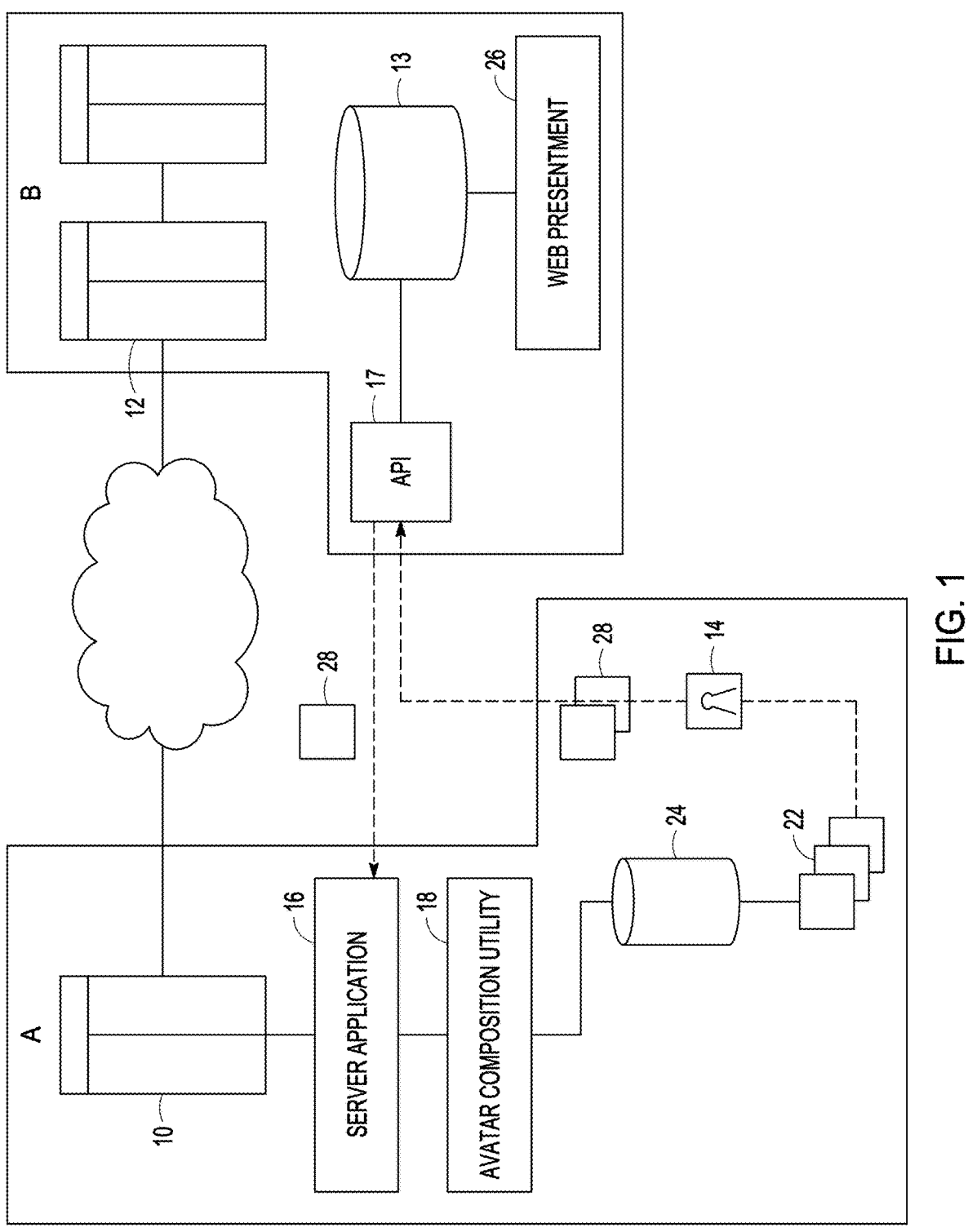
FIG. 1 illustrates an example of a computer network implementation of the system of the present invention.

Referring to FIG. 1 an example of the implementation of the present invention is illustrated, as a computer network implemented system. It should be understood that FIG. 1 illustrates only one possible computer network architecture for implementing the present invention, but the invention is not limited to the particular implementation shown in FIG. 1.

FIG. 1 illustrates a first environment A linked to a server computer (10) and a second environment B linked to a server farm (12). In the implementation shown in FIG. 1, environment A acts as a host environment or service environment for enabling an avatar (14) to be rendered in one or more other environments, in this case second environment B. Server computer (10) is linked to a server application (16) that includes an avatar composition utility (18). The server farm (12) may also include an application repository (13). Linked to the application repository (13) is an Application Programming Interface (17) or "API". The avatar composition utility (18) allows one or more authorized users of the first environment A to create the avatar (14), following the workflow explained in greater detail below. The avatar (14) is rendered using a data set of components (22). The data set of components (22) is stored to a database (24). The second environment B may include for example a web presentment utility (26) that presents a series of Internet pages, based on one or more requests of a user via a browser (not shown). One or more of the requests may relate to presentment of an avatar, one or more operations involving an avatar, or online context for the avatar, as determined by the web presentment utility (26), including based on one or more applications linked to the server farm (12). These requests are received by the API (17), and optionally the API (17) interprets these requests so as to generate and communicate to the server computer (10) a request (28) that is actionable by the server computer (10). As explained below, the request (28) may include information for authenticating the request (28) as being associated with the user, by providing for example authentication data for the user. The server computer (10) acts on the request (28) by interpreting the request (28) and based on this interpretation accessing relevant portions of a profile (30) associated with the user, which includes or is linked to the data set of components (22). The relevant portions of the profile (30) will consist of those portions that are responsive to the request (28) in that they contain the information required for the second environment B to render the avatar (14), using the API (17), so as to present the avatar (14) in a way that complies with the attributes of the presentment of the avatar (14), the one or more operations involving an avatar (14), or online context for the avatar (14), required by the second environment B.

In this way, the avatar (14) is rendered to the second environment B in a responsive and contextually relevant way, without the need to deploy substantial infrastructure on at the server farm (12), i.e. only the API (17) is required.

Avatars may be created from avatar data saved or maintained by a computing device 100. FIG. 2 shows a table illustrating non-limiting examples of avatar components. An avatar component may be described by a component field and corresponding avatar component data. As shown in FIG. 2 the avatar components may be given a hierarchical structure that supports the selective extraction of features based on requests from the API, as described above, the organization of data components in different types some of which may constitute primary and secondary elements or features. In one implementation primary features may be persistent while secondary features may be more likely to be filtered out in favor of use of a feature associated with an on line environment. This file structure enables the mixing of features from the avatar component data and avatar components of a different online environment so as to adapt the avatar to the different online environment.

Avatar components are combined to form an avatar using an avatar composition utility. Operation of the avatar composition utility is illustrated (FIG. 3). Avatar components may be generated by a service environment (referred to as "Environment A"), and avatar component data may be assigned to each component, such as a component's category name, category type, gender, subcategory name, and state. A component's category name may refer to hairstyle, eyes, nose, jaw, mouth shape, etc. A component's category type may indicate whether the component is a primary avatar component or secondary avatar component. A component's gender may indicate whether the component is for male avatars, female avatars, or for either gender. A component's subcategory name may provide further categorization of the component. A component's state may provide contextual or situational information about the component's appearance. For example, a component may be assigned the category name "mouth", category type "primary", gender "either", subcategory "thin", and states "smiling" and "open". Other avatar component data may be assigned to each component, such as a filename and ID. Together, all avatar components comprise an avatar dataset. Avatar datasets may be stored on a computer server and may be made accessible to one or more third party service environments through an Application Programming Interface ("API"). A third party environment may be referred to as "Environment E" throughout this specification.

Each of the service environments may operate on a respective computing device (e.g. a computer server) or be associated with a respective computing device. Each service environment may also be associated with or operate on a single computing device, in the case of a videogame console or personal computer operating multiple games or applications locally. Each service environment may define its own avatar definitions and requirements. For example, while Environment A may require avatar components related to the avatar's face and body, Environment E may only require avatar components related to the avatar's face.

Avatars may be created locally on a particular computing device for a service environment, and then transmitted to a computer server configured with operating or maintaining some aspects of the service environment. The computer server may maintain each avatar dataset created in this way, and make avatar datasets, or data derived therefrom, available to other service environments operating either on the same computer server, or on a different computing device.

Now referring to FIGS. 3a, 3b, 3c, and 3d, shown is a possible embodiment of the avatar composition utility, and a possible workflow enabled by this utility. An avatar composition utility may present avatar components to a user, which the user may individually or collectively select and then customize by repositioning and resizing and choosing colors.

Figure 3A:
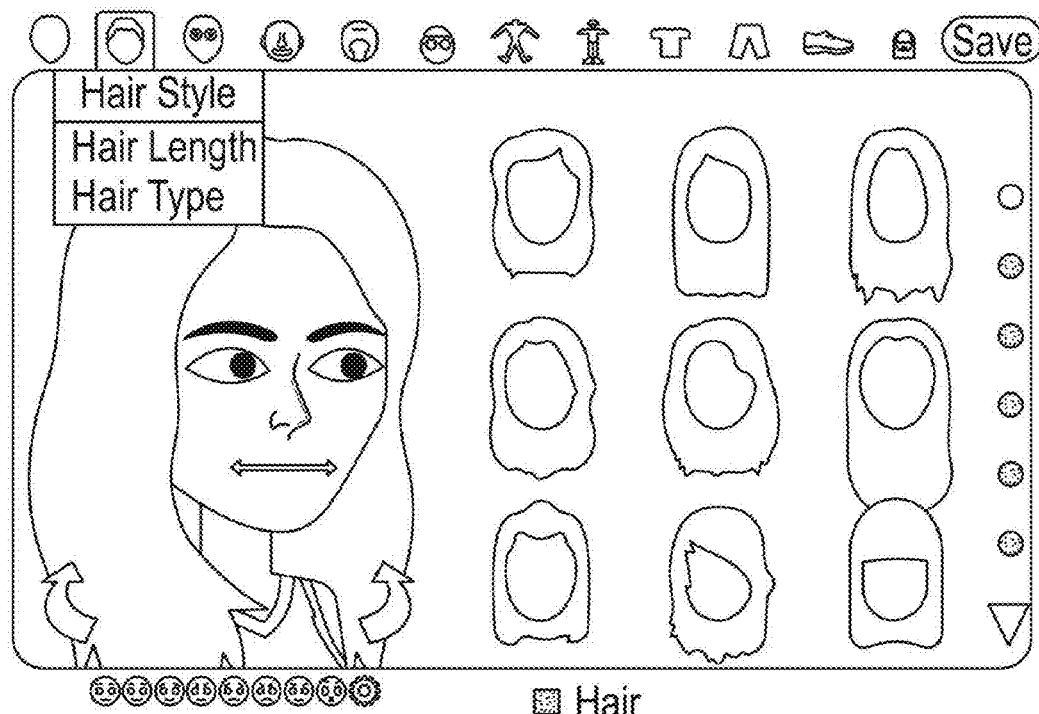
FIGS. 3*a*, 3*b*, 3*c*, and 3*d* show examples of an avatar composition utility.

FIG. 3a shows a menu of icons representing lists of different avatar components that a user can select from, such as hair, eyes, body shape and clothing. Each list may include categories and subcategories of components. In FIG. 3a, a user can select subcategories such as long hair and straight hair to view and select from a list of all avatar hairstyles with long and straight hair. When a user selects a particular component, it is added to the user's avatar profile in the form of avatar data, including the component's ID, and applicable category, subcategories, state, color, etc.

Figure 3B:
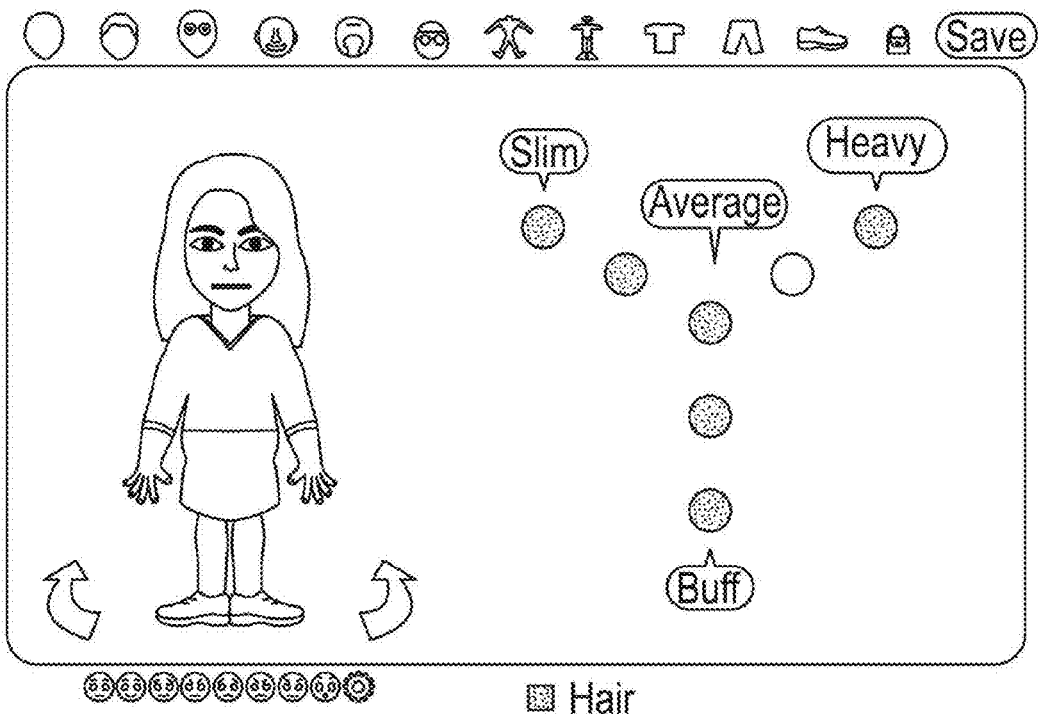

FIG. 3b shows a further aspect of the avatar composition utility, namely a tool to select different body shape components, such as slim, heavy, buff and average. When a user selects a particular body shape component, it is added to the user's avatar profile in the form of avatar data, including the component's ID, and applicable category, subcategories, state, color, etc.

Figure 3C:
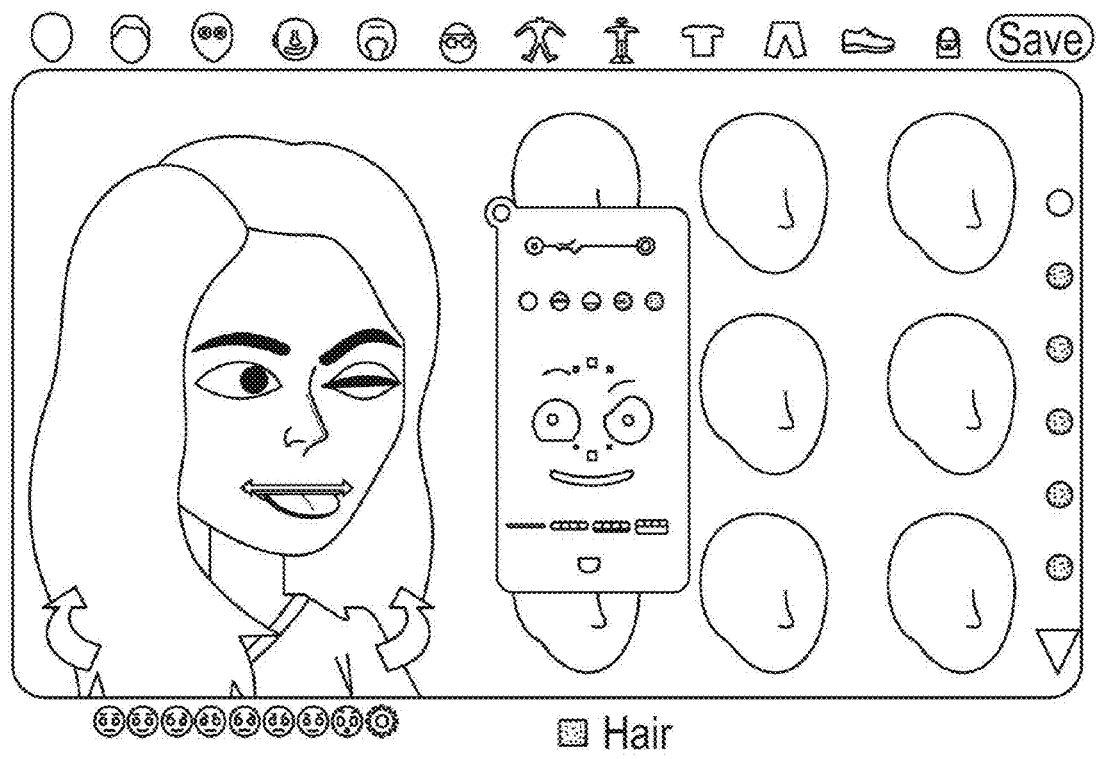

FIG. 3c shows a further aspect of the avatar composition utility, in which users may access a menu for selecting avatar state data. For example, the avatar's states include left eye component equal to mad and closed, left eyebrow equal to mad, right eye equal to happy and open, right eyebrow equal to happy, mouth equal to smiling and open, tongue equal to out, etc. When selected, these states are individually added to the user's avatar profile, and collectively added as avatar emotion data, such as happy or joking.

Figure 3D:
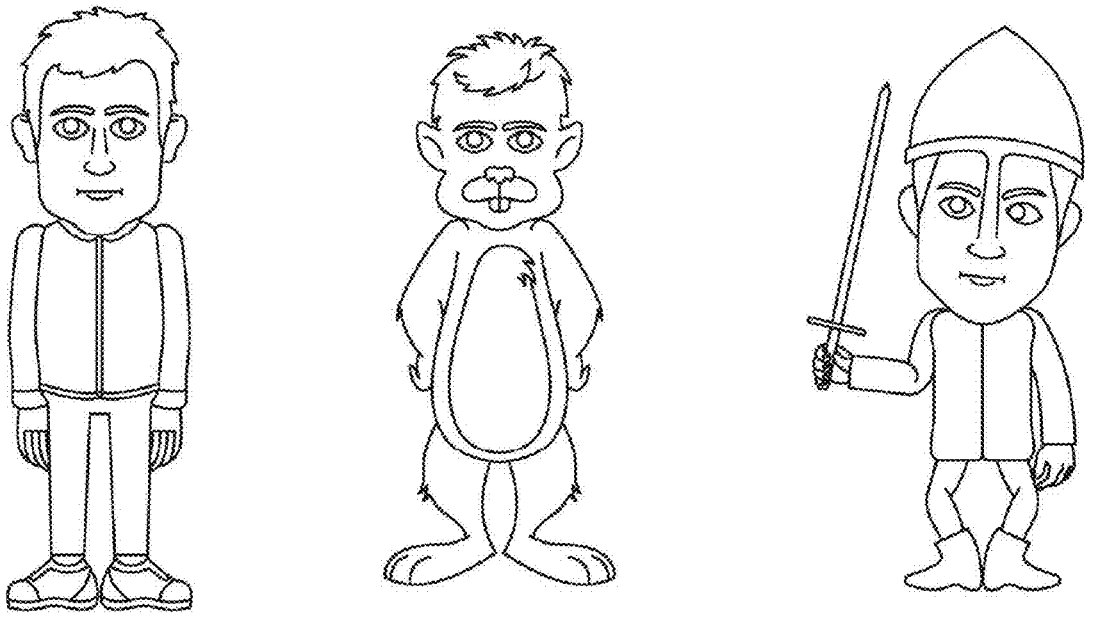

FIG. 3d illustrates the adaptive features of the present invention. It shows different versions of the same avatar, as created and then adapted using the present invention. The avatar on the far left may be the original avatar, and then on the right are two different versions, each being adapted in separate environments with access to the same avatar data. The avatar in the middle has components that correspond to the original avatar on the far left, rendered with its own avatar components in its own visual style, such as hairstyle and eye color, mapped using the system's API. Some components of the middle avatar do not have corresponding components in the original avatar, such as fur color and the snout. In this instance, these components have been mapped to other components in the original avatar: fur color has been mapped to skin tone and snout has been mapped to nose. The result is an adapted avatar with the appearance of a different species, yet individually adapted features that combine to retain the essence of the original avatar. The avatar on the far right has components that correspond to the original avatar on the far left, rendered with its own avatar components in its own visual style, such as hair length, hair color, eye color, skin tone and face shape, mapped using the system's API. Examples of components that have not been mapped include avatar height and component states. However, avatar emotion data has been mapped so that the original avatar profile can communicate through the API whether the avatar is happy, sad, etc., and the adapted avatar can update with the appropriate changes. The avatar also includes new components not present in the original avatar, such as sword and helmet, and new body proportions such as oversized head.

The avatar composition utility may embody one or more user workflows for guiding a user through the steps involved in creating an avatar, or modifying an existing avatar. The avatar composition utility may also access one or more avatar templates or "types", where each template or type constitutes a collection of components which may be organized hierarchically into component categories and component sub-categories. These components may relate to visual components of the avatar, as described above.

Figure 4:
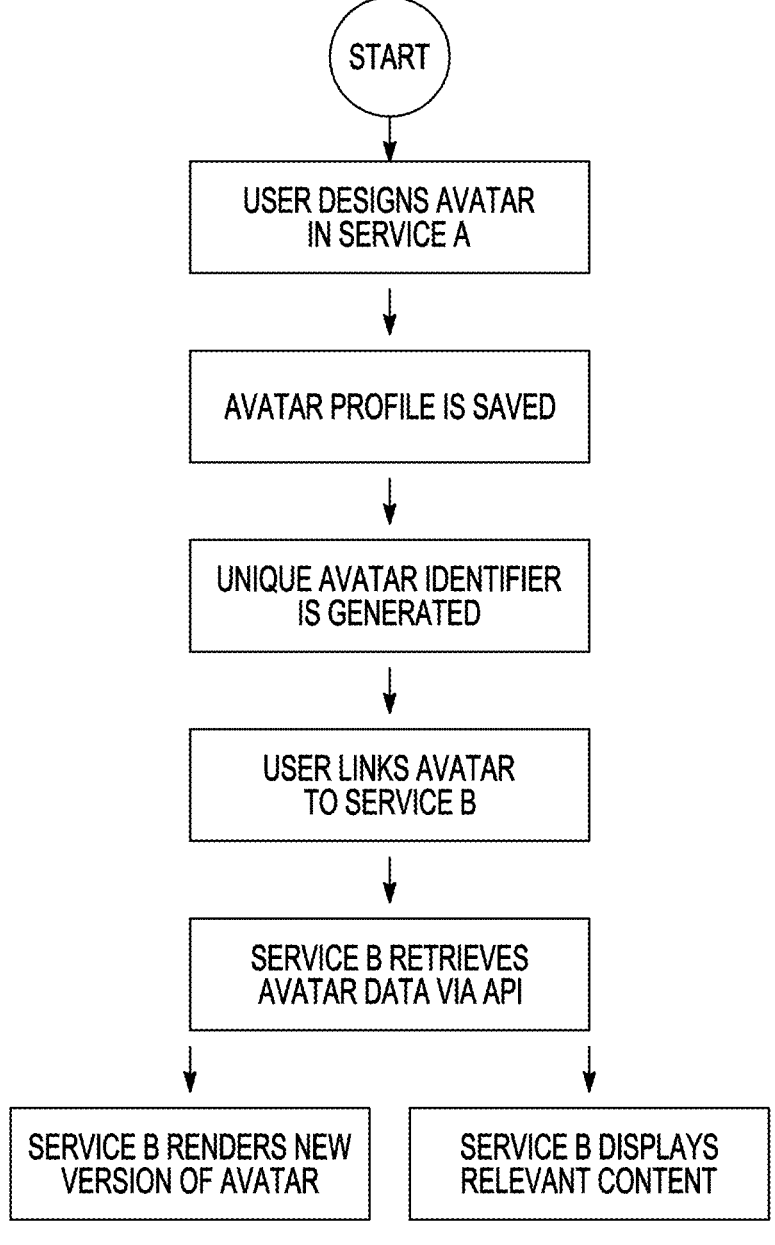
FIG. 4 is workflow diagram illustrating a possible embodiment of the method of the present invention.

A representative workflow in accordance with the method of the present invention is shown in FIG. 4.

In another embodiment, the avatar composition utility defines a series of avatar composition rules that may include, for example, minimum requirements for composing an avatar, so as to ensure that minimum rules for establishing an avatar data set to render an avatar in multiple environments are also met.

The user may save the avatar based on the selected components. If the user is saving the avatar for the first time, the system generates and saves a unique alphanumeric avatar ID and an "avatar profile". An avatar profile includes avatar component data corresponding to each selected component as shown in FIG. 2, additional avatar component data that defines component customizations, such as a component's selected color, size, shape, and relative positioning on the avatar, and "avatar emotion data", which is a code that is generated based the avatar's selected combination of states. For example, if the selected states include eyes=state_1, mouth=state_2, tongue=state_2 and body=state_3, the code assigned to that combination of avatar emotion data may indicate that the avatar is "hungry".

Additional avatar component data such as the size and relative positioning of components helps further distinguish one avatar and avatar profile from another, making both the original and any adapted forms of the avatar more unique and recognizable. Avatar emotion data is useful in demonstrating the avatar's personality and emotional or physical state.

Additional avatar components may be defined by the computing device 100 and saved as avatar data by defining a corresponding avatar component. In particular, non-visual data or meta data associated with a respective avatar may also be stored in the avatar dataset in this way, including data related to an emotion, experience, activity, or other non-visual characteristic. Accordingly, not all avatar components in an avatar dataset are intended to be displayed or will be displayed when rendering the avatar in a service environment. However, avatar components not rendered may be used by the service environment to modify other aspects of a display, or to modify the display of other avatar components. For example, an avatar component storing avatar component data representing that the user has participated in an activity, witnessed an event, completed a task, or used the avatar for a particular number of hours, may cause the service environment to display a representative icon, a title, or change the appearance of the avatar to appear stronger, tired, or in other ways.

The avatar ID generated by the system may be displayed to the user, or the user may create a unique username that corresponds to the ID. The avatar profile may further include an identification of a user associated with the avatar, either in the avatar ID itself or separately.

Avatar profiles are stored in a server database and may be made accessible to Environment E through an API. As the avatar designed by the user for Environment A may by stored in a proprietary data format or may include proprietary avatar components, Environment A may be configured to derive and store a "universal" dataset for each avatar based on the avatar dataset. The universal dataset may be stored in a format usable by Environment E for generating a subsequent avatar. Alternatively, the API may provide for any required format conversions on demand upon receiving a request from Environment E for a particular avatar dataset, or avatar component associated with a particular user.

An Environment E may access Environment A's avatar dataset through Environment A's API for the purpose of generating and mapping Environment E's avatar components with Environment A's. Environment E can ask Environment A for its entire dataset, including every individual component and corresponding avatar component data, and then generate any or all components in its own style. Environment E can ask Environment A only for particular subsets of information, such as all avatar components and avatar component data with gender equal to female, for the purpose of, for example, generating its own female-only avatars; or Environment E can ask Environment A only for all subcategories of all categories, for the purpose of, for example, generating one simplified hairstyle to correspond to each subcategory. Environment E may also map each avatar component it generates to corresponding avatar component data in Environment A by adding relevant identifying tags to each component.

In one embodiment of the present invention, the API may be accessed through an avatar data mapping utility (not shown). Such a utility may include a graphical user interface which displays available avatar components and avatar data generated by Environment A. Environment E can generate its own corresponding avatar components in its own style, and then upload, or drag-and-drop, each component beside Environment A's corresponding avatar components. Each matched component automatically generates a relevant identifying tag, which Environment E can export and then use to generate adapted avatars when users connect their avatars from Environment A to Environment E. As above, Environment E may generate and map components to each of Environment A's components, only some components, or only subsets of components. Such a visual utility simplifies and speeds the process of generating and mapping avatar components and data between environments.

In instances where there is no corresponding component in Environment A, a component may be mapped to an arbitrary parallel component. For example, if an avatar in Environment E has the appearance of a cartoon hedgehog, avatar skin color data in Environment A may be mapped to fur color, and avatar clothing data may be discarded. Instead of requesting the entire avatar dataset for a particular identifier, Environment E may request only avatar component data supported by Environment E. Environment E may also request only one or more avatar components from the API. Accordingly, any request from Environment E may specify the avatar component data requested in addition to including identification data. The identification data may identify a particular avatar by avatar identifier, or may include other data or identifiers associated with a particular user, such as name or email address.

A user may enter Environment E and see an option to connect avatar saved in Environment A to Environment E. User enters unique avatar ID or username and password created in Environment A. Environment E sends avatar ID and password to Environment A via API. Environment A then authenticates identity of user. Environment E requests user's avatar component data from Environment A via API, and Environment A sends requested avatar component data. Environment E can ask Environment A for a user's complete avatar profile, or only for avatar component data from that profile that is relevant to Environment E's avatars. For example, Environment E may only require a user's avatar body shape, skin color and hair color, or only require a user's avatar eye color and emotion data. This way, Environment E can choose to automatically modify, adapt, replace or remove any of the user's avatar components. After Environment E receives the requested avatar component data, it generates an adapted version of the user's avatar consisting of Environment E's relevant avatar component data and presents this adapted avatar to the user.

Environment E may offer the user further avatar customization options using its own avatar composition utility, allowing the user to modify existing avatar components, or add new avatar components not present in Environment A, such as accessories, clothing, weapons, etc. The user may save the adapted avatar in Environment E, and Environment E may generate a new avatar profile of the adapted avatar. The avatar profile of the adapted avatar in Environment E may then be sent to Environment A through the API, and Environment A may then make relevant updates to the user's avatar profile in Environment A, such as modifications to hairstyle or additions of new avatar components.

In an embodiment, the present system and method includes an application programming interface or API which may be integrated with a third party service provider's online environment. For example, in one possible implementation, the API may embody programming required to enable the use of the avatar profile to populate the third party online environment with the avatar, or to generate an avatar derivative based on the base avatar profile, and then populate the third party online environment with the resulting derivative avatar. As another illustrative example, the API may include a translator that is operable to translate the avatar profile into a set of instructions that may be processed by the systems associated with the third party online environment to populate the avatar or derivative avatar into the third party online environment.

The creation of avatars that are adaptive and responsive to different online environments and can move seamlessly from one online environment to another online environment provides the possibility of creating a stronger connection between the user and his/her avatar, because the avatar with a common set of components becomes strongly identifiable by the user. In an embodiment, this connection with the user can be leveraged for the purpose of a variety of user engagement scenarios that may bring value to an avatar platform as well as its various participating partners.

By adapting an existing avatar to multiple service environments, it may be possible to reduce the amount of time spent by a user creating or modifying avatars in each environment, which may be referred to as "onboarding" time. New digital applications are being created or modified regularly, each with their own onboarding tasks, including creating user profiles or avatars. While often necessary, creating multiple user profiles across multiple applications is very time consuming. A single application to create, update and manage an adaptable avatar across multiple other applications and platforms would save users time versus creating and updating different avatars for each environment. For example, a user may register for a banking application that shows the user's avatar's mood based on each month's personal spending, a music application that shows the user's avatar dancing whenever music plays, and a video game where the user's avatar has the appearance of a robot. Creating an adaptable avatar once and then connecting to it from each of the three applications would be 75% faster than creating avatars separately in each service; connecting to 10 such applications would be over 90% faster, and so on. For application providers, giving users the option to connect to their adaptable avatars results in faster and simpler onboarding.

Adaptable avatars may assist in establishing a unifying user experience across disparate applications. Each computer software application or service environment may serve a different purpose and may include some necessary differences in features and user interface. Nevertheless, the user of such environments remains a single person, and so the experience of switching between environments can feel disjointed and lack continuity. A personalized and recognizable avatar that may be adapted to fit other contexts helps to establish consistency between otherwise disparate environments. The resulting user experience may feel more harmonious and unified. For example, switching between a location-sharing application and a health-monitoring application while seeing essentially the same avatar gives these very different applications a source of continuity, making the user's overall digital experience feel more seamless. As applications evolve and new ones are introduced, an adaptable and easily updatable avatar also provides users continuity through time.

The present invention promotes for example environments that are based on collaboration between different online operators who may collaborate to provide a single online environment. The system and method provides the ability for an avatar to be rendered seamlessly across multiple associated environments.

Adaptable avatars may increase the relevance of an application to a user. An application may be more useful when the user experience is personalized. An application that does not use avatars, or that uses non-personalized avatars, may be missing a visual cue for making the application and its features personally relevant to users. Allowing users to connect un-adapted portable avatars might add some relevance to the user experience, but it risks creating an unacceptably inconsistent experience because the avatars are not properly contextualized. For example, a weather forecasting application might tell the user how to dress on a given day by showing a generic avatar wearing appropriate clothing; on a warm and rainy day, the avatar might appear in the application wearing a T-shirt and shorts and holding an umbrella. An improvement might be to give the user an option to connect and import an existing un-adapted avatar from another application, but this would make the user experience visually fragmented. Still another improvement might be to give the user the option to create a new avatar from scratch within the application, but this would add a time-consuming customization task and give the user an additional avatar to manage. If such an application integrated with an adaptable avatar system, the user would only need to connect a previously made avatar to the application to see a contextualized version of him- or herself appear in the weather forecast automatically, thereby making it much more personally relevant. For the application provider, each adaptable avatar becomes an immediate and familiar-looking common connection between itself and the user.

Adaptable avatars may increase user engagement in a particular application. Two challenges faced by most applications are initially grabbing users' interest, and then establishing a pattern of behavior so that they become engaged, habitual users. Adaptable avatars provide an ideal mechanism for establishing such user interest and engagement. Users build an affinity for their adaptable avatars through repeated and varied use in multiple applications. Consequently, serving a pre-existing, yet adapted, avatar of a user within the context of a new application may make that application more interesting to the user than applications where either the avatar needs to be created from scratch and therefore has no history with the user, or is previously designed by the user in another application but not adapted. For example, a video game set in a different galaxy might allow a user to connect a pre-existing adaptable avatar, and then automatically generate a new adapted alien version that captures the original avatar's essence by retaining appropriate components, such as eye color, skin tone, and face shape, etc. Presenting such an adapted avatar at the start of the game provides a vehicle for instantly capturing the user's attention and immersing the user in the game. All applications that use an adaptive avatar system become collectively more engaging by giving users a single, unifying visual identity that transcends any one application, thus making the entire digital experience personally meaningful and satisfying as a whole.

Figure 5:
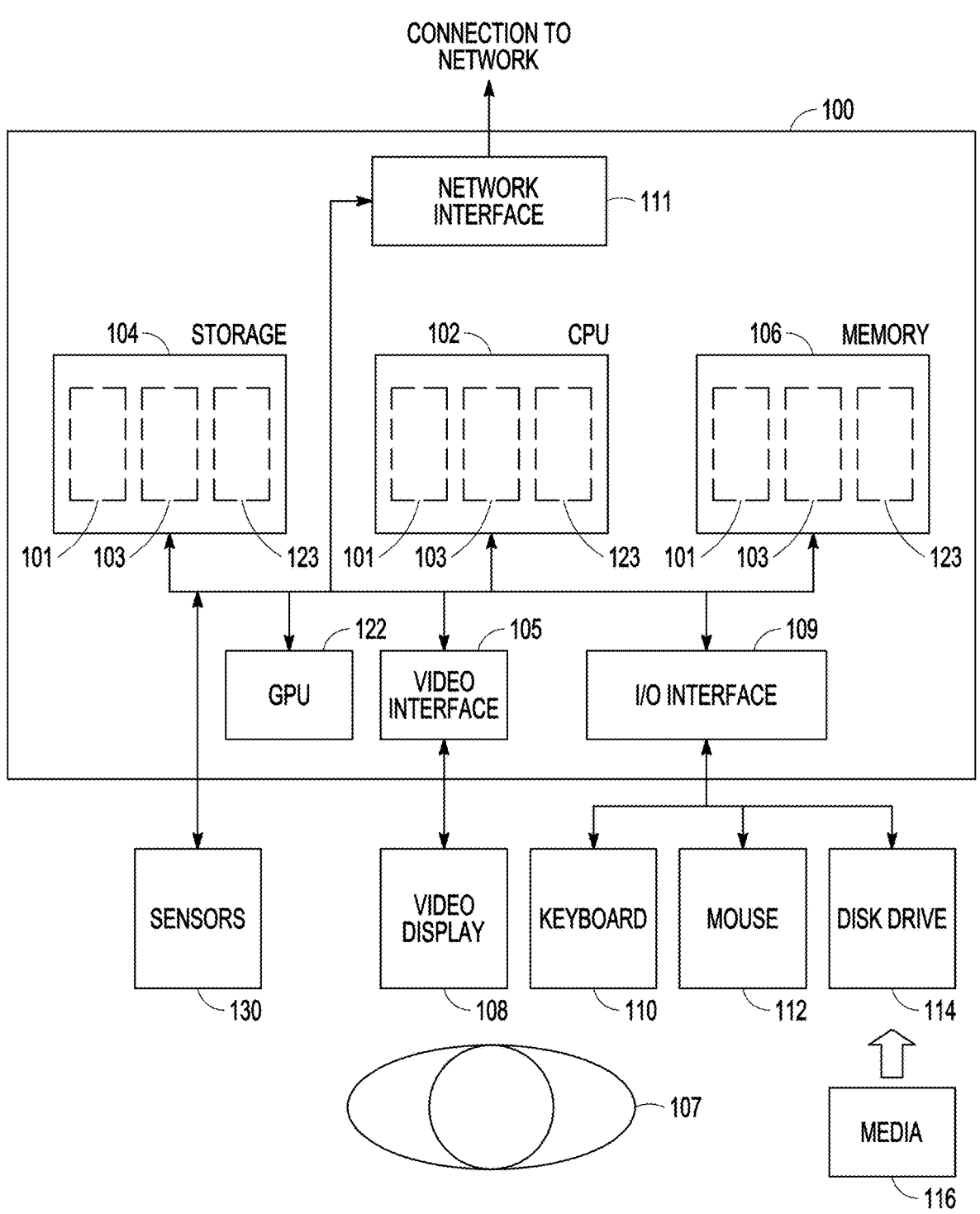
FIG. 5 illustrate a generic computer system which may provide a suitable operating environment for various embodiments.

Referring to FIG. 5, the present system and method may be practiced in various embodiments. A suitably configured generic computer device, and associated communications networks, devices, software and firmware may provide a platform for enabling one or more embodiments as described above. By way of example, FIG. 4 shows a generic computer device 100 that may include a central processing unit ("CPU") 102 connected to a storage unit 104 and to a random access memory 106. The CPU 102 may process an operating system 101, application program 103, and data 123. The operating system 101, application program 103, and data 123 may be stored in storage unit 104 and loaded into memory 106, as may be required. Computer device 100 may further include a graphics processing unit (GPU) 122 which is operatively connected to CPU 102 and to memory 106 to offload intensive image processing calculations from CPU 102 and run these calculations in parallel with CPU 102. An operator 107 may interact with the computer device 100 using a video display 108 connected by a video interface 105, and various input/output devices such as a keyboard 110, mouse 112, and disk drive or solid state drive 114 connected by an interface 109. In known manner, the mouse 112 may be configured to control movement of a cursor in the video display 108, and to operate various graphical user interface (GUI) controls appearing in the video display 108 with a mouse button. The disk drive or solid state drive 114 may be configured to accept computer readable media 116. The computer device 100 may form part of a network via a network interface 111, allowing the computer device 100 to communicate through wired or wireless communications with other suitably configured data processing systems (not shown). The generic computer device 100 may be embodied in various form factors including desktop and laptop computers, and wireless mobile computer devices such as tablets, smart phones and super phones operating on various operating systems. It will be appreciated that the present description does not limit the size or form factor of the computing device on which the present system and method may be embodied.

Use Cases

As will be appreciated, the present system and method may be adapted for various use cases. For example, the present system and method may be used to link a user's avatar ID and avatar profile to websites and have their unique versions of a user appear automatically. A user's avatar ID and avatar profile may also be linked to a video game to play as a re-rendered version of the user's avatar in that game's world. Alternatively, the system of the present invention may be linked to a social networking platform, and sign in to the social networking using social networking login information.

The system of the present invention may be configured to extract information relevant to a user to add context to the rendering of the avatar. For example, the system may connect to social media channels in order to extract information regarding the interests of a user, topics or themes of current interest to the user, and so on. This information may be used to adapt content including avatars, as explained herein.

In another use case, the system and method may automatically render different versions of avatars for different occasions or branding purposes. For example, the avatar can automatically turn into a zombie on Halloween, or be modified by clothing or features to represent a popular character in a show.

In another use case, the system and method may be used to improve digital advertising and web technical support by presenting complementary avatars based on a user's avatar component data. The system and method can also improve user profiling by compiling a user's physiological avatar data, such as height and body shape, behavioral avatar data, such as past and current body poses and postures, and emotional history based on past and current avatar emotion data, across multiple environments.

In another use case, the system and method may be used to improve digital advertising by presenting the user's avatar in online advertisements. The system and method may also be used to improve advertising targeting by using avatar component data to glean physiological information, such as height and body shape, or emotional state based on current or historical avatar emotion data, to serve more relevant ads.

In another use case, the system and method can improve content targeting by using avatar component data to glean physiological information, such as height and body shape, or emotional state based on current or historical avatar emotion data, to serve more relevant news, stories, games and videos.

In another use case, users' avatar data may be categorized in aggregate to ascertain distributions in user physiological, behavioural, emotion and other data within and between populations. Aggregate data may be used to correlate avatar data with other digital user activities, such as online shopping and content consumption. Historical and current aggregate data may also be used to build predictive models for real-world activities, such as economic and sociological trends.

In another use case, the system and method can improve personalized content and storytelling by presenting different versions of a user's avatar in custom comics and animation.

In another use case, the system and method may provide branded personalized emoticon packs featuring a user's avatar to represent a particular theme or particular well-known character.

In another use case, the system and method can present custom versions of a user's avatar in e-greeting cards.

In another use case, the present system and method can present custom versions of a user's avatar in different outfits based on body data.

These various use cases may be adapted to virtually any type of media or digital environment.

While illustrative embodiments of the invention have been described above, it will be appreciated that various changes and modifications may be made without departing from the scope of the present invention.

In further aspects, the disclosure provides systems, devices, methods, and computer programming products, including non-transient machine-readable instruction sets, for use in implementing such methods and enabling the functionality described previously.

Although the disclosure has been described and illustrated in exemplary forms with a certain degree of particularity, it is noted that the description and illustrations have been made by way of example only. Numerous changes in the details of construction and combination and arrangement of parts and steps may be made. Accordingly, such changes are intended to be included in the invention, the scope of which is defined by the claims.

Except to the extent explicitly stated or inherent within the processes described, including any optional steps or components thereof, no required order, sequence, or combination is intended or implied. As will be will be understood by those skilled in the relevant arts, with respect to both processes and any systems, devices, etc., described herein, a wide range of variations is possible, and even advantageous, in various circumstances, without departing from the scope of the invention, which is to be limited only by the claims.

What is claimed is:

1. A system for managing user representations across multiple digital environments, the system comprising:
   one or more processors; and
   one or more memory storage devices storing instructions thereon, which, when executed by the one or more processors, cause the system to perform operations comprising:

maintaining, by a first computing device, a unified avatar profile for a user, the unified avatar profile comprising a dataset of avatar components including discrete facial and bodily features and their relative positions;

receiving, at the first computing device, a plurality of environment identifiers corresponding to a plurality of digital environments in which the user participates;

for each of the plurality of environment identifiers, generating, by the first computing device, an environment-specific avatar by selecting a subset of the avatar components from the unified avatar profile based on predefined criteria associated with the respective digital environment, wherein the predefined criteria include at least one of: a visual style of the digital environment, user interaction mode within the digital environment, and avatar display requirements of the digital environment;

linking, for each environment-specific avatar, the avatar profile to a user account in the respective digital environment, wherein the linking enables automatic adaptation of the environment-specific avatar in response to updates made to the unified avatar profile;

transmitting, from the first computing device to each of the plurality of digital environments, a dataset for the environment-specific avatar for rendering the environment-specific avatar within the respective digital environment, wherein the rendering includes adapting visual characteristics of the environment-specific avatar to match the visual style and display requirements of the respective digital environment; and updating, by the first computing device, the unified avatar profile in response to user-initiated changes to any of the environment-specific avatars, wherein the updating includes modifying the dataset of avatar components based on user-initiated modifications and synchronizing the user-initiated modifications across the plurality of digital environments to maintain consistency of the user representation.

2. The system of claim 1, wherein the maintaining of the unified avatar profile further comprises storing customization settings for each of the avatar components, the customization settings including color, texture, and accessories, and wherein the generating of the environment-specific avatar includes applying the customization settings to the selected subset of avatar components to enhance the visual integration of the environment-specific avatar within the respective digital environment.

3. The system of claim 1, wherein the transmitting of the dataset for the environment-specific avatar further comprises encoding the dataset with compatibility metadata to facilitate the rendering of discrete facial and bodily features of the environment-specific avatar according to the visual style and display requirements specific to each of the plurality of digital environments.

4. The system of claim 1, wherein the updating of the unified avatar profile includes aggregating feedback data from the plurality of digital environments regarding user interactions with the environment-specific avatars, and wherein the feedback data influences the automatic adaptation of the environment-specific avatars by adjusting at least one of the avatar components to enhance user engagement within each respective digital environment.

5. The system of claim 1, wherein the predefined criteria further include processing capabilities of a client computing device, and wherein the generating of the environment-specific avatar further comprises optimizing the selection of the subset of avatar components to ensure compatibility with the processing capabilities of the client computing device, thereby facilitating smooth rendering and interaction within each respective digital environment.

6. The system of claim 1, wherein the linking of the avatar profile to a user account in the respective digital environment includes associating a unique avatar identifier with the user account, and wherein the unique avatar identifier enables retrieval and display of the environment-specific avatar across different user devices associated with the user account, thereby providing a consistent user representation irrespective of the user device utilized to access the digital environment.

7. The system of claim 1, wherein the generating of the environment-specific avatar includes a step of simulating the avatar within the respective digital environment to ensure that the selected subset of avatar components interact correctly with virtual physics and environmental conditions of the digital environment, and wherein any inconsistencies detected during the simulation are addressed by automatically adjusting the avatar components prior to finalizing the environment-specific avatar for transmission.

8. A computer-implemented method for managing user representations across multiple digital environments, the method comprising:

maintaining, by a first computing device, a unified avatar profile for a user, the unified avatar profile comprising a dataset of avatar components including discrete facial and bodily features and their relative positions;

receiving, at the first computing device, a plurality of environment identifiers corresponding to a plurality of digital environments in which the user participates;

for each of the plurality of environment identifiers, generating, by the first computing device, an environment-specific avatar by selecting a subset of the avatar components from the unified avatar profile based on predefined criteria associated with the respective digital environment, wherein the predefined criteria include at least one of: a visual style of the digital environment, user interaction mode within the digital environment, and avatar display requirements of the digital environment;

linking, for each environment-specific avatar, the avatar profile to a user account in the respective digital environment, wherein the linking enables automatic adaptation of the environment-specific avatar in response to updates made to the unified avatar profile;

transmitting, from the first computing device to each of the plurality of digital environments, a dataset for the environment-specific avatar for rendering the environment-specific avatar within the respective digital environment, wherein the rendering includes adapting visual characteristics of the environment-specific avatar to match the visual style and display requirements of the respective digital environment; and updating, by the first computing device, the unified avatar profile in response to user-initiated changes to any of the environment-specific avatars, wherein the updating includes modifying the dataset of avatar components based on user-initiated modifications and synchronizing the user-initiated modifications across the plurality of digital environments to maintain consistency of the user representation.

9. The computer-implemented method of claim 8, wherein the maintaining of the unified avatar profile further comprises storing customization settings for each of the avatar components, the customization settings including color, texture, and accessories, and wherein the generating of the environment-specific avatar includes applying the customization settings to the selected subset of avatar components to enhance the visual integration of the environment-specific avatar within the respective digital environment.

10. The computer-implemented method of claim 8, wherein the transmitting of the dataset for the environment-specific avatar further comprises encoding the dataset with compatibility metadata to facilitate the rendering of discrete facial and bodily features of the environment-specific avatar according to the visual style and display requirements specific to each of the plurality of digital environments.

11. The computer-implemented method of claim 8, wherein the updating of the unified avatar profile includes aggregating feedback data from the plurality of digital environments regarding user interactions with the environment-specific avatars, and wherein the feedback data influences the automatic adaptation of the environment-specific avatars by adjusting at least one of the avatar components to enhance user engagement within each respective digital environment.

12. The computer-implemented method of claim 8, wherein the predefined criteria further include processing capabilities of a client computing device, and wherein the generating of the environment-specific avatar further comprises optimizing the selection of the subset of avatar components to ensure compatibility with the processing capabilities of the client computing device, thereby facilitating smooth rendering and interaction within each respective digital environment.

13. The computer-implemented method of claim 8, wherein the linking of the avatar profile to a user account in the respective digital environment includes associating a unique avatar identifier with the user account, and wherein the unique avatar identifier enables retrieval and display of the environment-specific avatar across different user devices associated with the user account, thereby providing a consistent user representation irrespective of the user device utilized to access the digital environment.

14. The computer-implemented method of claim 8, wherein the generating of the environment-specific avatar includes a step of simulating the avatar within the respective digital environment to ensure that the selected subset of avatar components interact correctly with virtual physics and environmental conditions of the digital environment, and wherein any inconsistencies detected during the simulation are addressed by automatically adjusting the avatar components prior to finalizing the environment-specific avatar for transmission.

15. A non-transitory computer-readable storage medium storing instructions that, when executed by at least one processor, cause the at least one processor to perform operations for managing user representations across multiple digital environments, the operations comprising:

maintaining, by a first computing device, a unified avatar profile for a user, the unified avatar profile comprising a dataset of avatar components including discrete facial and bodily features and their relative positions;

receiving, at the first computing device, a plurality of environment identifiers corresponding to a plurality of digital environments in which the user participates;

for each of the plurality of environment identifiers, generating, by the first computing device, an environment-specific avatar by selecting a subset of the avatar components from the unified avatar profile based on predefined criteria associated with the respective digital environment, wherein the predefined criteria include at least one of: a visual style of the digital environment, user interaction mode within the digital environment, and avatar display requirements of the digital environment;

linking, for each environment-specific avatar, the avatar profile to a user account in the respective digital environment, wherein the linking enables automatic adaptation of the environment-specific avatar in response to updates made to the unified avatar profile;

transmitting, from the first computing device to each of the plurality of digital environments, a dataset for the environment-specific avatar for rendering the environment-specific avatar within the respective digital environment, wherein the rendering includes adapting visual characteristics of the environment-specific avatar to match the visual style and display requirements of the respective digital environment; and updating, by the first computing device, the unified avatar profile in response to user-initiated changes to any of the environment-specific avatars, wherein the updating includes modifying the dataset of avatar components based on user-initiated modifications and synchronizing the user-initiated modifications across the plurality of digital environments to maintain consistency of the user representation.

16. The non-transitory computer-readable storage medium of claim 15, wherein the maintaining of the unified avatar profile further comprises storing customization settings for each of the avatar components, the customization settings including color, texture, and accessories, and wherein the generating of the environment-specific avatar includes applying the customization settings to the selected subset of avatar components to enhance the visual integration of the environment-specific avatar within the respective digital environment.

17. The non-transitory computer-readable storage medium of claim 15, wherein the transmitting of the dataset for the environment-specific avatar further comprises encoding the dataset with compatibility metadata to facilitate the rendering of discrete facial and bodily features of the environment-specific avatar according to the visual style and display requirements specific to each of the plurality of digital environments.

18. The non-transitory computer-readable storage medium of claim 15, wherein the updating of the unified avatar profile includes aggregating feedback data from the plurality of digital environments regarding user interactions with the environment-specific avatars, and wherein the feedback data influences the automatic adaptation of the environment-specific avatars by adjusting at least one of the avatar components to enhance user engagement within each respective digital environment.

19. The non-transitory computer-readable storage medium of claim 15, wherein the predefined criteria further include processing capabilities of a client computing device, and wherein the generating of the environment-specific avatar further comprises optimizing the selection of the subset of avatar components to ensure compatibility with the processing capabilities of the client computing device, thereby facilitating smooth rendering and interaction within each respective digital environment.

20. The non-transitory computer-readable storage medium of claim 15, wherein the linking of the avatar profile to a user account in the respective digital environment includes associating a unique avatar identifier with the user account, and wherein the unique avatar identifier enables retrieval and display of the environment-specific avatar across different user devices associated with the user account, thereby providing a consistent user representation irrespective of the user device utilized to access the digital environment.

* * * * *